United States Patent
Lu et al.

(10) Patent No.: US 11,540,568 B2
(45) Date of Patent: Jan. 3, 2023

(54) APPARATUSES, AND SYSTEMS FOR TRIGGERING A MOBILE SCANNING DEVICE

(71) Applicant: Hand Held Products, Inc., Fort Mill, SC (US)

(72) Inventors: Lin Lu, Suzhou (CN); Zhenjun Zhang, Suzhou (CN); Xianwei Yan, Suzhou (CN); Haiming Qu, Suzhou (CN); Lori Luo, Shanghai (CN); Mark Lee Oberpriller, Atlanta, GA (US); Jana Bacinska, Bratislava (SK); Charles Joseph Cunningham, IV, Broomall, PA (US); Shixue Yi, Suzhou (CN); Congcong Huo, Shanghai (CN); Jiqing Fang, Suzhou (CN); Tianshi Ye, Shanghai (CN); Jing Xu, Shanghai (CN); Qiannan Wang, Shanghai (CN); HongJian Jin, Suzhou (CN); Kinvi Jinhui Ding, Suzhou (CN)

(73) Assignee: Hand Held Products, Inc., Charlotte, NC (US)

(*) Notice: Subject to any disclaimer, the term of this patent is extended or adjusted under 35 U.S.C. 154(b) by 245 days.

(21) Appl. No.: 16/513,012

(22) Filed: Jul. 16, 2019

(65) Prior Publication Data
US 2020/0022433 A1     Jan. 23, 2020

(30) Foreign Application Priority Data
Jul. 17, 2018     (CN) .......................... 201810783869.6

(51) Int. Cl.
*G06K 7/10*     (2006.01)
*A41D 19/00*     (2006.01)
(Continued)

(52) U.S. Cl.
CPC ......... *A41D 19/0027* (2013.01); *G06F 1/163* (2013.01); *G06F 3/014* (2013.01);
(Continued)

(58) Field of Classification Search
CPC ............ A41D 19/0027; A41D 19/0024; A41D 19/0037; G06F 1/163; G06F 3/014;
(Continued)

(56) References Cited

U.S. PATENT DOCUMENTS 5,250,790 A     10/1993     Melitsky et al.
5,763,865 A     6/1998     Swift et al.
(Continued)

FOREIGN PATENT DOCUMENTS

WO     2017/075703 A1     5/2017

OTHER PUBLICATIONS

Honeywell 8680i Smart Wearable, [retrieved Feb. 27, 2020], retrieved from the Internet URL: https://now.honeywellaidc.com/8680i_Smart_Wearable.html, 5 pages.
(Continued)

*Primary Examiner* — Tuyen K Vo
(74) *Attorney, Agent, or Firm* — Alston & Bird LLP

(57) ABSTRACT

Various embodiments described herein illustrate a glove that includes an anterior portion and a posterior portion. The anterior portion is knitted seamlessly with the posterior portion to define a metacarpal region and a plurality of finger regions extending out from the metacarpal region. A first conductive pad is knitted on the anterior portion of the glove. The first conductive pad is knitted on a distal end portion of a first finger region. A second conductive pad knitted on the posterior portion of the glove. Further, the second conductive pad is knitted on a second finger region. An electronic device is removably attached to the posterior portion and is in electrical communication with the first (Continued)

conductive pad and the second conductive pad. The electronic device is triggered in an instance in which the first conductive pad contacts the second conductive pad.

34 Claims, 35 Drawing Sheets

(51) Int. Cl.
  *G06F 1/16* (2006.01)
  *G06F 3/01* (2006.01)
  *G06Q 10/08* (2012.01)
(52) U.S. Cl.
  CPC ..... *G06K 7/10396* (2013.01); *G06K 7/10603* (2013.01); *G06K 2007/10534* (2013.01); *G06Q 10/087* (2013.01)
(58) Field of Classification Search
  CPC ..... G06F 3/038; G06F 3/017; G06K 7/10396; G06K 7/10603; G06K 2007/10534; G06K 7/10891; G06K 7/10881; G06K 7/10851; G06Q 10/087
  USPC ............... 235/375, 383, 385, 462.44–462.48
  See application file for complete search history.

(56) References Cited

U.S. PATENT DOCUMENTS

| | | | |
|---|---|---|---|
| 7,559,770 B2 | 7/2009 | Di Stefano | |
| 8,279,091 B1* | 10/2012 | Tran | G06F 3/017 341/20 |
| 9,104,271 B1* | 8/2015 | Adams | G06F 3/014 |
| D747,071 S * | 1/2016 | Jung | D2/623 |
| 9,510,649 B1 | 12/2016 | Liu et al. | |
| 9,693,622 B1 | 7/2017 | Hackett et al. | |
| 10,162,414 B2* | 12/2018 | Huang | G06F 1/163 |
| 10,310,608 B1* | 6/2019 | Keller | G06F 3/014 |
| 2002/0118123 A1* | 8/2002 | Kim | G06F 3/016 341/34 |
| 2008/0054062 A1* | 3/2008 | Gunning | G06Q 10/087 235/375 |
| 2009/0054077 A1* | 2/2009 | Gauthier | G06F 3/017 455/456.1 |
| 2009/0212979 A1* | 8/2009 | Catchings | G06F 3/014 341/20 |
| 2013/0082922 A1 | 4/2013 | Miller | |
| 2013/0169420 A1 | 7/2013 | Blount, Jr. | |
| 2014/0087573 A1 | 3/2014 | Kroeckel | |
| 2014/0259285 A1* | 9/2014 | Andrews | D04B 7/34 2/167 |
| 2016/0161301 A1 | 6/2016 | Guenther et al. | |
| 2016/0162022 A1* | 6/2016 | Seth | G06F 3/017 345/156 |
| 2017/0055606 A1 | 3/2017 | Xu et al. | |
| 2017/0232538 A1 | 8/2017 | Robinson et al. | |

OTHER PUBLICATIONS

Surface Mount GoPro | How To Use a Flat and Curved Surface Mount Bases for GoPro ,2015, [retrieved Feb. 27, 2020], retrieved from the Internet URL: https://www.youtube.com/watch?v=ylsl9_oSUhc., 1 page.

* cited by examiner

APPARATUSES, AND SYSTEMS FOR TRIGGERING A MOBILE SCANNING DEVICE

CROSS-REFERENCE TO RELATED APPLICATIONS

This application claims the benefit of Chinese Patent Application No. 201810783869.6 filed Jul. 17, 2018, the disclosure of which is herein incorporated by reference in its entirety.

TECHNOLOGICAL FIELD

Example embodiments of the present disclosure relate generally to a mobile scanning device and, more particularly, to systems and apparatuses for triggering the mobile scanning device.

BACKGROUND

A typical mobile scanning device may be utilized in work environments such as, but not limited to, retail outlets and warehouses, to scan/capture images of the objects. Such images may be processed/decoded to extract the information pertaining to the objects, which may be further utilized to perform various operation in the work environment such as, but not limited to, maintaining a record/repository of the objects available in the work environment.

Usually, the mobile scanning device is mounted on wearables such as, but not limited to, gloves thereby enabling a user to carry the mobile scanning device, while keeping both the hands free. To this end, the glove may include a mechanical button that allows the user to trigger the mobile scanning device. Usually such trigger button is provided on an index finger of the glove. When the user presses the button, the mobile scanning device is triggered.

In some scenarios when the user carries or holds certain objects, the mechanical button on the glove may get accidentally pressed (due to the weight of the object). This causes the mobile scanning device to improperly trigger the scanner. Further, as a result of the mechanical button on the gloves, it may not be possible to wash the gloves, as there may be a high probability of an electronic circuit (associated with the mechanical switch) shorting or otherwise becoming damaged.

Applicant has identified a number of deficiencies and problems associated with conventional mobile scanners, and other associated systems and methods described herein. Through applied effort, ingenuity, and innovation, many of these identified problems have been solved by developing solutions that are included in embodiments of the present disclosure, many examples of which are described in detail herein.

SUMMARY

Various embodiments described herein illustrate a glove that includes an anterior portion and a posterior portion. The anterior portion is knitted seamlessly with the posterior portion to define a metacarpal region and a plurality of finger regions extending out from the metacarpal region. A first conductive pad is knitted on the anterior portion of the glove. The first conductive pad is knitted on a distal end portion of a first finger region. A second conductive pad knitted on the posterior portion of the glove. Further, the second conductive pad is knitted on a second finger region. An electronic device is removably attached to the posterior portion and is in electrical communication with the first conductive pad and the second conductive pad. The electronic device is triggered in an instance in which the first conductive pad contacts the second conductive pad.

Various embodiments described herein illustrate an assembly of a mobile scanning device and a glove wherein the assembly comprises a glove that includes an anterior portion and a posterior portion. The anterior portion is knitted seamlessly with the posterior portion to define a metacarpal region and a plurality of finger regions extending out from the metacarpal region. A first conductive pad is knitted on the anterior portion of the glove. The first conductive pad is knitted on a distal end portion of a first finger region. A second conductive pad knitted on the posterior portion of the glove. Further, the second conductive pad is knitted on a second finger region. Further, the assembly comprises a mobile scanning device removably attached to the posterior portion and in electrical communication with the first conductive pad and the second conductive pad. The mobile scanning device is triggered in an instance in which the first conductive pad contacts the second conductive pad.

Various embodiments described herein illustrate a method for operating a mobile scanning device mounted on a glove. The method includes receiving, by a processor, an input to operate the mobile scanning device in a gesture association mode. Operating the mobile scanning device in the gesture association mode includes receiving, by the processor, at least one of a first trigger signal or a second trigger signal upon a worker performing a gesture on a glove. Further, operating the mobile scanning device in the gesture association mode comprises identifying, by the processor, a type of the gesture performed by the worker on the glove based on reception of the at least one of the first trigger signal or the second trigger signal. Furthermore, operating the mobile scanning device in the gesture association mode comprises associating the identified type of gesture with an operation of the mobile scanning device.

Various embodiments described herein disclose a triggering system that includes a glove. The glove includes an anterior portion. Further, the glove includes a posterior portion, wherein the anterior portion is knitted seamlessly with the posterior portion to define a metacarpal region, and a plurality of finger regions extending out from the metacarpal region. Further, the glove includes a first conductive pad knitted on the anterior portion of the glove, wherein the first conductive pad is knitted on a distal end portion of a first finger region of the plurality of finger regions. A second conductive pad is knitted on the posterior portion of the glove. The second conductive pad is knitted on a second finger region of the plurality of finger regions. Furthermore, the glove includes a third conductive pad knitted on the posterior portion of the glove, wherein the third conductive pad is knitted on the second finger region and is spaced apart from the second conductive pad. The triggering system further includes a mobile scanning device, removable attached to the posterior portion of the glove such that the first conductive pad, the second conductive pad, and the third conductive pad electrically couples with the mobile scanning device. The mobile scanning device includes a first trigger circuit configured to generate a first trigger signal when the first conductive pad is brought in contact with the second conductive pad. Further, the mobile scanning device includes a second trigger circuit configured to generate a second trigger signal when the first conductive pad is brought in contact with the third conductive pad. Additionally, the mobile scanning device includes a processor communicatively coupled to the first trigger circuit and the second trigger circuit. The processor is configured to receive at least one of the first trigger signal or the second trigger signal indicating upon a worker performing a gesture on the glove. Further, the processor is configured to identify a type of the gesture performed by the worker based on reception of the at least one of a duration of reception of the first trigger signal or the second trigger signal, or a sequence of reception of the first trigger signal and the second trigger signal. Furthermore, the processor is configured to trigger the mobile scanning device based on the identified type of gesture.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
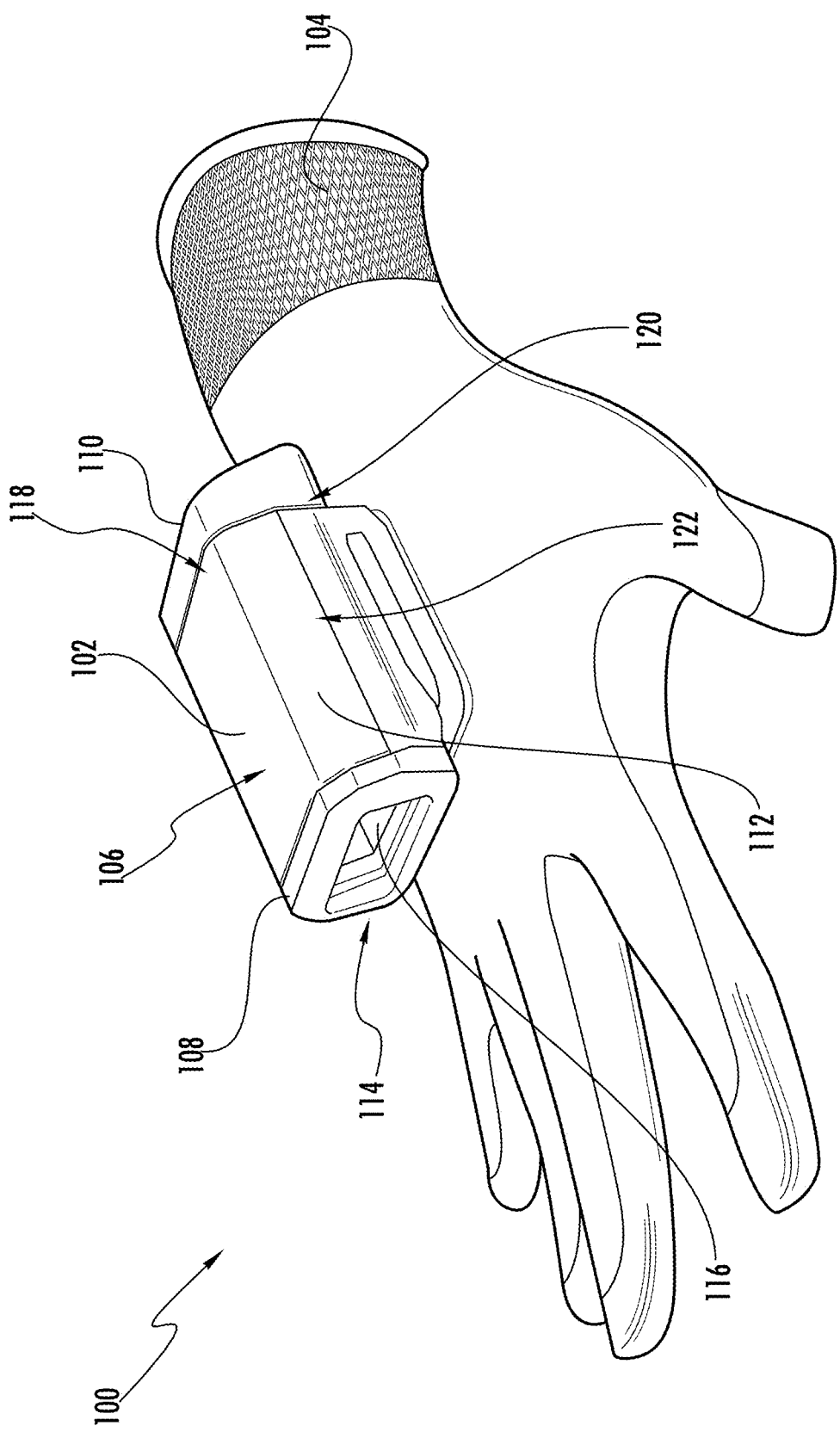
FIG. 1 illustrates an example assembly of a mobile scanning device mounted on a glove, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment)

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The phrase "mobile scanning device" corresponds to an electronic device that may be capable to detect/receive encoded data from a data source such as, but not limited to, a machine readable code, a Radio frequency identification tag, a Bluetooth tag, and/or the like. Further, the mobile scanning device may be configured to decode the encoded data. Some examples of the mobile scanning device may include, but not limited to, a bar code scanning device, a portable RFID reader, a portable printer, and/or the like.

In work environments such as warehouses and retails stores, a worker may have to roam around the facility to perform various operations. For example, the work may have to move around the facility to scan one or more machine readable codes so as to keep track of the items present in the warehouse. In some examples, the worker may use mobile scanning devices such as barcode scanners to scan the machine readable codes. Usually, the mobile scanning device occupy one of the hands of the worker, hence, the worker is left with only a single hand to perform other operations, such as holding an object to be scanned. Such a scenario may lead to accidental situations and may compromise the overall efficiency of the worker operating in the work environment.

Example embodiments described herein illustrate a knitted glove that, in some example embodiments, is knitted seamlessly using 3D knitting techniques. In an example embodiment, the glove includes an anterior portion and a posterior portion. The anterior portion corresponds to a portion of the glove that is representative of a palm side of worker's hand (e.g., ventral side of the worker's hand). Further, the posterior portion corresponds to a portion of the glove that is representative of a rear side of the worker's hand (e.g., dorsal side).

Both, the anterior portion of the glove and the posterior portion of the glove, include an inner surface and an outer surface. In some examples, the inner surface of both the anterior portion of the glove and the posterior portion of the glove contact the worker's hand when the worker inserts hand in the glove. Further, in some examples, the outer surface of both the anterior portion of the glove and the posterior portion of the glove is exposed to the ambient environment around the glove. Further, the anterior portion of the glove and the posterior portion of the glove may be divided into regions based on the region of the hand that comes into their respective contact. Examples of such regions include, but are not limited to, a metacarpal region and a plurality of finger regions. The metacarpal region of the glove is configured to receive the metacarpal region of the worker's hand, while the plurality of finger regions is configured to receive the fingers. The metacarpal region of a hand forms the palm of the hand.

During the knitting of the glove, a first conductive pad is knitted on the anterior portion of the glove using a conductive yarn. In some examples, the first conductive pad is knitted on a distal end portion of a first finger region. Similarly, a second conductive pad is knitted on the posterior portion of the glove on a second finger region. In an example embodiment, the second finger region is different region when compared to the first finger region. For example, the first finger region may be configured to receive a thumb while the second finger region may be configured to receive a middle finger of the worker's hand. In other examples, the first region may be configured to receive a pointer or index finger, while the second finger region may be configured to receive a ring finger.

The glove may further include a plurality of first via holes that are configured to receive a plurality of couplers. One or more of the plurality of couplers are in electrical communication with at least one of the first conductive pad and/or the second conductive pad. Further, the plurality of couplers enable attachment of the mobile scanning device on the posterior portion of the glove. For example, the mobile scanning device may be configured to be mounted on the first via holes on the metacarpal region in the posterior portion of the glove through the plurality of couplers. Upon attachment of the mobile scanning device on the glove, the mobile scanning device is in electrical communication with the first conductive pad and the second conductive pad through the one or more of the plurality of couplers, such that, in some examples, when the first conductive pad contacts the second conductive pad, the mobile scanning device is triggered.

In some example embodiments, due to work environment in which the worker operates, the glove may get wet. For example, due to sweat in the hand of the worker the glove may get wet. When the glove is wet, the first conductive pad and the second conductive pad may become electrically coupled or may electrically communicate with each other without worker explicitly bringing the two conductive pads (first conductive pad and the second conductive pad) in contact. This may cause mobile scanning device to falsely trigger. To avoid false triggering of the mobile scanning device, the mobile scanning device includes, in some examples, a trigger circuit that prevents such false triggering of the mobile scanning device.

FIG. 1 illustrates an example assembly 100 of a mobile scanning device 102 mounted on a glove 104, according to one or more embodiments described herein.

In some examples herein, the mobile scanning device 102 takes the form of a bar code scanning device. Alternatively or additionally, the mobile scanning device 102 may correspond to other devices that are mountable on the glove 104, such as a portable RFID reader, a mobile printer, a mobile device, such as a phone, smart device, watch, a camera, a recording device, and/or the like.

In an example embodiment, the mobile scanning device 102 has a housing 106 having a first end portion 108, a second end portion 110, and a body portion 112. The body portion 112 extends between the first end portion 108 and the second end portion 110. In an example embodiment, the first end portion 108 defines a window 114 that is configured to receive an image capturing assembly 116. In an example embodiment, the image capturing assembly 116 may be configured to capture an image or scan an object. The image capturing assembly 116 may include an illumination assembly to illuminate a field of view of the imaging capturing assembly. The illumination assembly may, for example, include an illumination source, an illuminating optics assembly, such as one or more lenses, diffusers, wedges, reflectors or a combination of such elements, for directing light from illumination source in the direction of the field of view. For example, if the image of an object is to be captured, the illumination assembly may be configured to direct the light on the object. Some examples of the illumination source may include, for example, laser or light emitting diodes (LEDs) such as white LEDs or red LEDs. Further, the image capturing assembly 116 includes an imaging assembly that may further include an image sensor, such as a color or monochrome 1D or 2D CCD, CMOS, NMOS, PMOS, CID or CMD solid state image sensor, together with an imaging optics assembly for receiving and focusing an incident light (from the ambient) on the image sensor.

In some examples, the scope of the disclosure is not limited to the first end portion 108 defining the window 114 that is configured to receive the image capturing assembly 116. Indeed, any other assembly may be received at the first end portion 108 depending on type of the mobile scanning device 102. For example, where the mobile scanning device 102 corresponds to an RFID reader, the first end portion 108 may be configured to receive an RF antenna that may be configured to receive RF signal from the RFID tags. Similarly, other applications may be contemplated.

In an example embodiment, the body portion 112 has a top surface 118, and a bottom surface 120. In an example embodiment, the bottom surface 120 is configured to receive an adapter module 122 that facilitates mounting of the mobile scanning device 102 on the glove 104. The structure of the glove 104 is described in conjunction with FIGS. 3, 4, 5, and 6.

Figure 2:
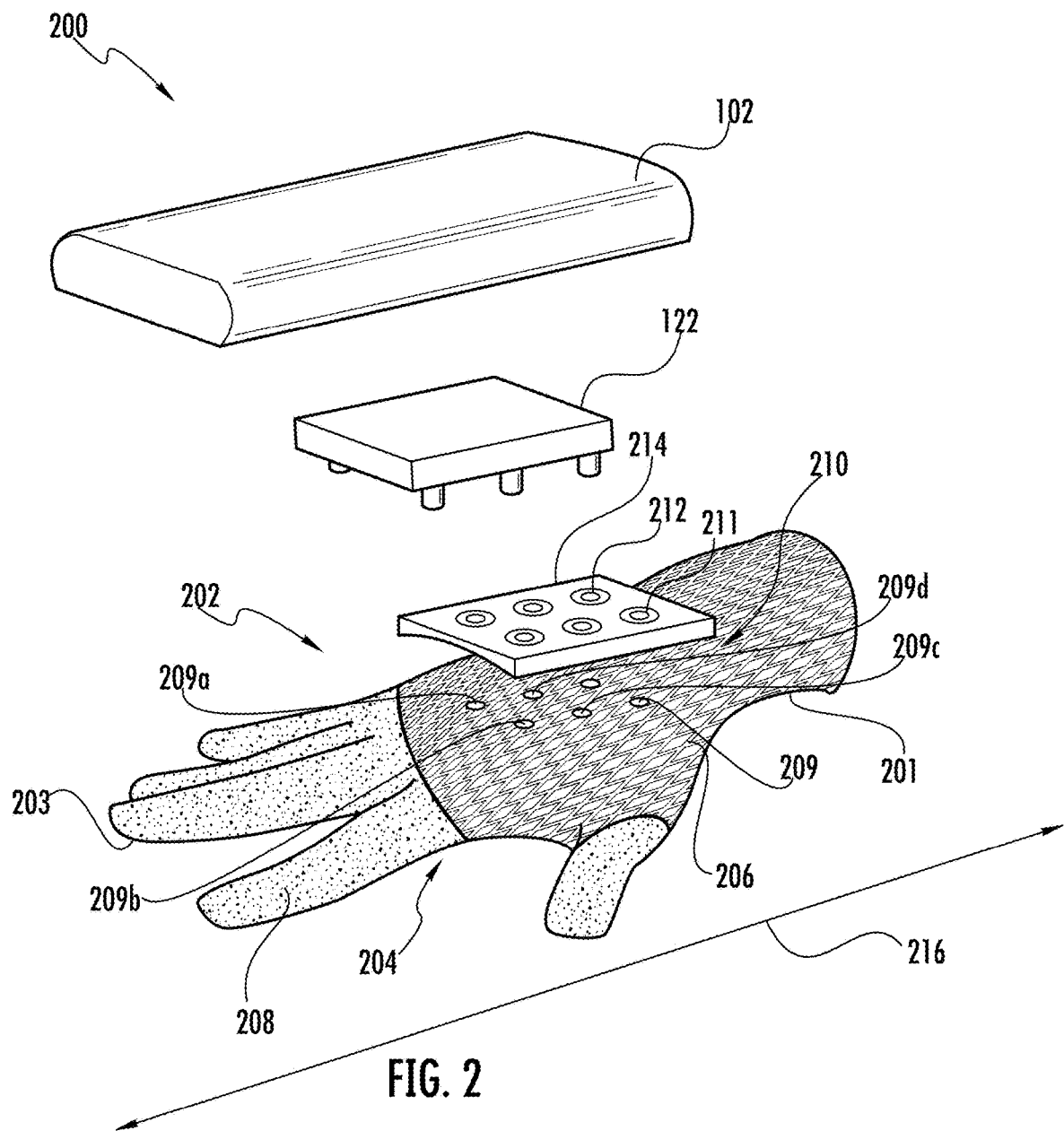
FIG. 2 illustrates an exploded view of an assembly of the mobile scanning device and the glove, according to one or more embodiments described herein.

FIG. 2 illustrates an exploded view 200 of the assembly of the mobile scanning device 102 and the glove 104, according to one or more embodiments described herein. Referring to exploded view 200, the glove 104 comprises a posterior portion 202 and an anterior portion 204. In some embodiments, the anterior portion 204 of the glove 104 corresponds to a portion of the glove 104 that represents a palm side of worker's hand (e.g., ventral side of the worker's hand). Further, the posterior portion 202 corresponds to a portion of the glove 104 that represents a rear side of the worker's hand (e.g., dorsal side). In an example embodiment, when a worker of the mobile scanning device 102 inserts her hand in the glove 104, the ventral side of the hand contacts an inner surface (not shown) of the anterior portion 204 of the glove 104. Further, the dorsal side of the hand contacts an inner surface (not shown) of the posterior portion 202 of the glove 104.

In some examples, the glove 104 includes a first end 201 and a second end 203. The first end 201 is positioned proximal to a wrist of worker's hand when the worker inserts the hand in the glove 104. Further, the second end 203 is positioned distal from the first end 201. Further, the glove 104 includes a metacarpal region 206 and a plurality of finger regions 208. In some example embodiments, the metacarpal region 206 extends from the first end 201 of the glove 104 to the plurality of finger regions 208. In an example embodiment, the metacarpal region 206 is further configured to receive a metacarpal region of worker's hand, when the worker inserts the hand in the glove 104. In some examples, the metacarpal region of the worker's hand constitutes the palm of the hand.

The plurality of finger regions 208 extend out from the metacarpal region 206 of the glove 104 to the second end 203. Further, the plurality of finger regions 208 are configured to receive the fingers on the worker's hand.

The metacarpal region 206 on the posterior portion 202 of the glove 104 comprises a plurality of first via holes 209 that extend from an outer surface 210 of the posterior portion 202 of the glove 104 to the inner surface (not shown) of the posterior portion 202 of the glove 104. The plurality of first via holes 209 is configured to receive a plurality of couplers 212. The structure of the plurality of couplers 212 has been described in conjunction with FIGS. 10, 11, 12, and 13.

In an example embodiment, the metacarpal region 206 on the posterior portion 202 of the glove 104 is further configured to receive a pad 214 on the outer surface 210. In some example embodiments, the pad 214 is sewn on the outer surface 210 of the metacarpal region 206 in such a manner that a plurality of second via holes 211 on the pad 214 aligns with the plurality of first via holes 209. In an example embodiment, the plurality of couplers 212 extend through the plurality of first via holes 209 into the plurality of second via holes 211. The structure of the pad 214 has been further described in conjunction with FIGS. 8 and 9. The plurality of couplers 212 further facilitate coupling of the mobile scanning device 102 on the pad 214. The coupling of the mobile scanning device 102 on the pad 214 is described in conjunction with FIGS. 14, 15, 16, 17, and 18.

Figure 3:
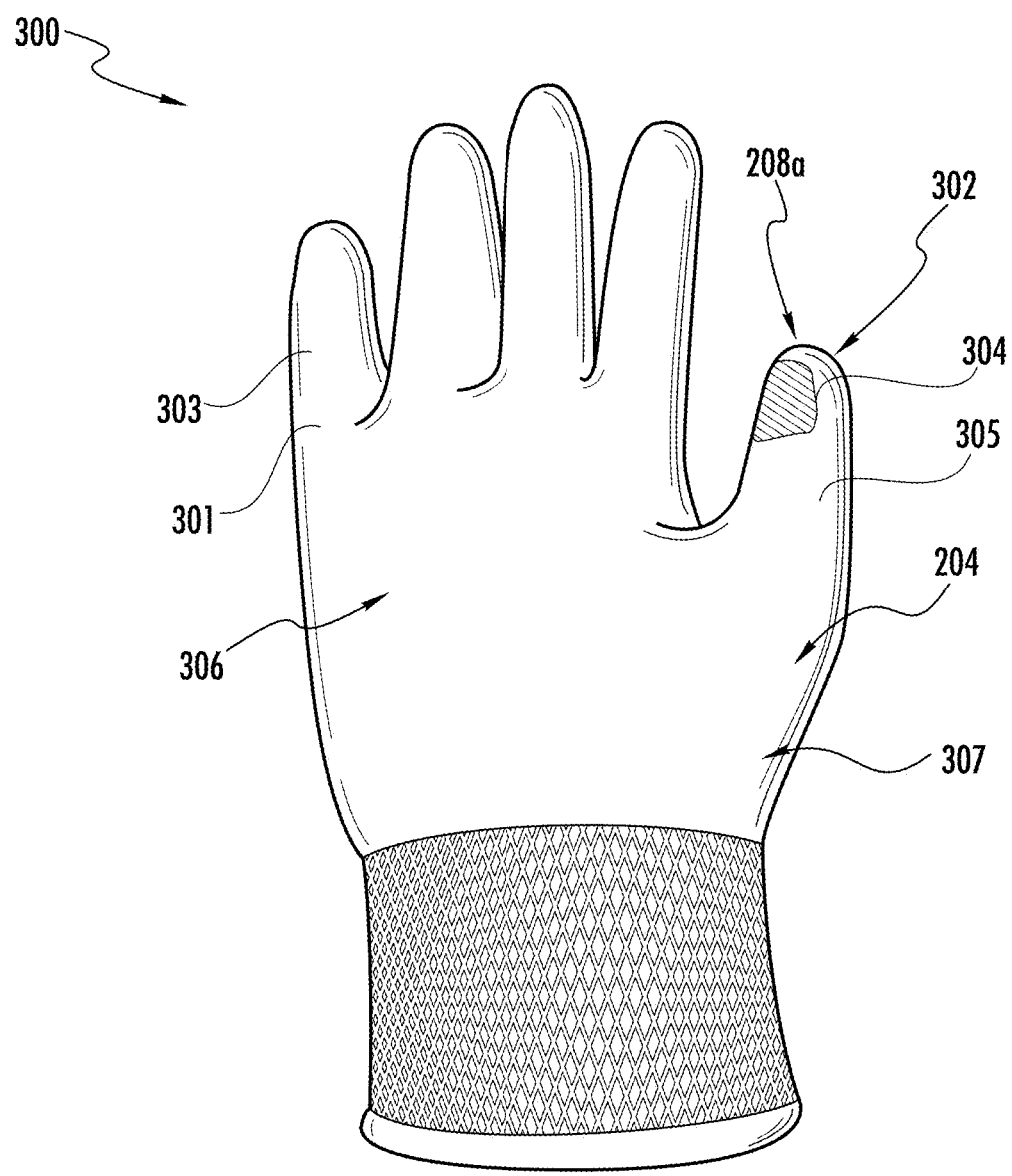
FIG. 3 illustrates a front view of a glove, according to one or more embodiments described herein.
Figure 4:
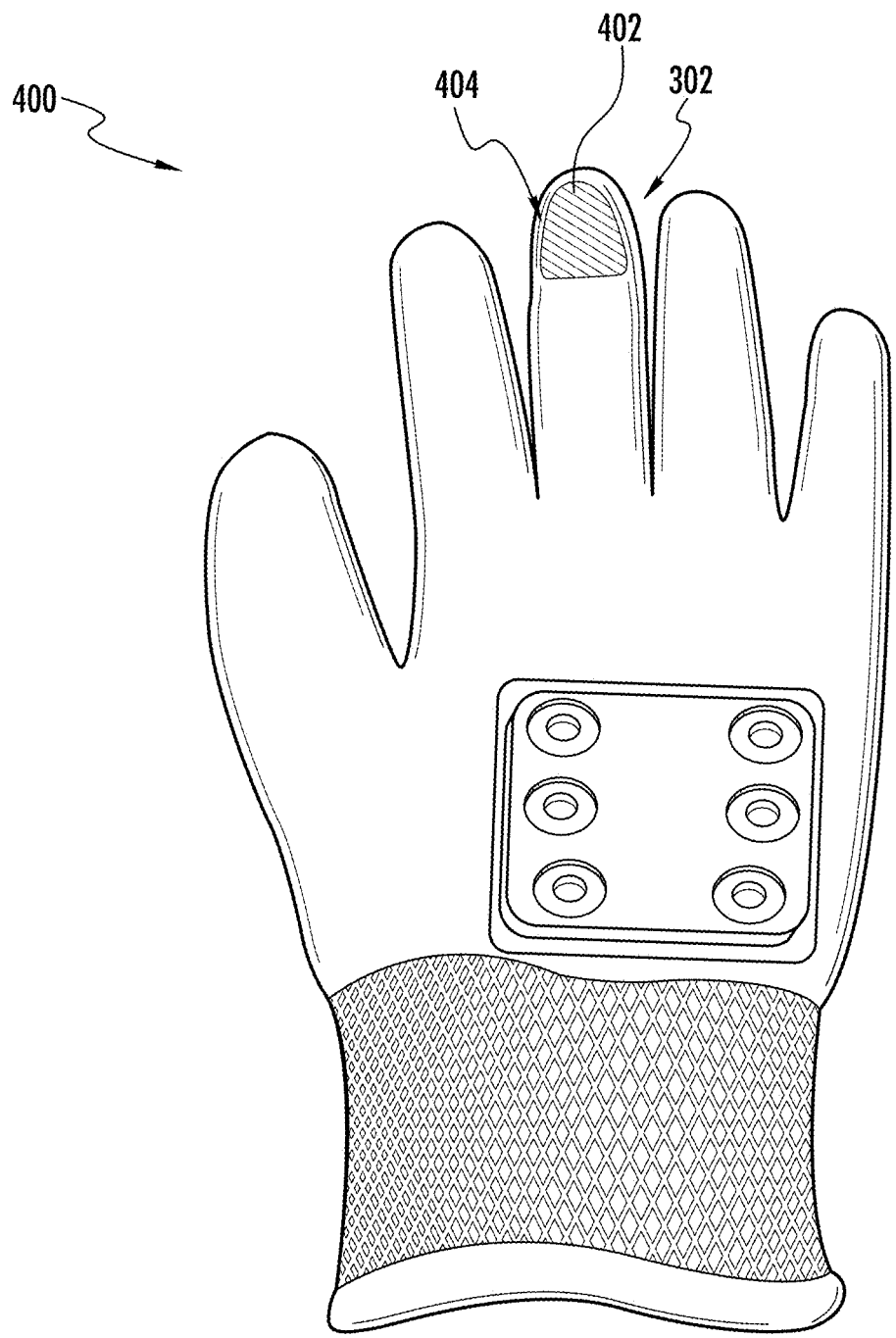
FIG. 4 illustrates a rear view of a glove, according to one or more embodiments described herein.

FIG. 3 and FIG. 4 illustrate a front view 300 and a rear view 400 of the glove 104, according to one or more embodiments described herein. Referring to the front view 300, the anterior portion 204 of the glove 104 has an outer surface 301. Each of the plurality of finger regions includes a distal end portion 302, a proximal end portion 301, and a middle portion 303. In some example embodiments, the proximal end portion 301 is proximal to the metacarpal region 206 of the glove 104. The middle portion 303 starts at the distal end of proximal end portion 301 and terminates at the proximal end of distal end portion 302. The distal end portion 302 begins at the distal end of middle portion 303 and extends to the end of a finger region.

In some example embodiments, the distal end portion 302 of a first finger region 208a of the plurality of finger regions 208 has a first conducting pad 304. For example, a thumb region 305 of the plurality of finger regions 208 includes the distal end portion 302 that further includes the first conducting pad 304. The thumb region 305 is configured to receive the thumb on the worker's hand. In an example embodiment, the first conducting pad 304 is formed by knitting a conductive yarn on the outer surface 307 of the anterior portion 204.

In an example, the conductive yarn corresponds to a thread that is capable to transmit electrical signals. Some examples of the conductive yarn may include, but not limited to, a silver coated poly-ethylene, a silver coated nylon, and/or the like. In an example embodiment, the first conducting pad 304 is knitted on the anterior portion 204 of the glove 104 and does not extend to the posterior portion 202 of the glove 104.

Additionally or alternatively, the glove 104 may comprise an abrasive coating 306 (refer to front view 300) disposed on the anterior portion 204 of the glove 104. The abrasive coating 306 on the glove 104 increases a friction coefficient of the glove 104 thereby reducing the slippage of object being held by the worker wearing the glove 104. In an example embodiment, the abrasive coating 306 may be formed from group consisting of polyurethane, nitrile latex, natural latex, polyvinylchloride (PVC), polyvinylacetate (PVA), neoprene (polychloroprene) and rubber. In some examples, the abrasive coating 306 may be a multi-layer coating that includes two or more layers of polyurethane, nitrile latex, natural latex, polyvinylchloride (PVC), polyvinylacetate (PVA), neoprene (polychloroprene) and rubber. In an example embodiment, the thickness of the abrasive coating is such that a portion of the conductive yarn (knitted to form the first conductive pad 304) extends out from the abrasive coating 306. Therefore, the conductivity of the first conductive pad 304 is unaffected from the abrasive coating 306, as is illustrated further in FIG. 7. In an example embodiment, the thickness of the abrasive coating 306 on the glove 104 is at most 0.6 mm. Additionally or alternately, the abrasive coating may be disposed on the posterior portion 202 of the glove 104.

Referring to the rear view 400, the posterior portion 202 of the glove 104 has an outer surface 210 that, in some examples, extends along the length of the glove 104. A second conductive pad 402 is knitted on the distal end portion 302 of a second finger region 404 of the plurality of finger regions 208. In an example embodiment, the second conductive pad 402 is knitted using the conductive yarn on the outer surface 210 of posterior portion 202.

In some examples, the second finger region 404 is different from the first finger region 208a. For example, the second finger region 404 represents a middle finger region 404, while the first finger region 208a represents the thumb region 305. In an example embodiment, the second conductive pad 402 is knitted on the posterior portion 202 of the glove 104 and does not extend to the anterior portion 204 of the glove 104. That is, each conductive pad is configured to be on opposite sides of the glove.

The outer surface 210 of the posterior portion 202 defines the plurality of first via holes 209 in the metacarpal region 206 of the glove 104. As discussed supra, the plurality of first via holes 209 is configured to receive the plurality of couplers 212, as is further described in conjunction with FIGS. 10-13.

Figure 5:
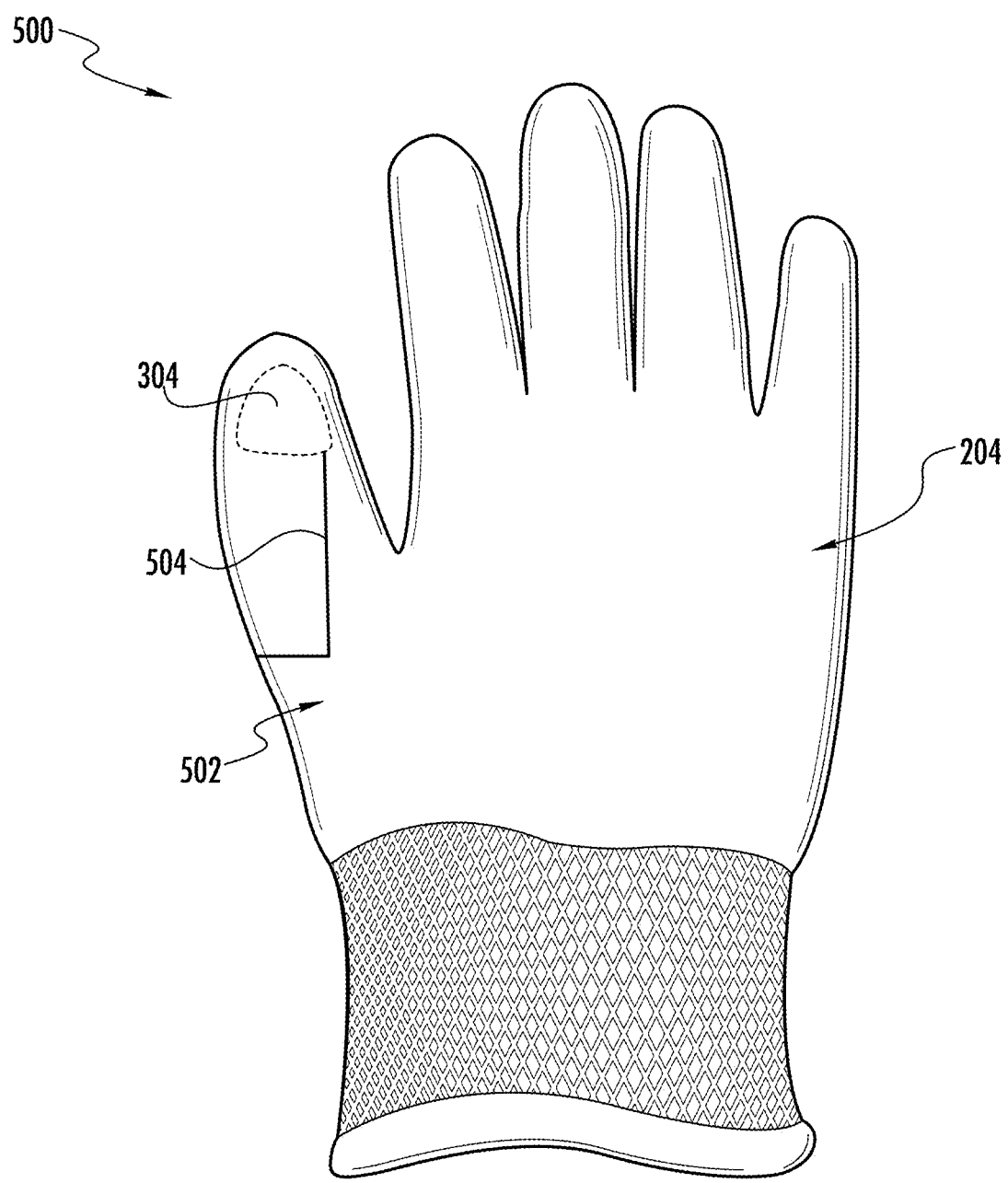
FIG. 5 illustrates a front view of a glove inside out, according to one or more embodiments described herein.
Figure 6:
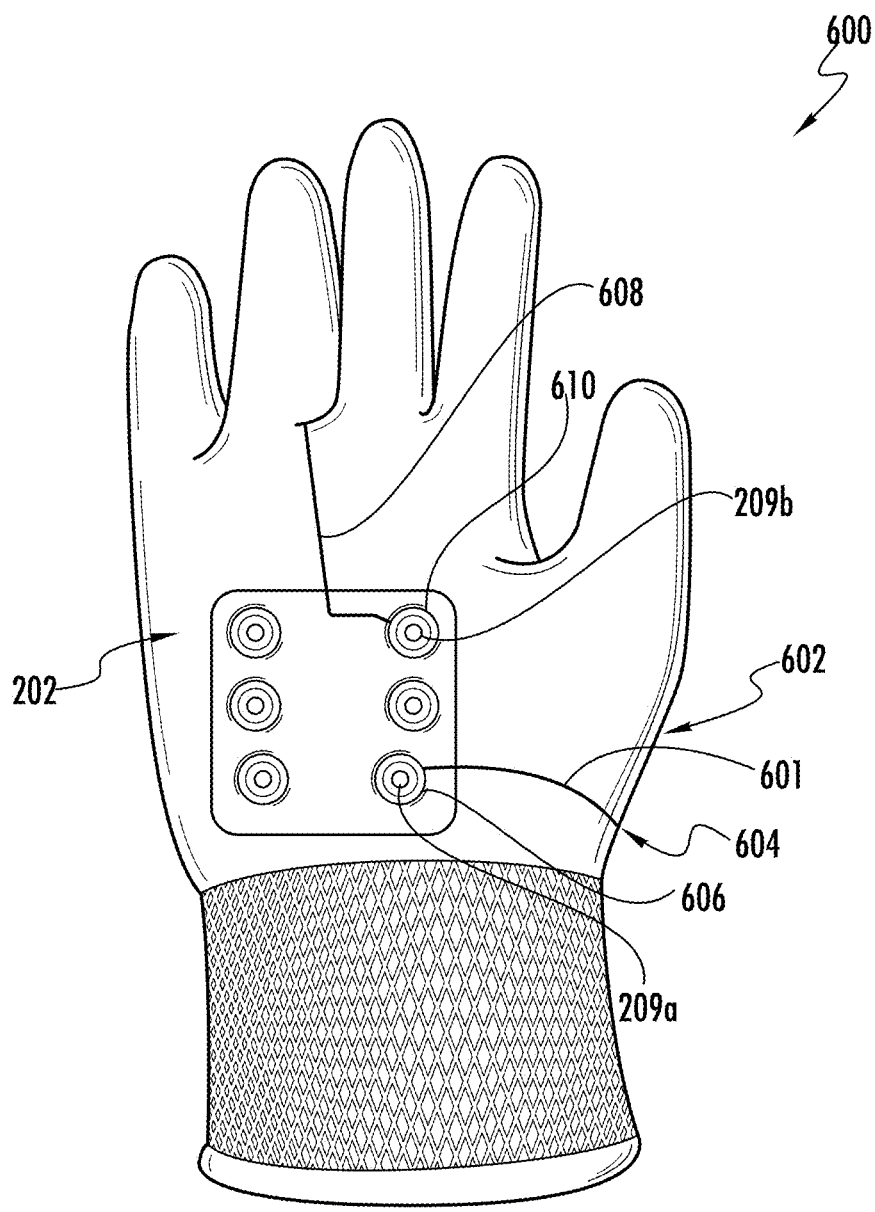
FIG. 6 illustrates a rear view of a glove inside out, according to one or more embodiments described herein.

FIG. 5 and FIG. 6 illustrate a front view 500 and a rear view 600 of the glove 104 inside out, according to one or more embodiments described herein.

Referring to the front view 500, it can be observed that the anterior portion 204 of the glove 104 has an inner surface 502. Further, the anterior portion 204 includes a first portion of a first conductive path 504 that is knitted on the inner surface 502 of the anterior portion 204. Further, the first portion of the first conductive path 504 extends from the first conductive pad 304 (knitted on the outer surface 307 of the anterior portion 204) to the posterior portion 202 of glove 104. In an example embodiment, the first portion of the first conductive path 504 is knitted using conductive yarn.

Referring to the rear view 600, it can be observed that the posterior portion 202 of the glove 104 has an inner surface 602. Further, the posterior portion 202 includes a second portion of a first conductive path 604 that is knitted on the inner surface 602 of the posterior portion 202. In an example embodiment, the first portion of the first conductive path 504 and the second portion of the first conductive path 604 are seamlessly knitted together to form the first conductive path 601 that extends from the first conductive pad 304 to a first conductive region 606, such that, the first conductive region 606 is in electrical communication with the first conductive pad 304 (formed on the outer surface 307 of the anterior portion 204 of the glove 104). In some examples, the first conductive region 606 is knitted on a periphery of a first via hole 209a of the plurality of first via holes 209.

Referring to the rear view 600, a second conductive path 608 is knitted on the inner surface 602 of the posterior portion 202 of the glove 104. In an example embodiment, the second conductive path 608 electrically couples, and/or other brings into electrical communication, the second conductive pad 402 with a second conductive region 610 knitted around a periphery of a first via hole 209b of the plurality of first via holes 209. In an example embodiment, the second conductive region 610 is knitted on the inner surface 602 of the posterior portion 202 of the glove 104. In an example embodiment, the second conductive region 610 and the second conductive path 608 is knitted using the conductive yarn.

In an example embodiment, the glove 104 is manufactured using one or more known 3D knitting techniques. In some examples, the glove 104 may therefore be manufactured as a single piece. In an example embodiment and during manufacturing of the glove 104, various the conductive and the non-conductive yarns are knitted together to form the first conductive pad 304, the second conductive pad 402, the first conductive path 601 (formed by combination of the first portion of the first conductive path 504 and the second portion of the first conductive path 604), and the second conductive path 608. Further, the conductive and non-conductive yarns are knitted in such a manner that the first conductive path, and the second conductive path 608 are formed on the inner surface 502 of the anterior portion 204 of the glove 104 and the inner surface 602 of the posterior portion 202 of the glove 104, respectively. Additionally, the conductive and non-conductive yarns are knitted in such a manner that the first conductive pad 304 and the second conductive pad 402 are formed on the outer surface 307 of the anterior portion 204 of the glove 104 and the outer surface 210 of the posterior portion 202 of the glove 104, respectively.

Figure 7:
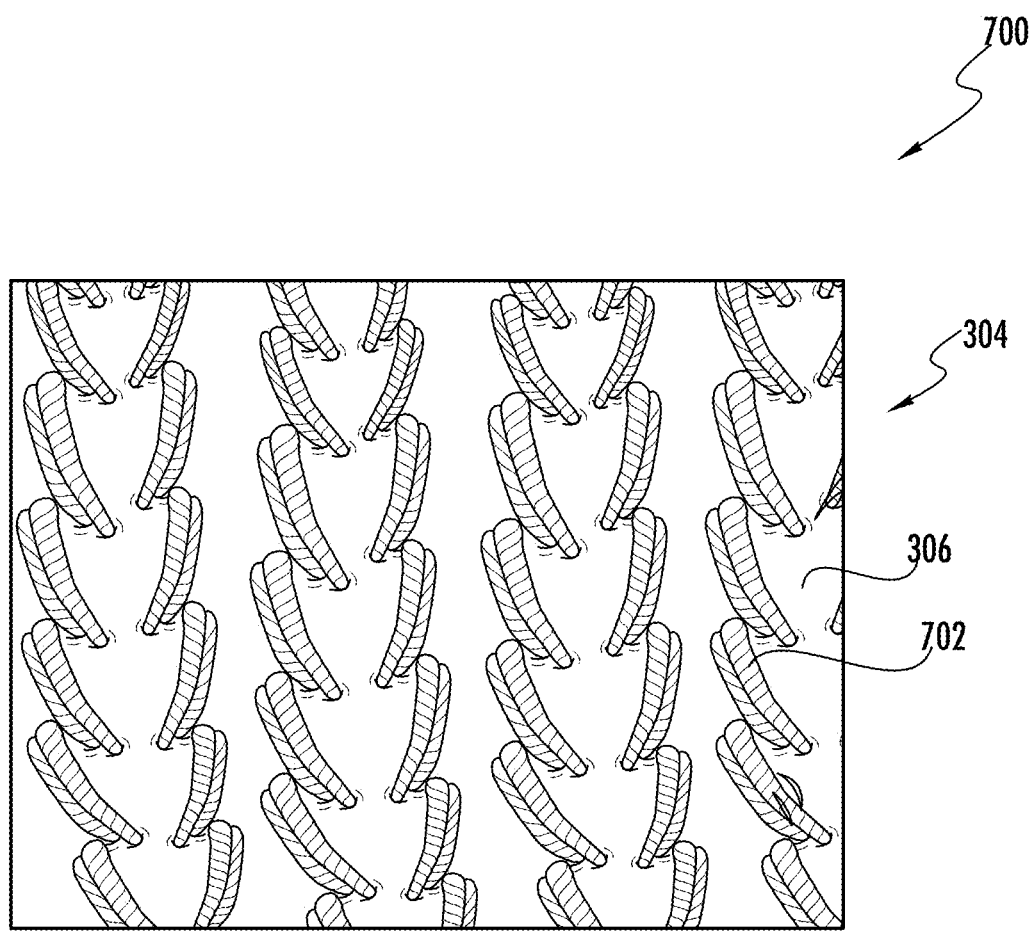
FIG. 7 illustrates a zoomed-in view of a first conductive pad, according to one or more embodiments described herein

FIG. 7 illustrates an exploded view 700 of the first conductive pad 304, according to one or more embodiments described herein. Referring to the exploded view 700, the first conductive pad 304 includes the knitted conductive yarn 702 and the abrasive coating 306. It can be observed that the knitted conductive yarn 702 extends out from the abrasive coating 306 and is therefore exposed to the ambient environment around the glove 104. Similarly, the conductive yarn knitted to form the second conductive pad 402 is also exposed to the ambient environment around the glove 104.

In an example embodiment, when the worker (e.g., wearing the glove 104) causes the first conductive pad 304 to touch or contact with the second conductive pad 402, the first conductive region 606 (e.g., electrically coupled with the first conductive pad 304) becomes electrically coupled or electrically communicates with the second conductive region 610 (e.g., electrically coupled with the second conductive pad 402).

Figure 8:
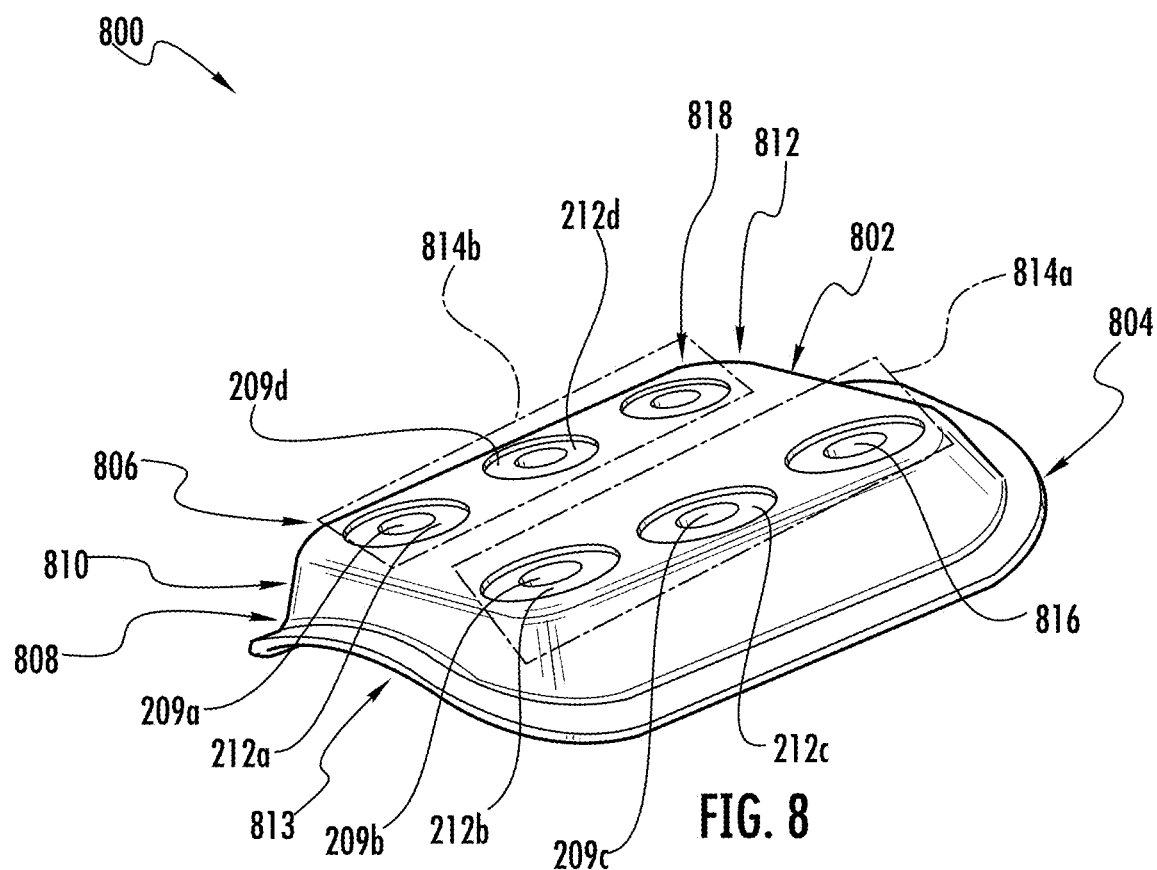
FIG. 8 illustrates a perspective view of a pad, according to one or more embodiments described herein.
Figure 9:
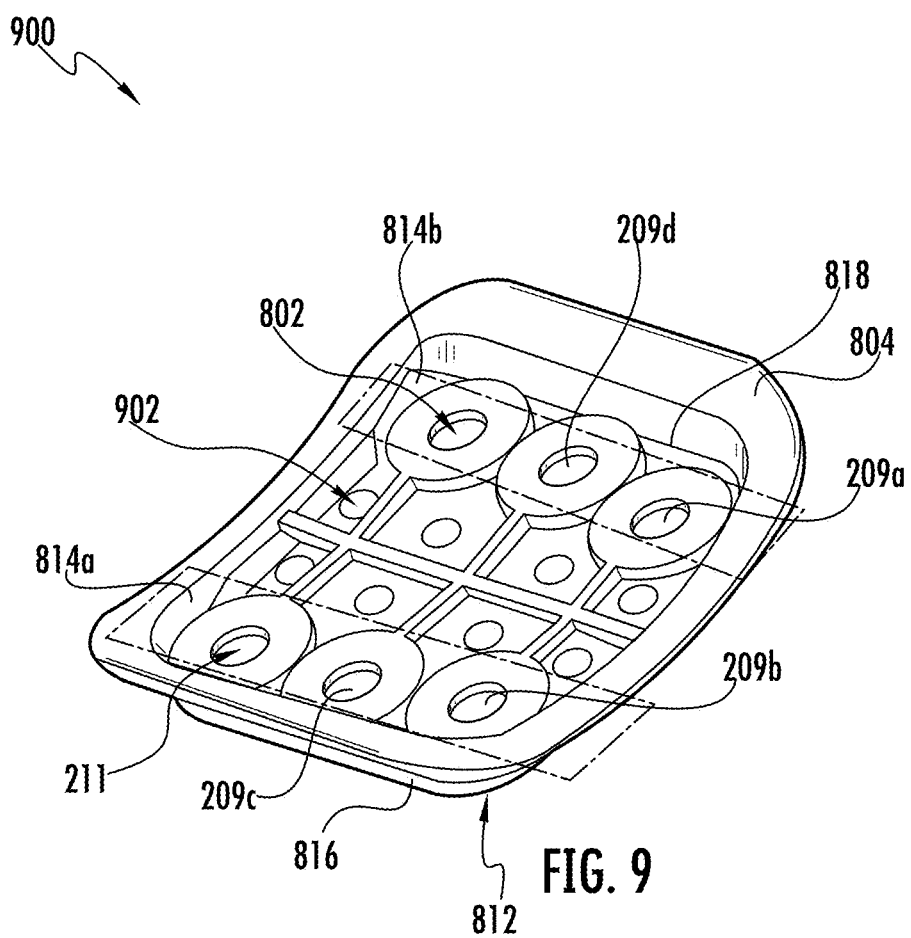
FIG. 9 illustrates another perspective view of a pad, according to one or more embodiments described herein.

FIG. 8 and FIG. 9 illustrate a perspective view 800 and a perspective view 900 of the pad 214, according to one or more embodiments described herein.

Referring to the perspective view 800, the pad 214 may include a casing 802, and a lining 804. The casing 802 is composed of a non-conductive material such as, but not limited to, a plastic. The casing 802 includes a top end portion 806, a bottom end portion 808, and a body portion 810.

The top end portion 806 of the pad 214 is configured to receive the mobile scanning device 102. In an example embodiment, the top end portion 806 has a top surface 812 that substantially corresponds to a rectangular surface. In some embodiments, when the pad 214 couples with the glove 104, the length of the top surface 812 aligns with a longitudinal axis 216 of the glove 104. In an example embodiment, the top surface 812 of the pad 214 defines the plurality of second via holes 211 that extend from top surface 812 to a bottom surface 902 (refer to FIG. 9) of the top end portion 806.

The body portion 810 extends between the top end portion 806 and the bottom end portion 808. In an example embodiment, the body portion 810 extends non-uniformly between the top end portion 806 and the bottom end portion 808. For example, the body portion 810 extends non-uniformly along the width of the top end portion 806 such that a length of the body portion 810 varies along the width of the top end portion 806. In some embodiments, the varying length of the body portion 810 along the width of the top end portion 806 defines a shape of the bottom end portion 808 along the width of the top end portion 806. For example, the length of the body portion 810 varies in such a manner that the bottom end portion 808 has an arch shape (depicted by 813) along the width of the pad 214. In some embodiments, the arch shape 813 of the bottom end portion 808 allows the pad 214 to ergonomically sit on top of the hand of the worker, when the hand is inserted in the glove 104. In an example embodiment, the body portion 810 extends uniformly between the top end portion 806 and the bottom end portion 808, along the length of the top end portion 806.

The lining 804 is coupled to the bottom end portion 808 of the casing 802 around a periphery of the bottom end portion 808. In an example embodiment, the lining 804 extends outward from the bottom end portion 808 of the casing 802. In some embodiments, the lining 804 is composed of a soft and flexible material such as, but not limited to, rubber. In an example embodiment, using soft and flexible material as the lining 804 further improves the ergonomics of the pad 214. For instance, due to presence of the rubber, an impact of the sharp edges of the bottom end portion 808, of the casing 802, on the hand of the worker is much less in comparison to a scenario where the pad 214 only includes the casing 802.

Referring to the perspective view 900, the bottom surface 902 of the top end portion 806 (of the casing 802) defines the plurality of second via holes 211. As discussed, the plurality of second via holes 211 extends from the top surface 812 to the bottom surface 902. In some embodiments, the plurality of second via holes 211 includes a first set of second via holes 814a and a second set of second via holes 814b. The first set of second via holes 814a are defined along the length of the top end portion 806 of the casing 802. Further, the first set of second via holes 814a is defined to be proximal to a first edge 816 of the top end portion 806 and distal from the second edge 818 of the top end portion 806. Similarly, the second set of second via holes 814b is defined to be proximal to the second edge 818 of the top end portion 806 and distal from the first edge 816 of the top end portion 806.

In some embodiments, a distance between any two adjacent second via holes in the first set of second via holes 814a is same. Similarly, a distance between any two adjacent second via holes in the second set of second via holes 814b is same.

In some embodiments, the scope of the disclosure is not limited to having six second via holes in the plurality of second via holes 211, as is depicted in FIGS. 8 and 9. In alternate embodiment, the pad 214 may have any number of via holes in the plurality of second via holes 211.

In an example embodiment, to couple the pad 214 to the glove 104, the pad 214 is first positioned on the outer surface 210 of the posterior portion 202 of the glove 104 in such a manner that the plurality of second via holes 211 defined in pad 214 aligns with the plurality of first via holes 209 defined in the metacarpal region 206 of the posterior portion 202 of the glove 104. Thereafter, the lining 804 is sewn on the metacarpal region 206. In an example embodiment, prior to sewing the pad 214 on glove 104, the plurality of first via holes 209 receive the plurality of couplers 212 in such a manner that when the pad 214 is sewn on the metacarpal region 206, the plurality of couplers 212 (received in the plurality of first via holes 209) are received in the plurality of second via holes 211 in the pad 214. The structure of the plurality of couplers 212 is herein described in conjunction with FIGS. 10-13

Figure 10:
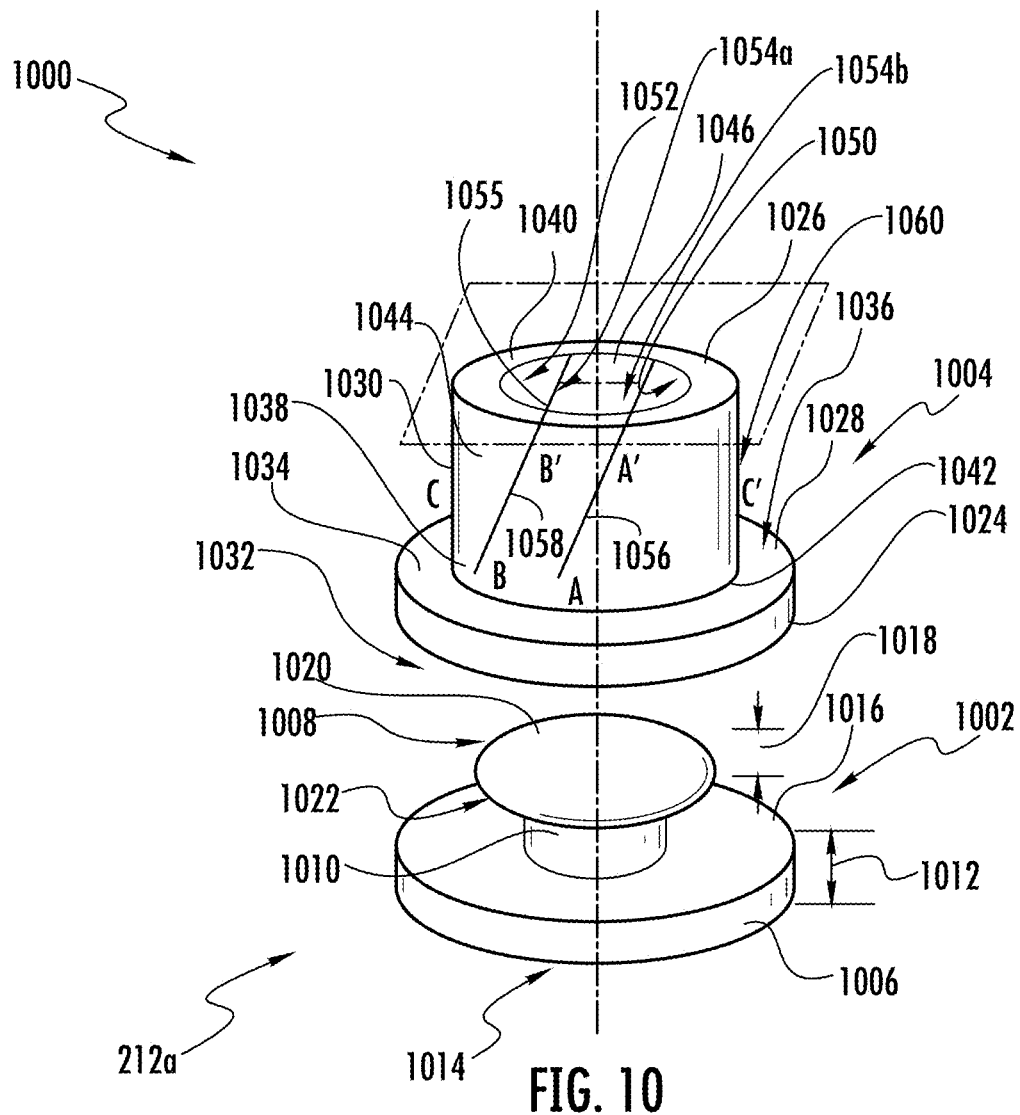
FIG. 10 illustrates an exploded view of a coupler, according to one or more embodiments described herein.

FIG. 10 illustrates an exploded view 1000 of a coupler 212a of the plurality of couplers 212, according to one or more embodiments described herein. The coupler 212a includes a first conductive connector 1002 and a second conductive connector 1004.

The first conductive connector 1002 includes a base section 1006 and a cap section 1008. A leg section 1010 connects the base section 1006 with the cap section 1008. In an example embodiment, the base section 1006 corresponds to a circular plate of a defined thickness (depicted by 1012). The base section 1006 has a bottom surface 1014 and a top surface 1016. The leg section 1010 extends from the top surface 1016 to the cap section 1008. The cap section 1008 also corresponds to a circular plate of a defined thickness (depicted by 1018). In an example embodiment, the diameter of the cap section 1008 is less in comparison to the diameter of the base section 1006. Further, the cap section 1008 has a top surface 1020 and a bottom surface 1022. In an example embodiment, the leg section 1010 extends from the bottom surface 1022 of the cap section 1008 to the top surface 1016 of the base section 1006. In an example embodiment, the first conductive connector 1002 is configured to be received in one of the first via hole 209a of the plurality of first via holes 209, as is further in conjunction with FIG. 11.

The second conductive connector 1004 has a first end 1024, a second end 1026, a base section 1028, and a cylindrical section 1030. In an example embodiment, the base section 1028 corresponds to a circular plate that extends between the first end 1024 and the cylindrical section 1030. The cylindrical section 1030 extends from the base section 1028 to the second end 1026.

In an example embodiment, the base section 1028 has a bottom surface 1032 and a top surface 1034. In an example embodiment, the cylindrical section 1030 extends from the top surface 1034 of the base section 1028 to the second end 1026. In an example embodiment, the diameter of the base section 1028 is greater than the diameter of the cylindrical section 1030 such that a step 1036 is formed at a junction 1038 between the base section 1028 and the cylindrical section 1030.

In an example embodiment, the cylindrical section 1030 has a top end section 1040, a bottom end section 1042, and a body section 1044. The body section 1044 extends between the top end section 1040 and the bottom end section 1042.

In an example embodiment, the second conductive connector 1004 further includes a bore 1046 that extends from the top end section 1040 of the cylindrical section 1030 to the bottom surface 1032 of the base section 1028. In an example embodiment, when the coupler 212a couples to the glove 104, the bottom surface 1032 of the base section 1028 abuts the outer surface 210 of the posterior portion 202 of the glove 104. Further, the when the coupler 212a couples to the glove 104, the bore 1046 aligns with the first via hole 209a. Further, the bore 1046 of the second conductive connector 1004 is configured to receive the cap section 1008 of the first conductive connector 1002. More particularly, the second conductive connector 1004 is configured to receive the cap section 1008 in the bore 1046 from the base section 1028.

In an example embodiment, the bore 1046 has a wall 1050 defined by an inner surface 1052 of the second conductive connector 1004. The inner surface 1052 of the second conductive connector 1004 defines one or more pair of slots 1054a and 1054b such that the slots in the pair of slots (for example the pair of slot 1054a) are defined opposite to each other along a horizontal axis A-A' (depicted by 1056). Further, the pair of slots (for example the pair of slot 1054a) are defined at an offset from a central longitudinal axis B-B' (depicted by 1058) of the second conductive connector 1004. Similarly, the pair of slots 1054b are defined on the inner surface 1052 of the bore 1046. In an example embodiment, the pair of slots 1054b and the pair of slots 1054a are defined in a same horizontal plane C-C' (depicted by 1060). Further, the pair of slots 1054b and the pair of slots 1054a are defined on the inner surface 1052 of the second conductive connector 1004 proximal to the second end 1026 of the second conductive connector 1004 and distal from the first end 1024 of the second conductive connector 1004. Further, each of the one or more pair of slots 1054a and 1054b is configured to receive an engagement member 1055. In some example embodiments, the engagement member 1055 may correspond to a metal wire that is received in a pair of slots (for example, the pair of slots 1054a) of the one or more pair of slots 1054a and 1054b.

In some embodiment, the scope of the disclosure is not limited to having the one or more pair of slots 1054a and 1054b (defined in the bore 1046) to receive the engagement member 1055. In an alternate embodiment, the inner surface 1052 of the bore 1046 may define an annular protrusion proximal to the second end 1026. The annular protrusion may correspond to the engagement member 1055.

To couple the coupler 212a to the glove 104, the second conductive connector 1004 is positioned on the outer surface 210 of the posterior portion 202 of the glove 104 in such a manner that the bore 1046 aligns with a first via hole 209a of the plurality of first via holes 209. Thereafter, the first conductive connector 1002 is received in the first via hole 209a from the inner surface 502 of the glove 104 in such a manner that the cap section 1008 of the first conductive connector 1002 passes through the first via hole 209a into the bore 1046. Further, the cap section 1008 snap fits into the bore 1046.

Figure 11:
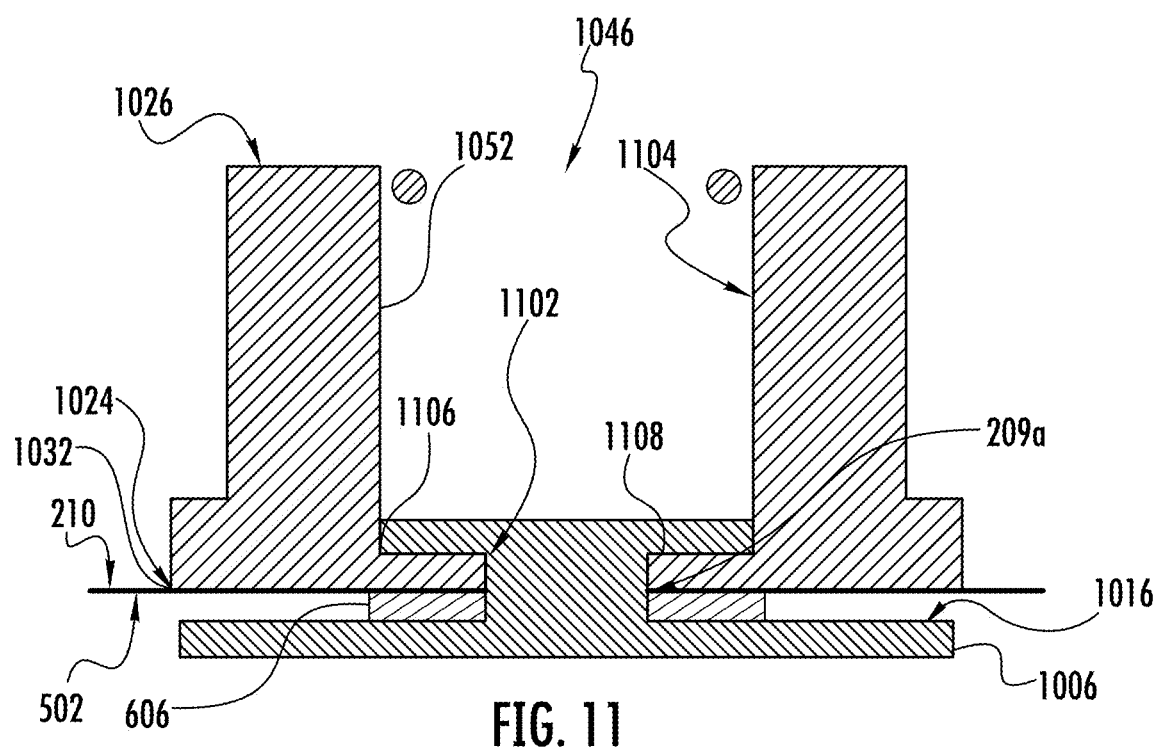
FIG. 11 illustrates a cross section view of a coupler coupled to a glove, according to one or more embodiments described herein.

FIG. 11 illustrates a cross section view 1100 of the coupler 212a coupled to the glove 104, according to one or more embodiments described herein. The cross section view 1100 has been described in conjunction with FIG. 10.

The cross section view 1100 depicts that the top surface 1016 of the base section 1006 of the first conductive connector 1002 abuts the inner surface 502 of the metacarpal region 206 of the posterior portion 202 of the glove 104. In some embodiments, where the first conductive region 606 is knitted around the periphery of the first via hole 209a, the top surface 1016 of the base section 1006 (of the first conductive connector 1002) abuts the first conductive region 606. Therefore, in such an embodiment, the first conductive connector 1002 is electrically coupled or is in electrical communication with the first conductive region 606. Similarly, in some example embodiments, where the second conductive region 610 is knitted around the periphery of the first via hole 209a, the top surface 1016 of the base section 1006 (of the first conductive connector 1002) abuts the second conductive region 610.

Further, referring to the cross section view 1100, the bottom surface 1032 of the base section 1028 of the second conductive connector 1004 abuts the outer surface 210 of the glove 104 such that the bore 1046 aligns with the first via hole 209a on the glove 104.

As discussed, the inner surface 1052 of the second conductive connector 1004 corresponds to the wall of the bore 1046 that extends between the first end 1024 and the second end 1026 of the second conductive connector 1004. In an example embodiment, the inner surface 1052 of the bore 1046 defines a first bore portion 1102 and a second bore portion 1104. The first bore portion 1102 extends from the bottom surface 1032 of the base section 1028 portion to a junction 1106 between the first bore portion 1102 and the second bore portion 1104. Further, the second bore portion 1104 extends from the junction 1106 to the second end 1026 of the second conductive connector 1004. In an example embodiment, the diameter of the first bore portion 1102 is less than the diameter of the second bore portion 1104 thereby defining a step 1108 at the junction 1106.

As discussed supra, the cap section 1008 of the first conductive connector 1002 is received in the bore 1046 in the second conductive connector 1004. More particularly, as can be observed from the cross section view 1100, the cap section 1008 snap fits with the step 1108 defined by the inner surface 1052 of the second conductive connector 1004. Since both the first conductive connector 1002 and the second conductive connector 1004 are composed of conductive materials, therefore, when the cap section 1008 of the first conductive connector 1002 snap fits in the bore 1046, the second conductive connector 1004 becomes electrically coupled with the first conductive connector 1002. Therefore, the second conductive connector 1004 is able to electrically communicate with the first conductive connector.

In some embodiments, the scope of the disclosure is not limited to the cap section 1008 of the first conductive connector 1002 to be snap fitted in the bore 1046 of the second conductive connector 1004. In an alternate embodiment, the cap section 1008 of the first conductive connector 1002 may be riveted in the bore 1046 of the second conductive connector 1004, without departing from the scope of the disclosure.

Further, in an example scenario where the base section 1006 of the first conductive connector 1002 abuts the first conductive region 606 or the second conductive region 610, the second conductive connector 1004 becomes electrically coupled or electrically communicates with the first conductive region 606 or the second conductive region 610. Further, since the first conductive region 606 is electrically coupled or is in electrical communication with the first conductive pad 304 and the second conductive connector 1004, therefore, the first conductive pad 304 is electrically coupled to the second conductive connector 1004.

In some examples, the plurality of couplers 212 may couple to the plurality of first via holes 209 as is discussed above in conjunction with FIG. 10 and FIG. 11. For example, the first via hole 209a and the first via hole 209b may receive the couplers 212a and 212b, respectively. As discussed supra, the first via hole 209a and the first via hole 209b have the first conductive region 606 and the second conductive region 610, therefore, on receiving the couplers 212a and 212b, respectively, the couplers 212a and 212b become electrically coupled or electrically communicates with the first conductive pad 304 and the second conductive pad 402, respectively.

Figure 12:
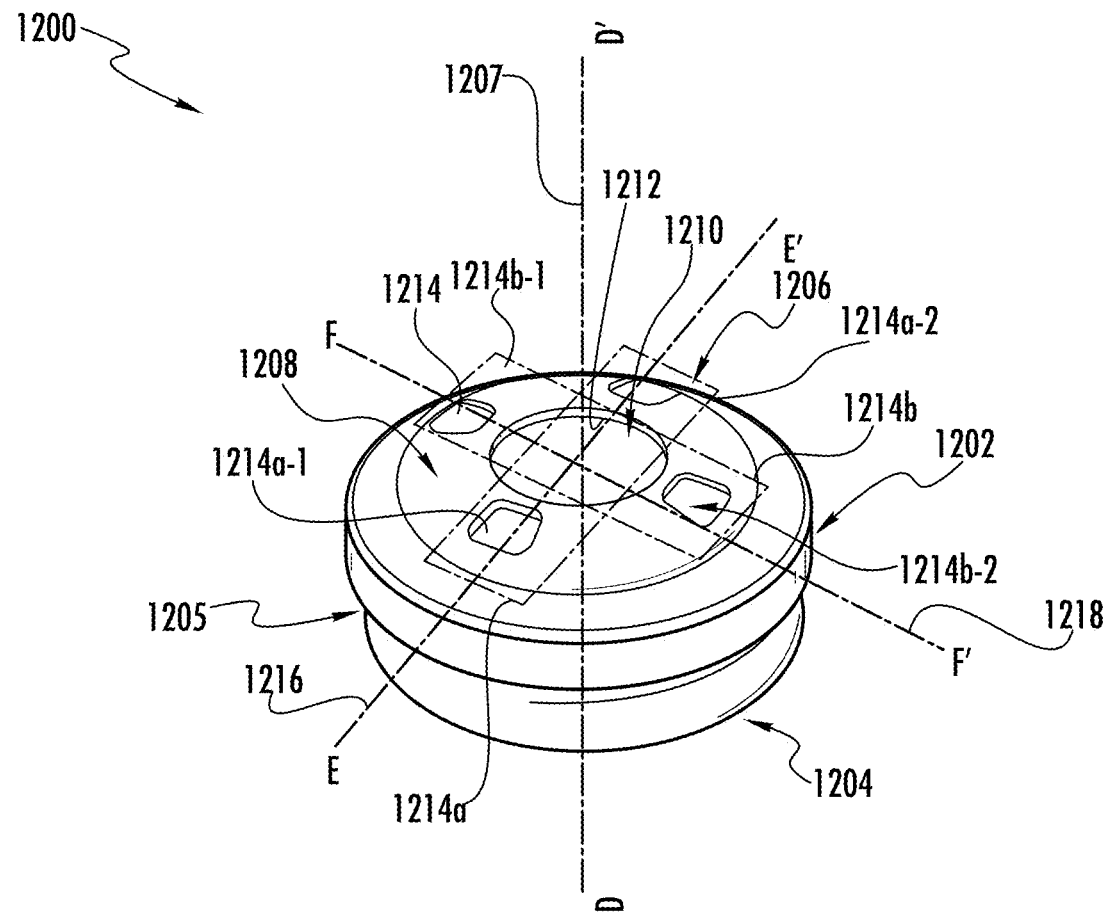
FIG. 12 illustrates a perspective view of a coupler, according to one or more embodiments described herein.
Figure 13:
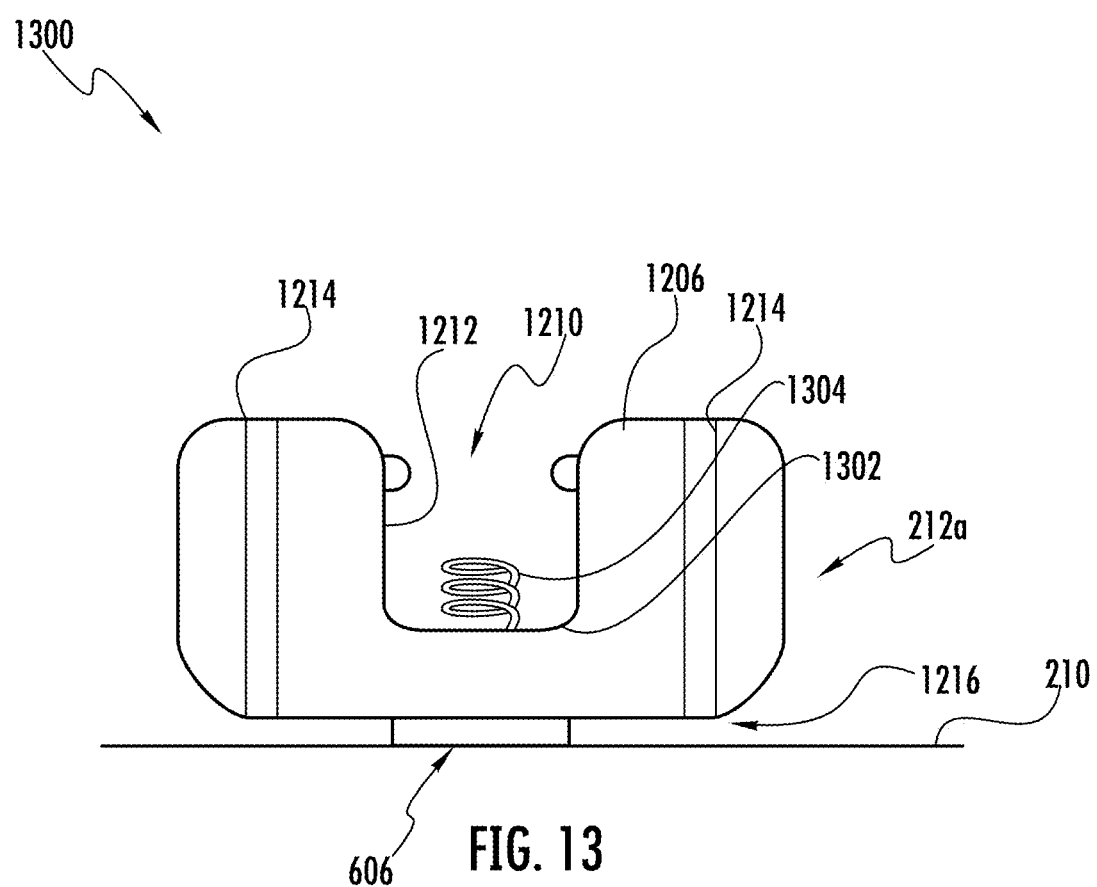
FIG. 13 illustrates a sectional view of a coupler, according to one or more embodiments described herein.

FIG. 12 and FIG. 13 illustrate a perspective view 1200 and a sectional view 1300 of the coupler 212a, according to one or more embodiments described herein.

Referring to the perspective view 1200, the coupler 212a includes a third conductive connector 1202 that has a first end 1204 and a second end 1206. A body portion 1205 of the third conductive connector 1202 extends between the first end 1204 and the second end 1206 along a central longitudinal axis D-D' (depicted by 1207). A top surface 1208 of the third conductive connector 1202 defines a cavity 1210 around the central longitudinal axis D-D' (depicted by 1207). The cavity 1210 has an inner surface 1212.

Further, the top surface 1208 defines a plurality of third via holes 1214 around the cavity 1210. The plurality of third via holes 1214 extends from the second end 1206 to a bottom surface 1216 of the third conductive connector 1202. In an example embodiment, each third via hole of the plurality of third via holes 1214 is equidistant from the central longitudinal axis D-D' (depicted by 1207). The plurality of third via holes 1214 includes a first pair of third via holes 1214a and a second pair of third via holes 1214b. The third via holes in the first pair of third via holes 1214a are opposite to each other on a diametric axis E-E' (depicted by 1216) such that the cavity 1210 is defined between the third via hole 1214a-1 and 1214a-2 in the first pair of third via holes 1214a. Similarly, the third via holes in the second pair of third via holes 1214b are also opposite to each other on a diametric axis F-F' (depicted by 1218) such that the cavity 1210 is defined between the third via hole 1214b-1 and 1214b-2. In an example embodiment, the diametric axis E-E' (depicted by 1216) and the diametric axis F-F' (depicted by 1218) are orthogonal to each other.

Similar to the second conductive connector 1004, the third conductive connector 1202 may include the one or more pair of slots 1054a and 1054b defined on the inner surface 1212 of the cavity. Further, each of the one or more pair of slots 1054a and 1054b is defined proximal to the second end 1206 and is configured to receive the engagement member 1055. In an example embodiment, as discussed, the engagement member corresponds to the metal wire that is received in a pair of slots (for example 1054a) of the one or more pair of slots 1054a and 1054b.

Referring to the sectional view 1300, when the coupler 212a is coupled to the glove 104, the bottom surface 1216 of the third conductive connector 1202 abuts the outer surface 210 of the glove 104. Further, the plurality of third via holes 1214 are utilized to stitch the coupler 212a on the outer surface 210 of the glove 104.

Further referring to the sectional view 1300, the inner surface 1212 of the cavity 1210 defines the wall of the cavity 1210. Further, the cavity 1210 has a base 1302 that is substantially orthogonal to the walls of the cavity 1210. A conductive biasing member 1304 extends from the base 1302 towards the second end 1206. In an example embodiment, the conductive biasing member 1304 is electrically coupled or is in electrical communication with the bottom surface 1216 of the third conductive connector 1202. In an example embodiment, a biasing member corresponds to a spring member that compresses when force is applied on it and returns to original state when the force is removed.

In an example wherein the coupler 212a having the third conductive connector 1202 is coupled to the glove 104, the glove 104 may not have the plurality of first via holes 209 defined on the metacarpal region 206 of the glove 104. Further, in such scenario, the first conductive region 606 and the second conductive region 610 are formed on the outer surface 210 of the glove 104. In some embodiments, when the coupler 212a is coupled to the glove 104 such that the bottom surface 1216 of the third conductive connector 1202 abuts the first conductive region 606, the conductive biasing member 1304 gets electrically coupled or electrically communicates with the first conductive region 606. Similarly, when the coupler 212a is coupled to the glove 104 such that the bottom surface 1216 of the third conductive connector 1202 abuts the second conductive region 610, the conductive biasing member 1304 gets electrically coupled to electrically communicates with the second conductive region 610.

As discussed supra, when the pad 214 is sewed on the posterior portion 202 of the glove 104, the plurality of couplers 212 extends into the plurality of second via holes 211 defined in the pad 214. In an example embodiment, the plurality of couplers 212 extends to the top surface 812 of the pad 214. The plurality of couplers 212 facilitates the coupling of the adapter module 122 of the mobile scanning device 102 on the pad 214. The structure of the mobile scanning device 102 having the adapter module 122 will now be discussed in conjunction with FIG. 14.

Figure 14:
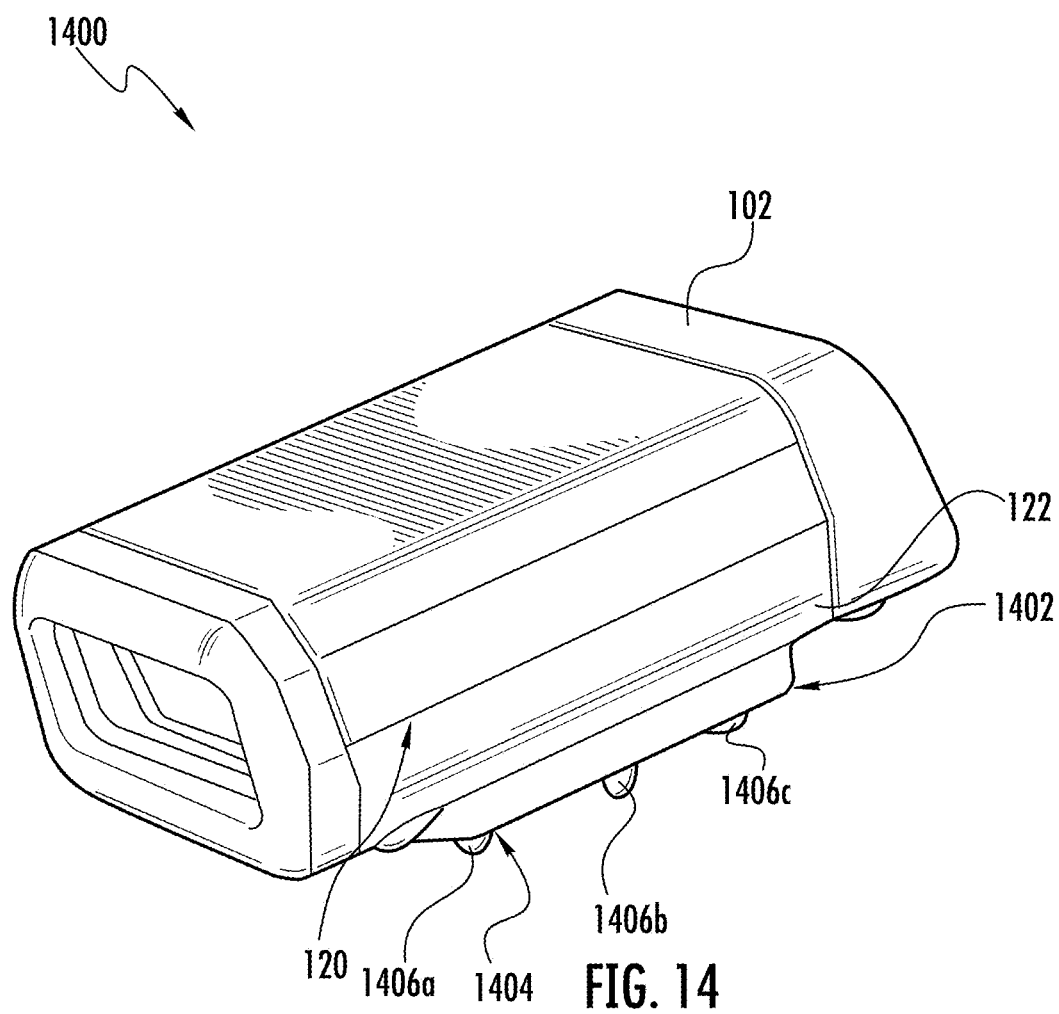
FIG. 14 illustrates a perspective view of a mobile scanning device, according to one or more embodiments described herein.

FIG. 14 illustrates a perspective view 1400 of the mobile scanning device 102, according to one or more embodiments described herein. As discussed above, the mobile scanning device 102 has a bottom surface 120 that is configured to receive the adapter module 122. The adapter module 122 has a bottom surface 1402 that defines a plurality of cavities 1404. The plurality of cavities 1404 is configured to receive a plurality of snap buttons 1406. In an example embodiment, the plurality of snap buttons 1406 is configured to be received in the plurality of couplers 212 to couple the mobile scanning device 102 on the pad 214. A structure of the plurality of the snap buttons 1406 is described in conjunction with FIGS. 15, 16 and 17.

Figure 15:
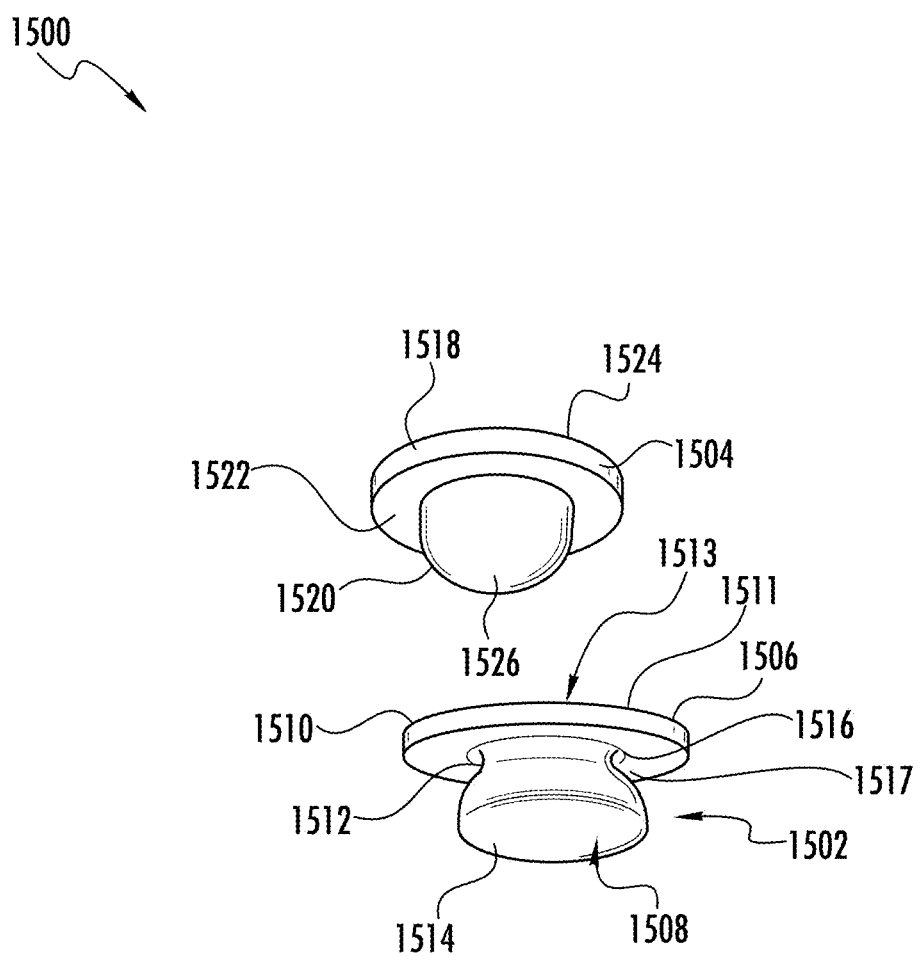
FIG. 15 illustrates an exploded view of a snap button, according to one or more embodiments described herein.

FIG. 15 illustrates an exploded view 1500 of a snap button 1406a of the plurality of snap buttons 1406, according to one or more embodiments described herein.

The snap button 1406a includes a fourth conductive connector 1502 and a fifth conductive connector 1504. In an example embodiment, the fourth conductive connector 1502 and the fifth conductive connector 1504 are riveted together to form the snap button 1406a, as is described later in conjunction with FIG. 16. In an alternate embodiment, the fourth conductive connector 1502 and the fifth conductive connector 1504 are screwed together to form the snap button 1406a, as is described later in conjunction with FIG. 17.

The fourth conductive connector 1502 has a first end 1506 and a second end 1508. Further, the fourth conductive connector 1502 includes a base section 1510, a conical body section 1512, and dome section 1514. The base section 1510 extends between the first end 1506 to the conical body section 1512. Further, the base section 1510 corresponds to a circular plate having a defined thickness. A bottom surface 1511 of the base section 1510 defines a cavity 1513 that extends from the first end 1506 of the fourth conductive connector 1502 into the dome section 1514.

The conical body section 1512 extends between the base section 1510 and the dome section 1514. In some embodiments, a radius of the conical body section 1512 reduces as the conical body section 1512 extends from the base section 1510 to the dome section 1514. In an example embodiment, a radius of a base 1516 of the conical body section 1512 is less than the radius of the base section 1510.

In an example embodiment, the dome section 1514 may have an inverse conical shape where a radius of the dome section 1514 increases as the dome section 1514 extends from the conical body section 1512 to the second end 1508. As the radius of the dome section 1514 increases from the conical body section 1512 to the second end 1508, a kink 1517 is formed at a junction of the conical body section 1512 and the dome section 1514. In some embodiments, the scope of the disclosure is not limited to the dome section 1514 having the inverse conical shape. In an alternate embodiment, the dome section 1514 may have a spherical shape that extends from the conical body section 1512 to the second end 1508 of the fourth conductive connector 1502.

In an example embodiment, the dome section 1514 is configured to be received in the plurality of couplers 212. Further, the dome section 1514 snap fits with the engagement member 1055 in the plurality of couplers 212 in such a manner that the engagement member 1055 is received at the kink 1517 (i.e., the junction between the dome section 1514 and the conical body section 1512).

The fifth conductive connector 1504 includes a base section 1518, a spherical end portion 1520 and a body portion 1522. Similar to the base section 1510 of the fourth conductive connector 1502, the base section 1518 of the fifth conductive connector 1504 also corresponds to a circular plate that extends from a first end 1524 of the fifth conductive connector 1504 to the body portion 1522 of the fifth conductive connector 1504. The body portion 1522 of the fifth conductive connector 1504 extends from the base section 1518 to the spherical end portion 1520. Further, the spherical end portion 1520 extends from the body portion 1522 to a second end 1526 of the fifth conductive connector 1504. In an example embodiment, the body portion 1522 and the spherical end portion 1520 of the fifth conductive connector 1504 is configured to be received in the cavity 1513 of the fourth conductive connector 1502. In some example embodiments, the fifth conductive connector 1504 is riveted with the fourth conductive connector 1502 to form the snap button 1406a, as is illustrated in FIG. 16.

Figure 16:
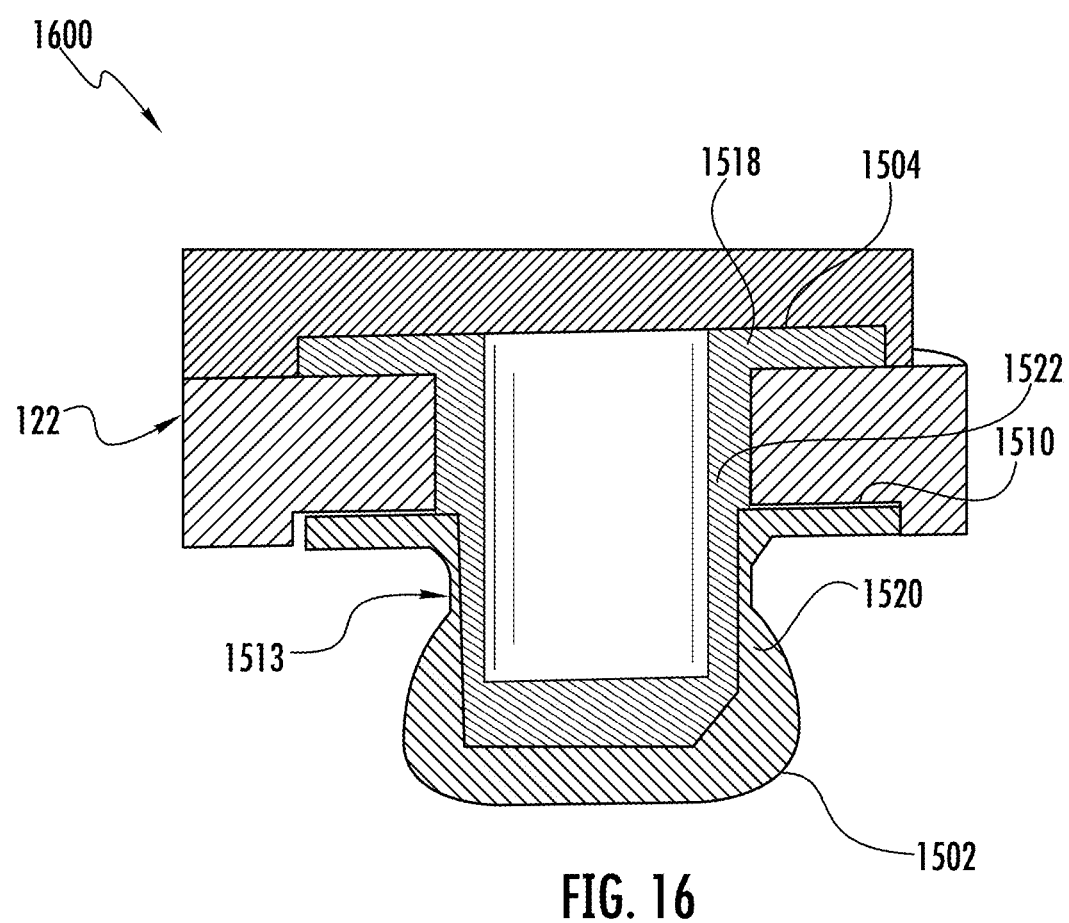
FIG. 16 illustrates a sectional view of a snap button, according to one or more embodiments described herein.

FIG. 16 illustrates a sectional view 1600 of the snap button 1406a, according to one or more embodiments described herein. Referring to the sectional view 1600, the body portion 1522 and the spherical end portion 1520 of the fifth conductive connector 1504 are received in the cavity 1513. Further, it can be observed from the sectional view 1600 that the base section 1510 of the fourth conductive connector 1502 and the base section 1518 of the fifth conductive connector 1504 are attached to the adapter module 122 of the mobile scanning device 102.

In some embodiments, the scope of the disclosure is not limited to riveting the fourth conductive connector 1502 with the fifth conductive connector 1504 to form the snap button 1406a. In alternate embodiment, the fourth conductive connector 1502 with the fifth conductive connector 1504 can be screwed together to form the snap button 1406a, as is further described in conjunction with FIG. 17.

Figure 17:
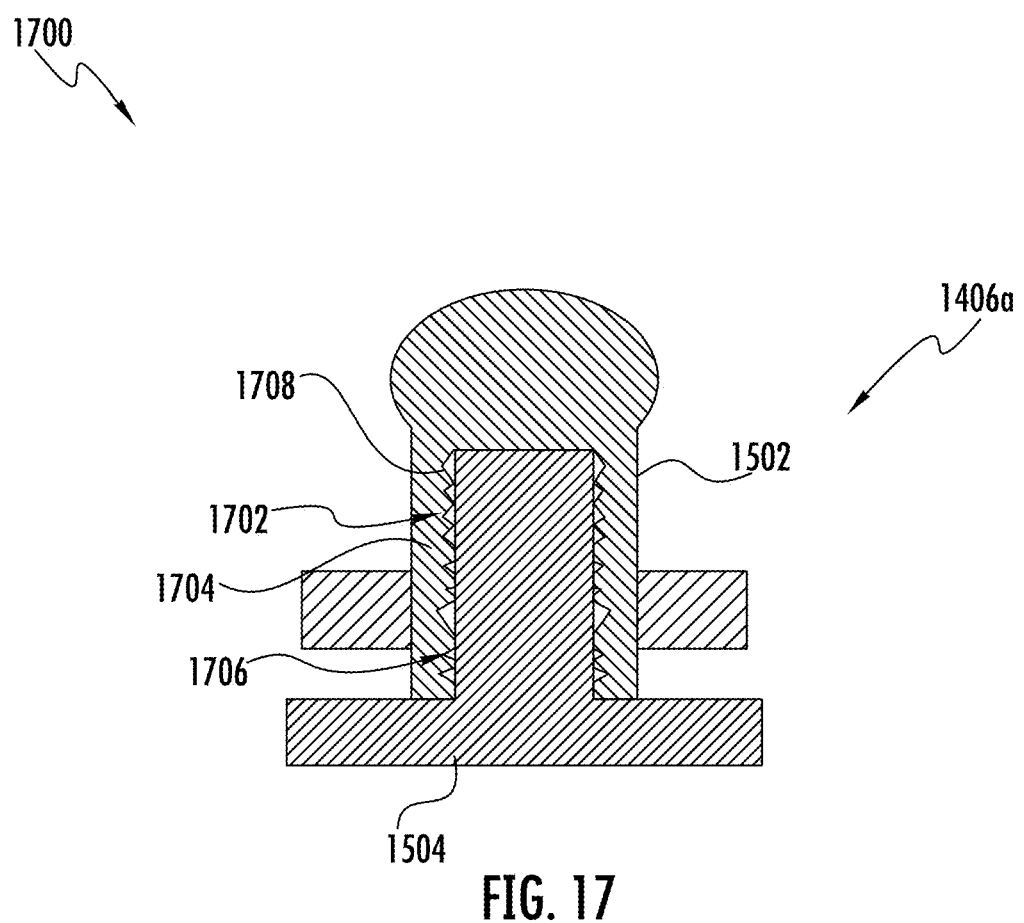
FIG. 17 illustrates another sectional view of a snap button, according to one or more embodiments described herein.

FIG. 17 illustrates a sectional view 1700 of the snap button 1406a, according to one or more embodiments described herein.

Referring to the section view 1700, an inner surface 1702 of the cavity 1513 defines a plurality of first threads 1704. Further, an outer surface 1706 of the fifth conductive connector 1504 defines a plurality of second threads 1708. More specifically, the outer surface 1706 defines the plurality of second threads on the body portion 1522 and the spherical end portion 1520 of the fifth conductive connector 1504. When the fourth conductive connector 1502 is screwed with the fifth conductive connector 1504, the plurality of first threads 1704 engages with the plurality of second threads 1708. The assembly of the fourth conductive connector 1502 and the fifth conductive connector 1504 forms the snap button 1406a.

In yet another alternate embodiment, the snap button 1406a may not include separate fourth conductive connector 1502 and the fifth conductive connector 1504. In an example embodiment, the snap button 1406a may be formed as a single solid body, as is further described in conjunction with FIG. 18.

Figure 18:
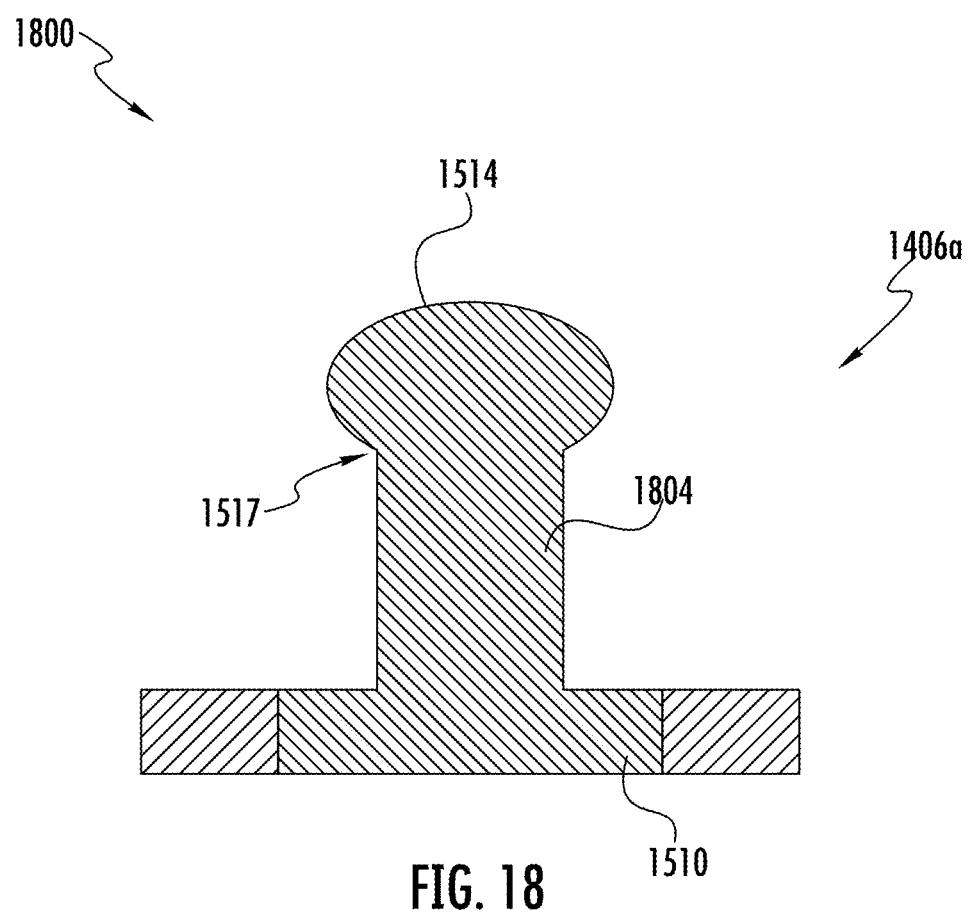
FIG. 18 illustrates yet another sectional view of a snap button, according to one or more embodiments described herein.

FIG. 18 illustrates the sectional view 1800 of the snap button 1406a, according to one or more embodiments described herein. Referring to the sectional view 1800, the snap button 1406a includes the base section 1510, a body portion 1804, and a dome section 1514. The body portion 1804 corresponds to a cylindrical body that extends from the base section 1510 to the dome section 1514. Further, the kink 1517 is defined at a junction of the body portion 1804 and the dome section 1514. As discussed, when the snap button 1406a snap fits in the plurality of couplers 212, the engagement member 1055 is received at the kink 1517.

In an example embodiment, to couple the mobile scanning device 102 with the glove 104 on the pad 214, the plurality of snap buttons 1406 on the adapter module 122 are snap fitted to the plurality of couplers 212. As discussed supra, one or more couplers of (for example 212a and 212b) of the plurality of couplers are electrically coupled or are in electrical communication with the first conductive region 606 and the second conductive region 610, respectively. Therefore, when the mobile scanning device 102 couples to the glove 104 through the plurality of snap buttons 1406, one or more snap-fit buttons of the plurality of snap fit buttons (for example 1406a and 1406b) electrically couple with the first conductive region 606 and the second conductive region 610.

In an example embodiment, the one or more snap fit buttons (for example 1406a and 1406b) are further coupled to one or more components of the mobile scanning device 102. For example, the one or more of the snap fit buttons (for example 1406a and 1406b) are coupled to a first trigger circuit of the mobile scanning device 102. In an example embodiment, the first trigger circuit corresponds to an electronic circuit that generates a first trigger signal, which causes the mobile scanning device 102 to perform a predetermined operation. For example, in receiving the first trigger signal, the mobile scanning device 102 triggers the image capturing assembly 116 of the mobile scanning device 102 to capture an image or scan a machine readable indicia.

In an embodiment, when the worker (e.g., using the mobile scanning device 102) touches the first conductive pad 304 (positioned on the anterior portion 204 of the thumb region 305 of the glove 104) with the second conductive pad 402 (positioned on the posterior portion 202 of the middle finger region 404), the first conductive region 606 becomes electrically coupled or electrically communicates with the second conductive region 610. As the first conductive region 606 becomes electrically coupled or electrically communicates with the second conductive region 610, the snap buttons 1406a become electrically coupled or electrically communicates with the snap button 1406b. This causes the first trigger circuit to be completed and generate the first trigger signal. The operation of the first trigger circuit is further described in conjunction with FIGS. 22, 23, and 24.

In some embodiments, the scope of the disclosure is not limited to having only two conductive pads (i.e., first conductive pad 304 and the second conductive pad 402) to control the triggering of the image capturing assembly 116. In an alternate embodiment, the glove 104 may include more than two conductive pads for controlling the operation of other components of the mobile scanning device 102. The glove 104 having more than two conductive pad has been illustrated in FIG. 19A and FIG. 19B.

Figure 19A:
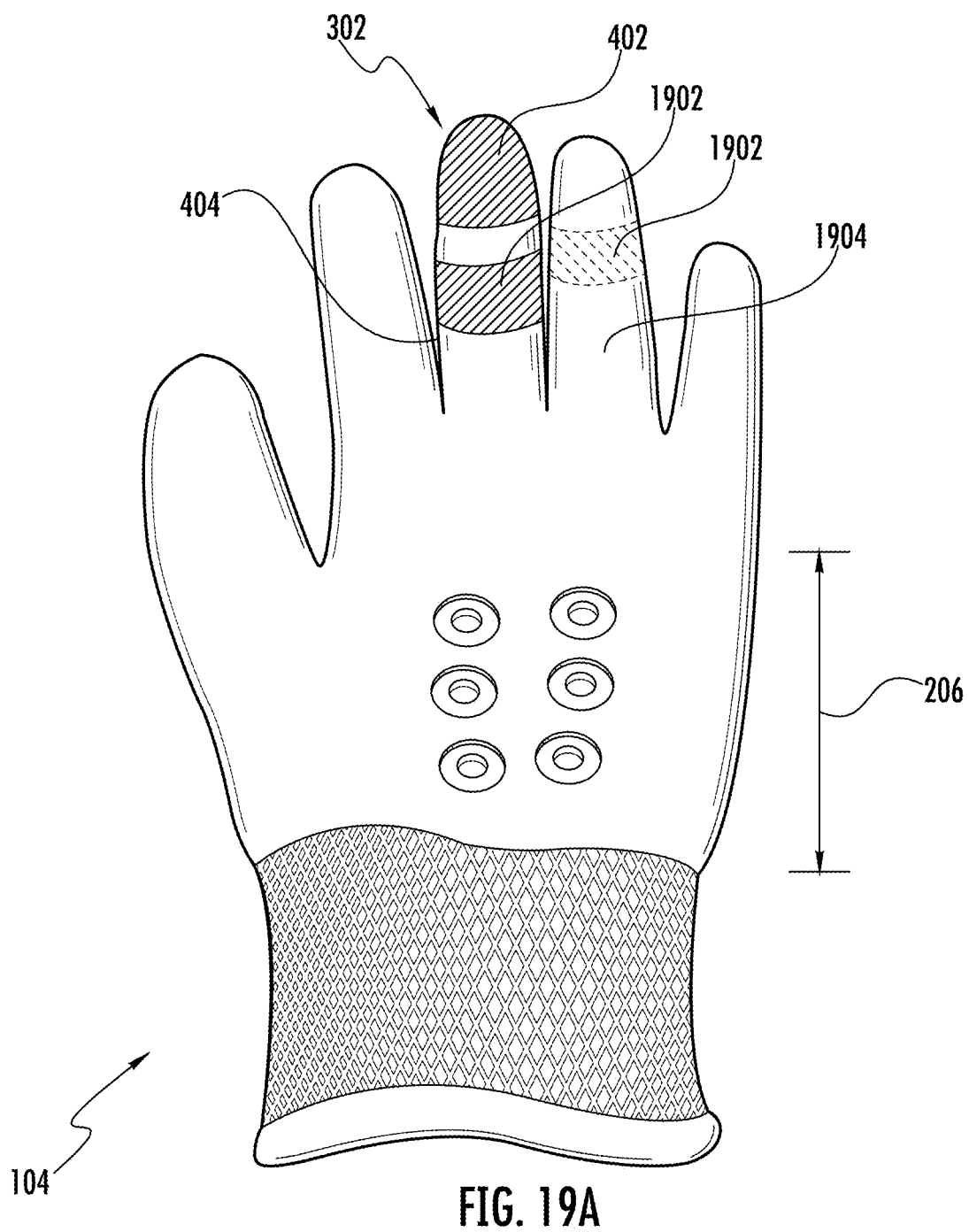
FIGS. 19A and 19B illustrate rear views of a glove, according to one or more embodiments described herein.
Figure 19B:
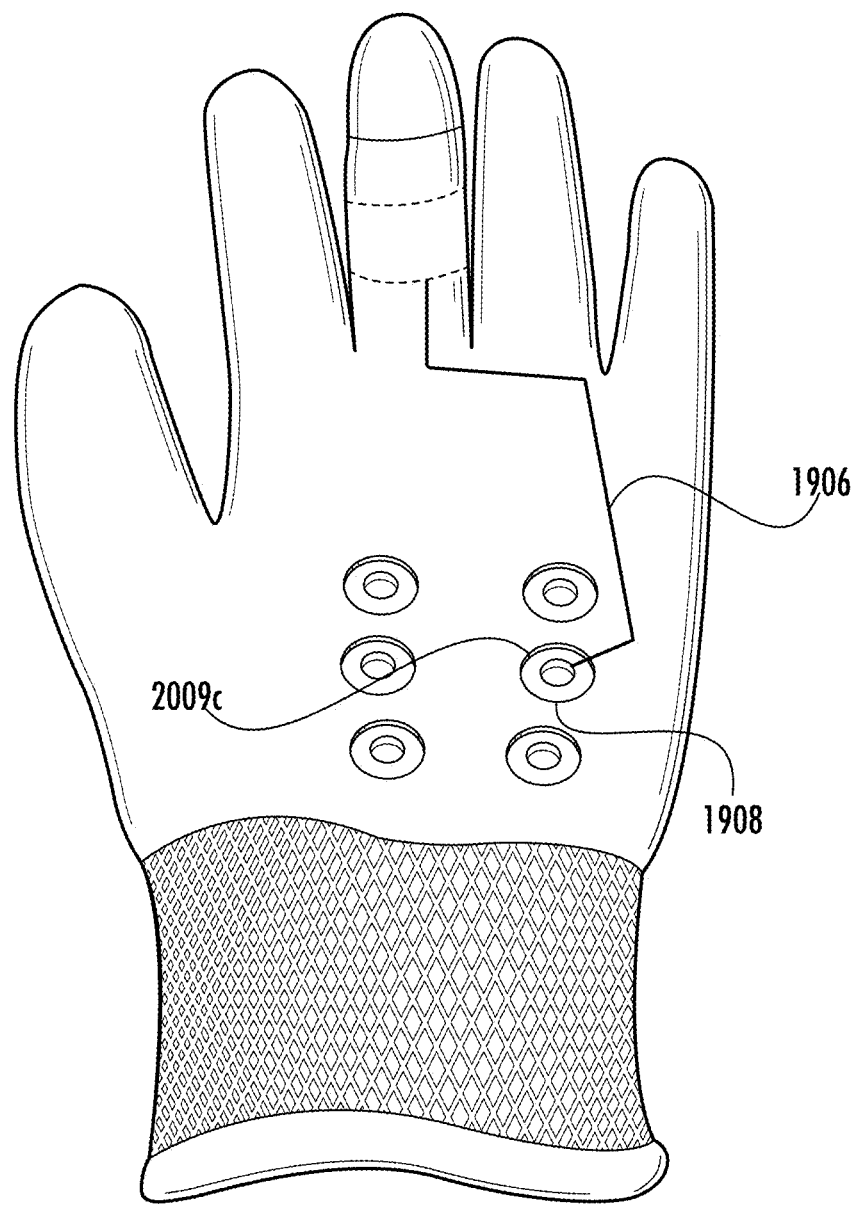

FIGS. 19A and 19B illustrate a rear view 1900A of the glove 104 and a rear view 1900B of the glove 104 inside out, respectively, according to one or more embodiments described herein.

Referring to the rear view 1900A, a third conductive pad 1902 is knitted on the second finger region 404 just below the second conductive pad 402. In an example embodiment, the third conductive pad 1902 is proximal to the metacarpal region 206 of the glove 104 and is distal from the distal end portion 302 on the second finger region 404. In an example embodiment, the third conductive pad 1902 is similar to the second conductive pad 402. For example, both the third conductive pad 1902 and the second conductive pad 402 are knitted using the same conductive yarn by utilizing one or more 3D knitting techniques.

In some embodiments, the scope of the disclosure is not limited to having the third conductive pad 1902 knitted on the second finger region 404 of the glove 104. In an alternate embodiment, the third conductive pad 1902 may be knitted on any of the other finger regions of the plurality of finger regions 208 of the glove 104. For example, the third conductive pad 1902 may be knitted on the distal end portion 302 of a ring finger region 1904.

Referring to the rear view 1900B, a third conductive path 1906 is knitted, such that the third conductive pad 1902 is electrically coupled or is in electrical communication with a third conductive region 1908. The third conductive region 1908 is knitted around the periphery of a first via hole 209c of the plurality of first via holes 209. As discussed above, when the plurality of couplers 212 are coupled to the glove 104, one of the plurality of couplers 212 electrically couples or is in electrical communication with the third conductive region 1908. For example, the coupler 212c electrically couples or is in electrical communication with the third conductive region 1908 and the third conductive pad 1902.

Further, when the mobile scanning device 102 is mounted on the glove 104 by means of the plurality of snap button 1406 on the adapter module 122, a snap fit button (for example, the snap button 1406c) also gets electrically coupled or electrically communicates with the third conductive region 1908 and the third conductive pad 1902. Further, the snap button 1406c is further coupled to a second trigger circuit in the mobile scanning device 102. In an example embodiment, the second trigger circuit is configured to generate a second trigger signal, which causes the mobile scanning device 102 to perform a predetermined operation. In some examples, the operation performed in response to the first trigger signal is different from the operation performed in response to the second trigger signal. For example, on receiving the second trigger signal, a display screen on the mobile scanning device 102 is activated.

When the worker (e.g., using the mobile scanning device 102) touches the first conductive pad 304 with the third conductive pad 1902, the first conductive region 606 become electrically coupled or electrically communicates with the third conductive region 1908. This causes the second trigger circuit to generate the second trigger signal. Similarly, the glove 104 may have additional conductive pads knitted on different finger regions of the plurality of finger regions 208. Further, in some examples, the conductive pads may be knitted on same finger region, as is illustrated in FIG. 19A.

In an example embodiment, to bring the first conductive pad 304 in contact with the second conductive pad 402 or the third conductive pad 1902, the worker wearing the glove may have to create predetermined shapes or gestures with the glove 104 by moving the plurality of finger regions 208 in a predetermined manner. Hereinafter creating the predetermined shapes with glove 104 has been referred to as making gestures.

As making gestures with the glove 104 facilitates bringing the first conductive pad 304 in contact with the second conductive pad 402 or the third conductive pad 1902, which causes the mobile scanning device 102 to perform a predetermined operation, therefore, each gesture corresponds to an operation performed by the mobile scanning device 102. Some examples of such gestures have been illustrated in FIGS. 20A and 20B.

Figure 20A:
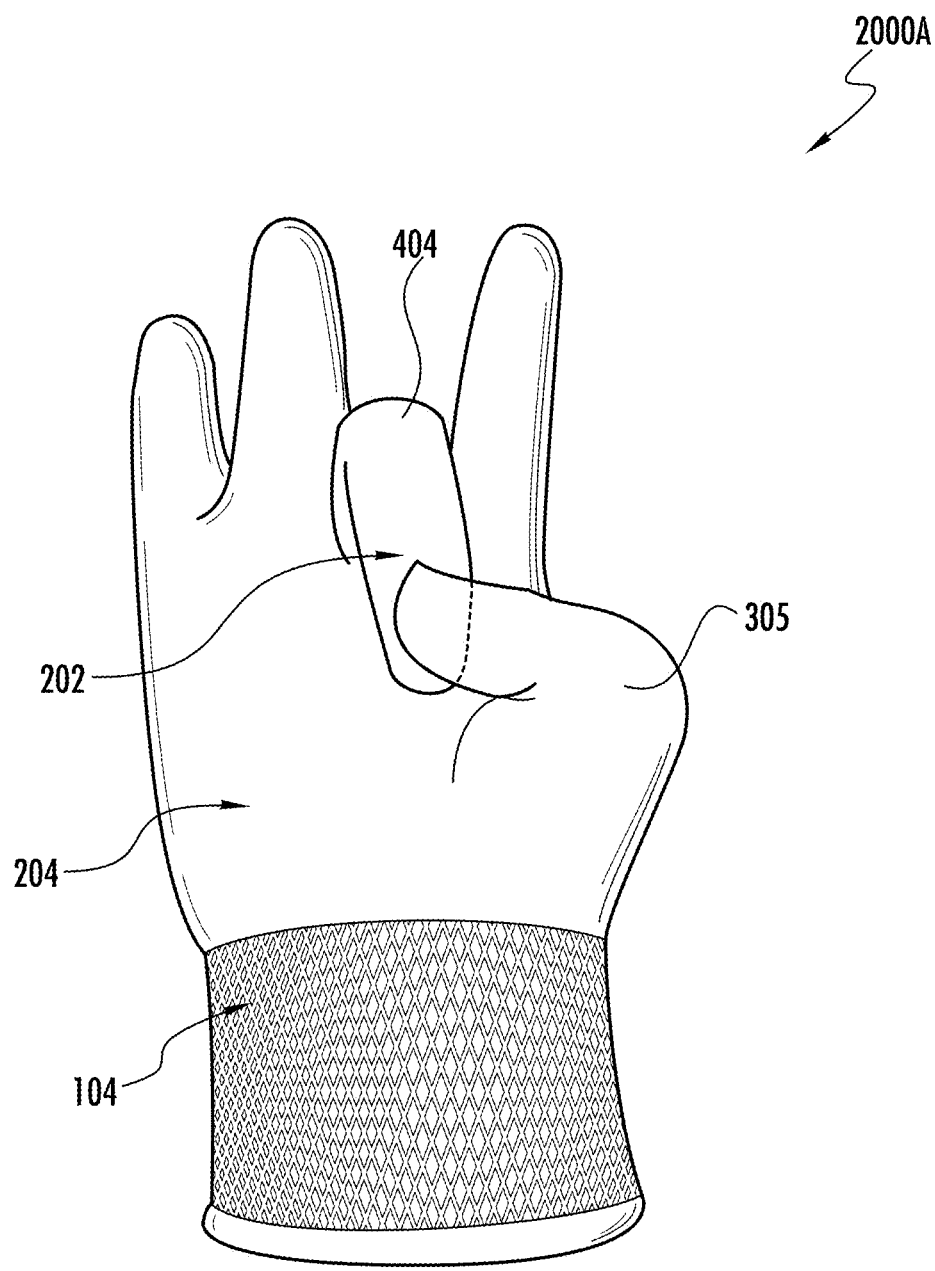
FIGS. 20A 20B, 20C, and 20D illustrate example gestures, according to one or more embodiments described herein.
Figure 20B:
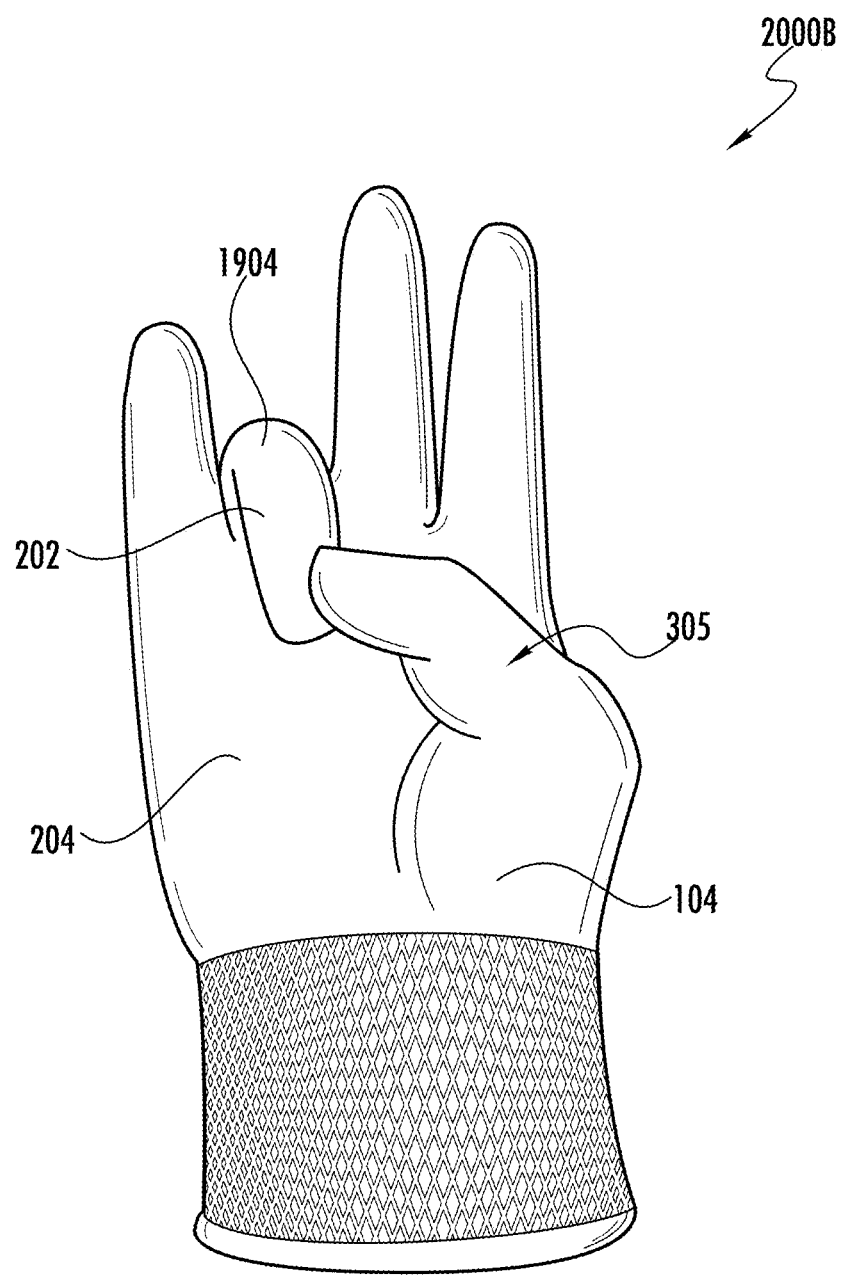

FIGS. 20A, and 20B illustrate example gestures 2000A and 2000B, respectively, according to one or more embodiments described herein.

Referring to the example gesture 2000A, the middle finger region 404 of the glove 104 is bent towards the anterior portion 204 of the glove 104. Further, the anterior portion 204 of the thumb region 305 is in contact with the posterior portion 202 of the middle finger region 404. Referring to example gesture 2000B, the ring finger region 1904 of the glove 104 is bent towards the anterior portion 204 of the glove 104. Further, the anterior portion 204 of the thumb region 305 is in contact with the posterior portion 202 of the ring finger region 1904.

As discussed above, each gesture performed on the glove 104 causes the mobile scanning device 102 to perform a predetermined operation. Various components of the mobile scanning device 102 that enables the mobile scanning device 102 to perform the predetermined operation have been further described in conjunction with FIG. 21.

In some embodiments, the scope of the disclosure is not limited to the gestures corresponding to the shapes that the worker may make with the glove 104 to bring the first conductive pad 304 in contact with the second conductive pad 402 or with the third conductive pad 1902, as is illustrated in the FIGS. 20A and 20B. In an example embodiment, the gestures may further include actions performed by the worker to bring the first conductive pad 304 in contact with the second conductive pad 402 and the third conductive pad 1902 in a predetermined sequence, as is further described in FIG. 20C and FIG. 20D.

Figure 20C:
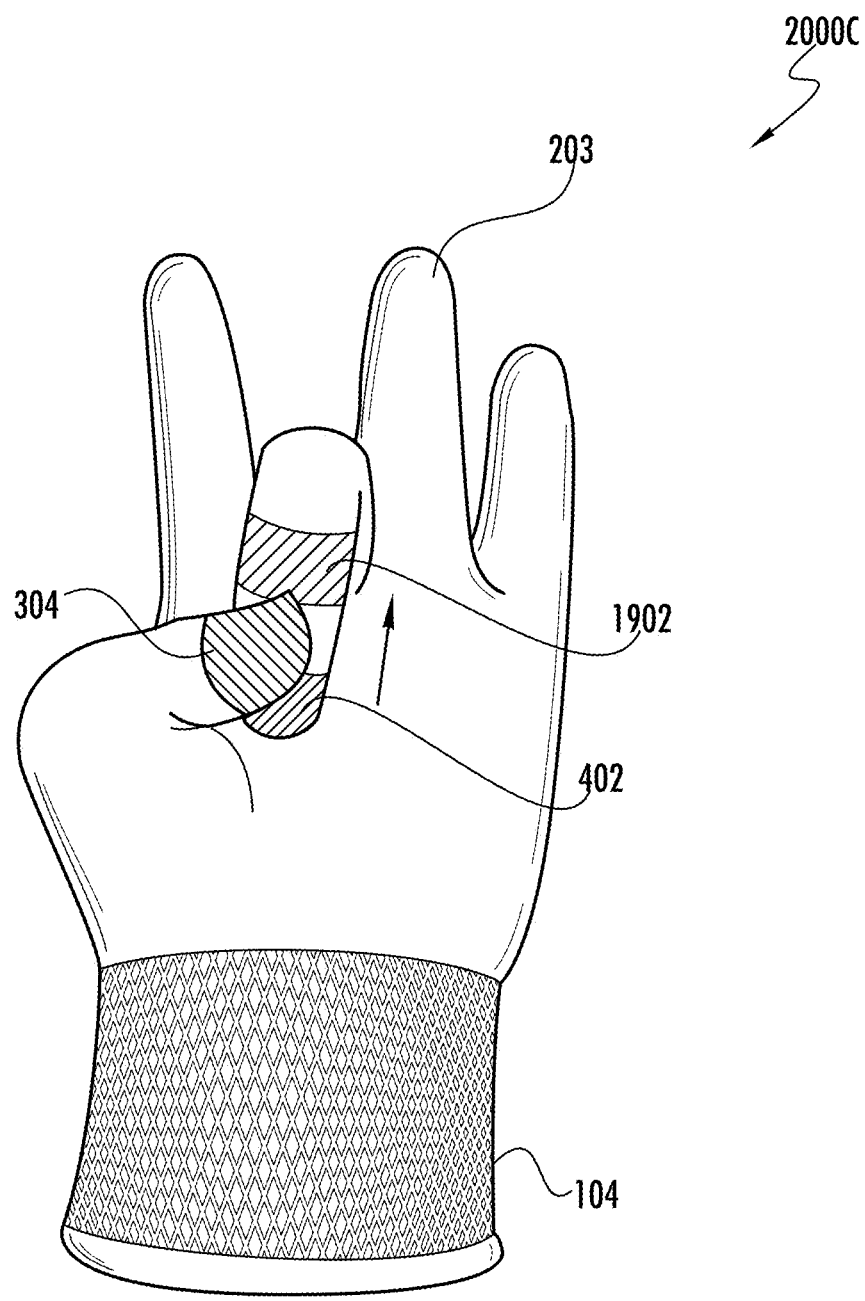
Figure 20D:
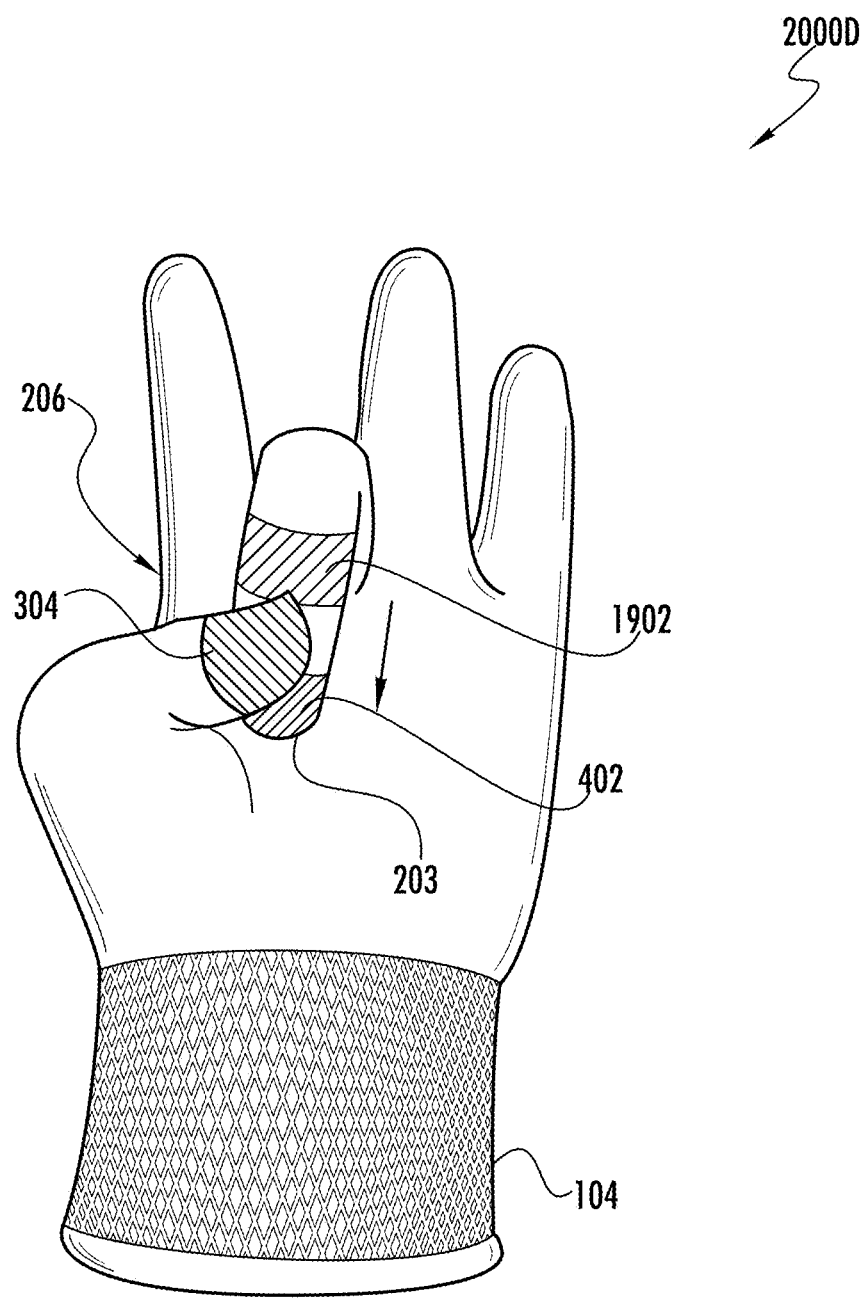

FIG. 20C and FIG. 20D illustrate example gestures 2000C and 2000D, according to one or more embodiments described herein.

Referring to FIG. 20C, the glove 104 has the second conductive pad 402 and the third conductive pad 1902 knitted on the middle finger region 404 of the posterior portion 202 of the glove 104. Further, the third conductive pad 1902 is knitted below the second conductive pad 402 and is proximal to the metacarpal region 206 of the glove 104. To perform the gesture 2000C, the worker may swipe the first conductive pad 304 (knitted on the thumb region 305) over the posterior portion 202 of the middle finger region 404 from the second end 203 of the glove 104 towards the metacarpal region 206 of the glove 104. Such an action performed by the worker, first brings the first conductive pad 304 in contact with the second conductive pad 402 followed by bringing the first conductive pad 304 in contact with the third conductive pad 1902. Such a sequence (of bringing the first conductive pad 304 in contact with the second conductive pad 402 and the third conductive pad 1902) causes the mobile scanning device 102 to perform the predetermined operation. Hereinafter, the gesture 2000C has been referred to as swipe-down gesture 2000C.

In some example embodiments, referring to the gesture 2000D, the worker may reverse the sequence of contacting the first conductive pad 304 in contact with the second conductive pad 402 and the third conductive pad 1902. For example, the worker may swipe the first conductive pad 304 (knitted on the thumb region 305) over the posterior portion 202 of the middle finger region 404 from the metacarpal region 206 of the glove 104 towards the second end 203 of the glove 104. Such an action performed by the worker, first brings the first conductive pad 304 in contact with the third conductive pad 1902 followed by bringing the first conductive pad 304 in contact with the second conductive pad 402. Performing such gesture causes the mobile scanning device 102 to perform a predetermined operation, as is further described in conjunction with FIG. 29. Hereinafter, the gesture 2000D performed by the worker has been referred to as swipe-up gesture 2000D.

Figure 21:
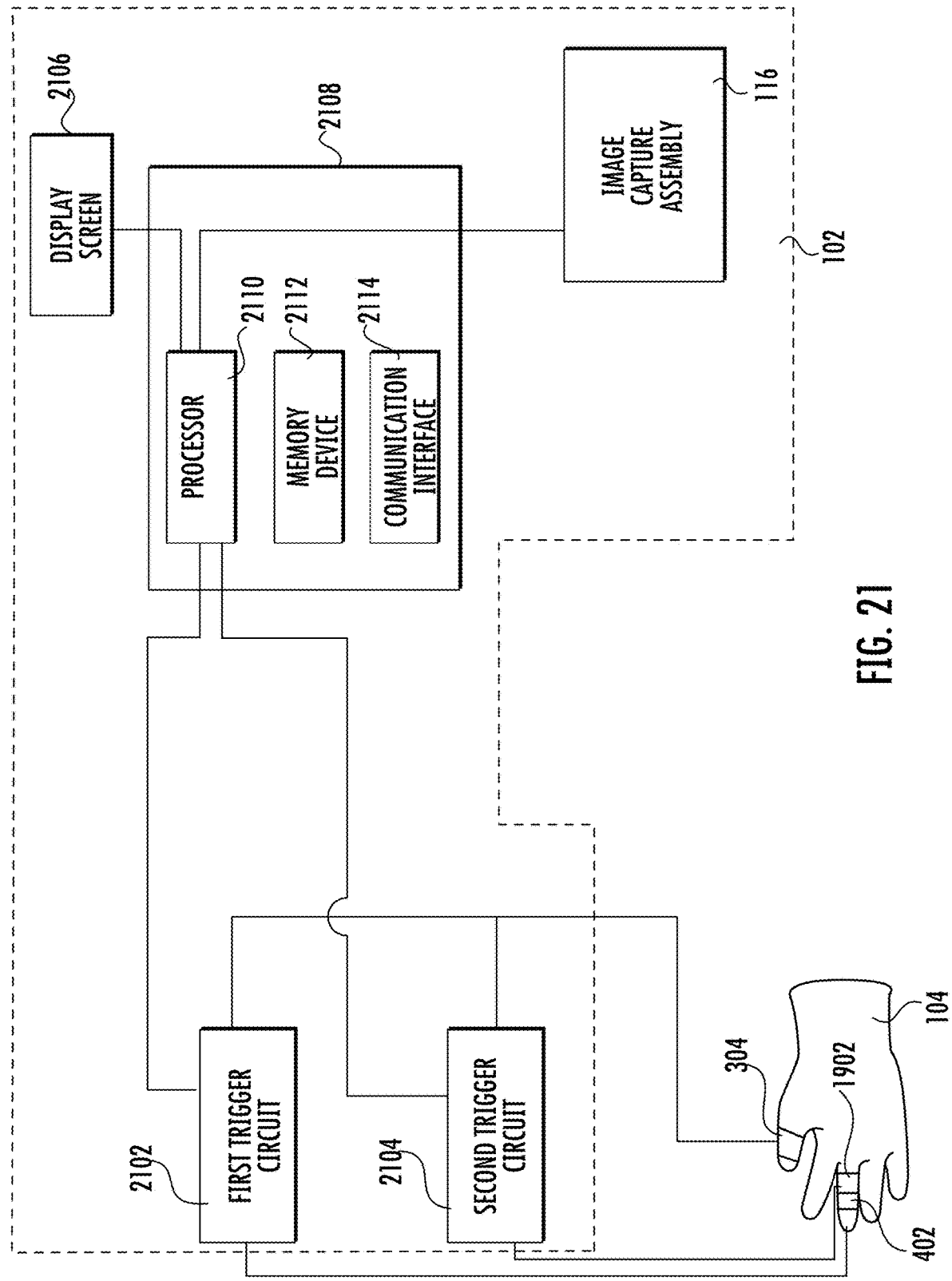
FIG. 21 illustrates a block diagram of a mobile scanning device, according to one or more embodiments described herein.

FIG. 21 illustrates a block diagram of the mobile scanning device 102, according to one or more embodiments described herein. In some examples, the mobile scanning device 102 comprises the first trigger circuit 2102, the second trigger circuit 2104, a display screen 2106, and the control system 2108. The control system 2108 further includes a processor 2110, a memory device 2112, a communication interface 2114, and a gesture identification unit 2116. In an example embodiment, the first trigger circuit 2102 and the second trigger circuit 2104 are communicatively coupled to the control system 2108. Further, the first trigger circuit 2102 and the second trigger circuit 2104 are electrically coupled or are in electrical communication with the first conductive pad 304 on the glove 104. Additionally, the first trigger circuit 2102 is electrically coupled or is in electrical communication with the second conductive pad 402, and the second trigger circuit 2104 is electrically coupled or is in electrical communication with a different conductive pad from the second conductive pad 402, such as the third conductive pad 1902.

The first trigger circuit 2102 includes suitable logic/circuitry that is configured to generate the first trigger signal when the first conductive pad 304 contacts the second conductive pad 402. The structure and the operation of the first trigger circuit 2102 has been described in conjunction with FIGS. 22-24. In an example embodiment, the second trigger circuit 2104 is configured to generate a second trigger signal when the first conductive pad 304 contacts the third conductive pad 1902. Further, the first trigger circuit 2102 and the second trigger circuit 2104 are configured to transmit the first trigger signal and the second trigger signal, respectively, to the control system 2108.

The display screen 2106 may include suitable logic, circuitry, interfaces, and/or code that may be operable to render a display. In an example embodiment, the display screen 2106 may be realized through several known technologies such as, Cathode Ray Tube (CRT) based display, Liquid Crystal Display (LCD), Light Emitting Diode (LED) based display, Organic LED display technology, and Retina display technology. In some example embodiments, the display screen 2106 may be configured to display one or more messages/notifications. Some examples of the one or more messages/notification may include, but not limited to, information decoded from the indicia scanned by the mobile scanning device 102. In some embodiments, the display screen 2106 may include a touch panel, such as a capacitive touch panel, a thermal touch panel, and/or resistive touch panel, that may enable the worker to provide inputs to the mobile scanning device 102.

The control system 2108 includes suitable logic, circuitry, interfaces, and/or code that may be operable to control the one or more operations of the mobile scanning device 102. For example, the control system 2108 may control the capturing of the image by the image capturing assembly 116. As discussed, the control system 2108 comprises the processor 2110, the memory device 2112, and the communication interface 2114.

The processor 2110 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 21 as a single controller, in an embodiment, the processor 2110 may include a plurality of controller and signal processing modules. The plurality of controller may be embodied on a single electronic device or may be distributed across a plurality of electronic devices collectively configured to function as the circuitry of the control system 2108. The plurality of processors may be in operative communication with each other and may be collectively configured to perform one or more functionalities of the circuitry of the control system 2108, as described herein. In an example embodiment, the processor 2110 may be configured to execute instructions stored in the memory device 2112 or otherwise accessible to the processor 2110. These instructions, when executed by the processor 2110, may cause the circuitry of the control system 2108 to perform one or more of the functionalities, as described herein.

Whether configured by hardware, firmware/software methods, or by a combination thereof, the processor 2110 may include an entity capable of performing operations according to embodiments of the present disclosure while configured accordingly. Thus, for example, when the processor 2110 is embodied as an ASIC, FPGA or the like, the processor 2110 may include specifically configured hardware for conducting one or more operations described herein. Alternatively, as another example, when the processor 2110 is embodied as an executor of instructions, such as may be stored in the memory device 2112, the instructions may specifically configure the processor 2110 to perform one or more algorithms and operations described herein.

Thus, the processor 2110 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 2112 may include suitable logic, circuitry, and/or interfaces that are adapted to store a set of instructions that is executable by the processor 2110 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 2112 may be integrated with the processor 2110 on a single chip, without departing from the scope of the disclosure.

The communication interface 2114 may correspond to a communication interface that may facilitate transmission and reception of messages and data to and from various devices. For example, the communication interface 2114 is communicatively coupled with a computing device (not shown). Examples of the communication interface 2114 may include, but are not limited to, an antenna, an Ethernet port, a USB port, a serial port, or any other port that can be adapted to receive and transmit data. The communication interface 2114 transmits and receives data and/or messages in accordance with the various communication protocols, such as, I2C, TCP/IP, UDP, and 3G, 2G, 4G, or 5G communication protocols. In an example embodiment, the communication interface 2114 may be coupled to an antenna element that can be either positioned in the housing of the mobile scanning device 102 or may be knitted on the glove 104. An example glove 104 having the antenna element has been described later in conjunction with FIGS. 25A and 25B.

The gesture identification unit 2116 may include suitable logic, circuitry, interface and/or code for receiving the first trigger signal and the second trigger signal from the first trigger circuit 2102 and the second trigger circuit 2104, respectively. Further, the gesture identification unit 2116 may be configured to identify a type of gesture being performed by the worker of the mobile scanning device based on the reception of the first trigger signal and the second trigger signal, as is described further in FIG. 28. In some examples, the gesture identification unit 2116 may be configured to operate the mobile scanning device 102 in gesture association mode in which the gesture identification unit 2116 may be configured to associate the type of the gesture with a predetermined operation of the mobile scanning device 102, as is further described in conjunction with FIG. 28. Further, the gesture identification unit 2116 may be configured to operate the mobile scanning device 102 in an operation mode in which the gesture identification unit 2116 may be configured to identify the predetermined operation of the mobile scanning device 102 that is to be performed based on the identified type of gesture, as is further described in FIG. 29. In an example embodiment, the gesture identification unit 2116 may be implemented using one or more technologies, such as, but not limited to, FPGA, ASIC, and the like.

Figure 22:
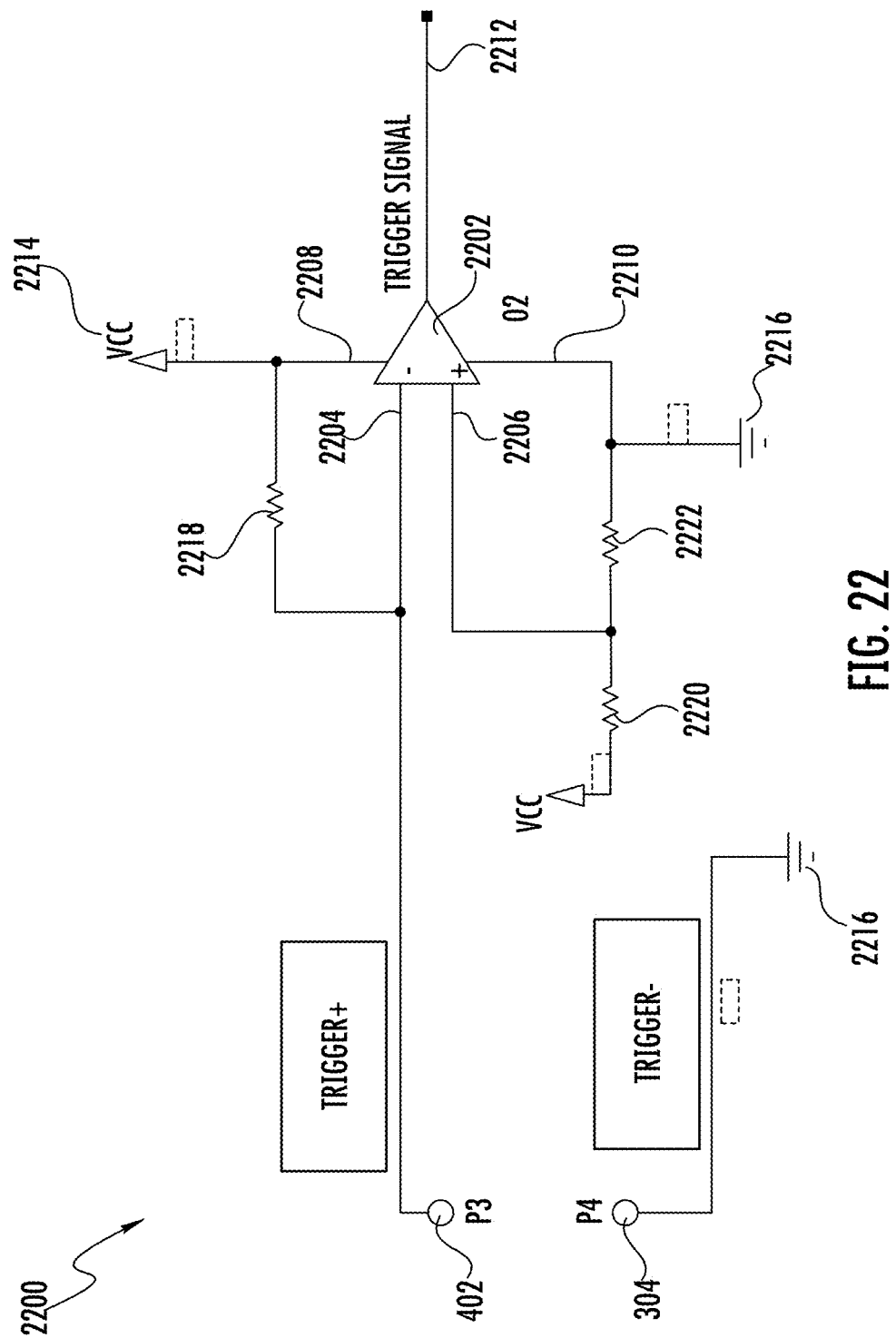
FIG. 22 illustrate an example electronic circuit of a first trigger circuit, according to one or more embodiments described herein.

FIG. 22 illustrates an example electronic circuit 2200 of the first trigger circuit 2102 that, in some examples, prevents false triggering in an instance in which glove 104 is wet, according to one or more embodiments described herein.

In an example embodiment, the electronic circuit 2200 includes a comparator 2202 having a first input terminal 2204, a second input terminal 2206, a voltage input terminal 2208, a ground input terminal 2210, and an output terminal 2212. In some embodiments, the comparator 2202 may be correspond to an operational amplifier (OP-AMP). In an alternate embodiment, the comparator 2202 may be implemented using a comparator IC, as is described later in conjunction with FIG. 23. Further, the electronic circuit 2200 includes a voltage source 2214 and a ground 2216. Additionally, the electronic circuit 2200 depicts that the first conductive pad 304 is coupled to the ground 2216. For the purpose of ongoing description the first input terminal 2204 of the comparator 2202 corresponds to the negative terminal, while the second input terminal 2206 of the comparator 2202 corresponds to the positive terminal.

In an example embodiment, the first input terminal 2204 of the comparator 2202 is coupled to the second conductive pad 402. Further, the first input terminal is coupled to the voltage source 2214 through a first resistive element 2218. The second input terminal 2206 is coupled to the voltage source 2214 through a second resistive element 2220. Additionally, the second input terminal 2206 is coupled to the ground 2216 through a third resistive element 2222. In an example embodiment, the voltage input terminal 2208 of the comparator 2202 is coupled to the voltage source 2214. Further, the ground input terminal 2210 of the comparator 2202 is coupled to the ground 2216. In an example embodiment, the output terminal 2212 is coupled to the processor 2110.

In operation, when the worker (e.g., wearing the glove 104) touches the first conductive pad 304 with the second conductive pad 402, a value of the voltage at the first input terminal 2204 is 0 volts, as the first conductive pad 304 is grounded. On the other hand a value of the voltage at the second input terminal is 2206 is depicted by following equation:

$$V_{2in}=(R_3/R_3+R_2)V_{cc} \qquad (1)$$

Where, $V_{2in}$: Voltage at the second input terminal 2206;
$R_3$: Third resistive element 2222; and
$R_2$: Second resistive element 2220.

As the value of the voltage at the second input terminal 2206 (which is the positive terminal of the comparator 2202) is greater than the value of the voltage at the first input terminal 2204 (which is negative terminal of the comparator 2202), a value of the voltage at the output terminal 2212 is $V_{cc}$. In an example embodiment, $V_{cc}$ voltage generated at the output terminal 2212 corresponds to the first trigger signal.

Figure 23:
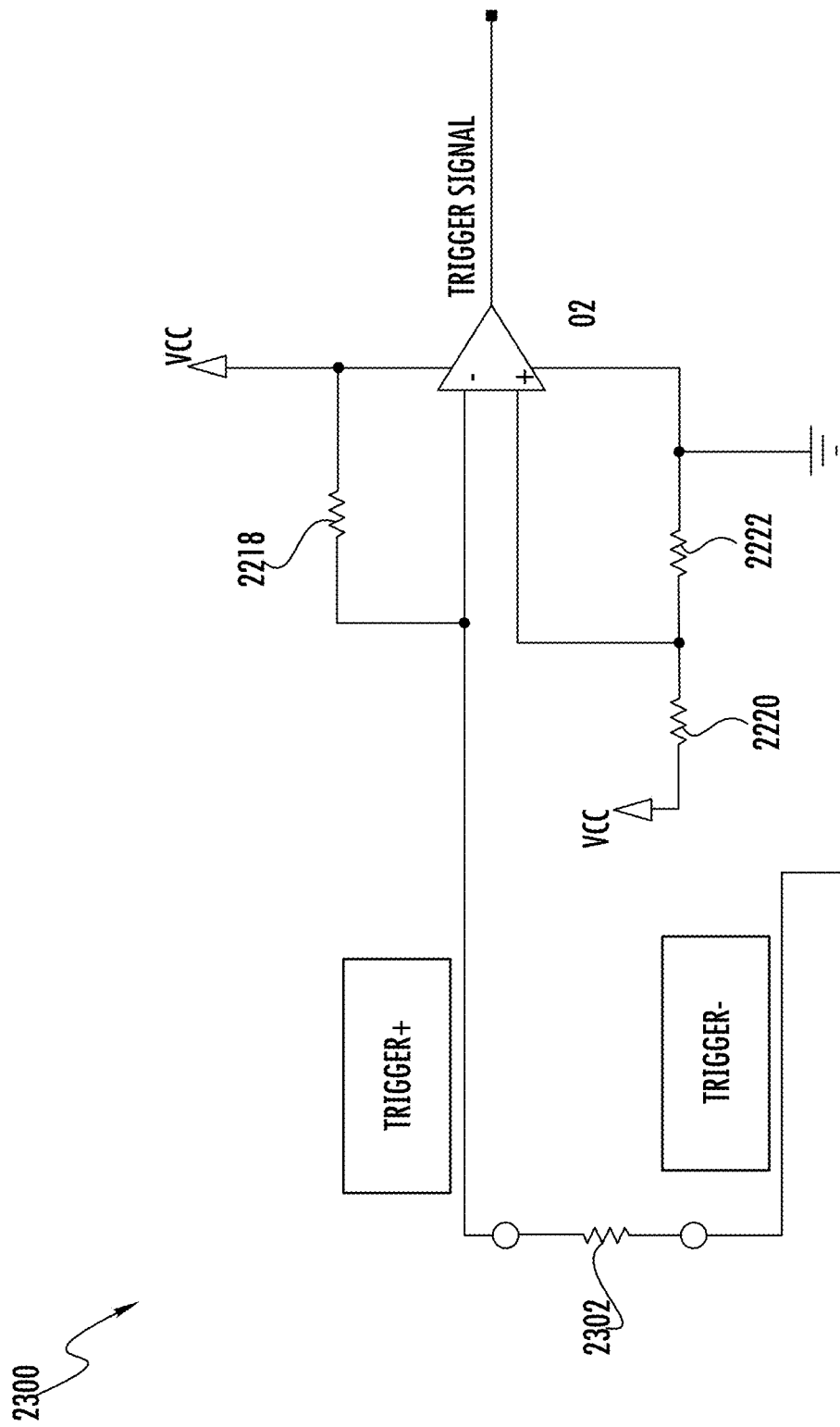
FIG. 23 illustrates an equivalent electronic circuit of a first trigger circuit when the glove is wet, according to one or more embodiments described herein.

FIG. 23 illustrates an equivalent electronic circuit 2300 of the first trigger circuit 2102 when the glove 104 is wet, according to one or more embodiments described herein.

In an example embodiment, the equivalent electronic circuit 2300 is similar to the electronic circuit 2200. Additionally, the equivalent electronic circuit 2300 has a fourth resistive element 2302 coupled between the first input terminal 2204 and the ground 2216. In an example embodiment, the fourth resistive element 2302 corresponds to an equivalent resistance of the wet glove.

Further, a value of the voltage at the first input terminal 2204, when the glove 104 is wet, is illustrated by the following equation:

$$V_{1in}=(R_4/(R_4+R_1))V_{cc} \qquad (2)$$

Where, $V_{1in}$: Voltage at the first input terminal 2204;
$R_1$: First resistive element 2218; and
$R_4$: Fourth resistive element 2302.

In some example embodiment, as discussed, the comparator 2202 is configured to generate the first trigger signal when the value of the voltage at the first input terminal 2204 (the negative terminal of the comparator 2202) is less than the value of the voltage at the second input terminal 2206 (the positive terminal of the comparator 2202). Further, the comparator 2202 does not generate the first trigger signal when the value of the voltage at the first input terminal 2204 (the negative terminal of the comparator 2202) is greater than the value of the voltage at the second input terminal 2206 (the positive terminal of the comparator 2202), as is illustrated by following equation:

$$(R_4/(R_4+R_1))V_{cc} > (R_3/(R_3+R_2))V_{cc} \quad (3)$$

In an example embodiment, the equation 3 can be simplified as following equation:

$$(R_4/R_1) > (R_3/R_2) \quad (4)$$

In an example embodiment, referring to equations 3 and 4, the value of the voltages at the first input terminal 2204 and the second input terminal 2206 is dependent on the values of the first resistive element 2218, the second resistive element 2220, the third resistive element 2222, and the fourth resistive element 2302. Therefore, to avoid the false triggering of the first trigger circuit 2102 when the glove 104 is wet, the values of the third resistive element 2222 and the second resistive element 2220 are selected such that when the glove 104 is wet, the ratio of the third resistive element 2222 and the second resistive element 2220 remains less than the ratio of the fourth resistive element 2302 to the first resistive element 2218. In an example embodiment, the values of the third resistive element 2222 and the second resistive element 2220 are set during the manufacturing of the mobile scanning device 102.

In an instance in which the worker intentionally touches the first conductive pad 304 with the second conductive pad 402, the value of the fourth resistive element 2302 is set to zero. Therefore, ratio of the fourth resistive element 2302 to the first resistive element 2218 becomes zero. Accordingly, the ratio of the fourth resistive element 2302 to the first resistive element 2218 becomes less than the ratio of the third resistive element 2222 and the second resistive element 2220. Accordingly, the value of the voltage at the first input terminal 2204 (the negative terminal of the comparator 2202) becomes less than the value of the voltage at the second input terminal 2206 (the positive terminal of the comparator 2202) causing the comparator 2202 to generate the first trigger signal.

In some example, the scope of the disclosure is not limited to the fourth resistance ($R_4$) becoming absolute zero when the user of the glove 104 contacts the first conductive pad 304 with the second conductive pad 402. In some examples, a value of the fourth resistance ($R_4$) approaches zero however may not be absolute zero, when the user of the glove 104 contacts the first conductive pad 304 with the second conductive pad 402. For example, the value of the fourth resistance ($R_4$) may be 100 ohms when the user of the glove 104 contacts the first conductive pad 304 with the second conductive pad 402. To this end, in an example embodiment, the values of the third resistive element 2222 and the second resistive element 2220 are selected such that when the first conductive pad 304 is brought in contact with the second conductive pad 402, the ratio of the third resistive element 2222 and the second resistive element 2220 becomes greater than the ratio of the fourth resistive element 2302 to the first resistive element 2218.

In an example embodiments, the second trigger circuit 2104 also has the similar circuit as that of the first trigger circuit 2102.

Figure 24:
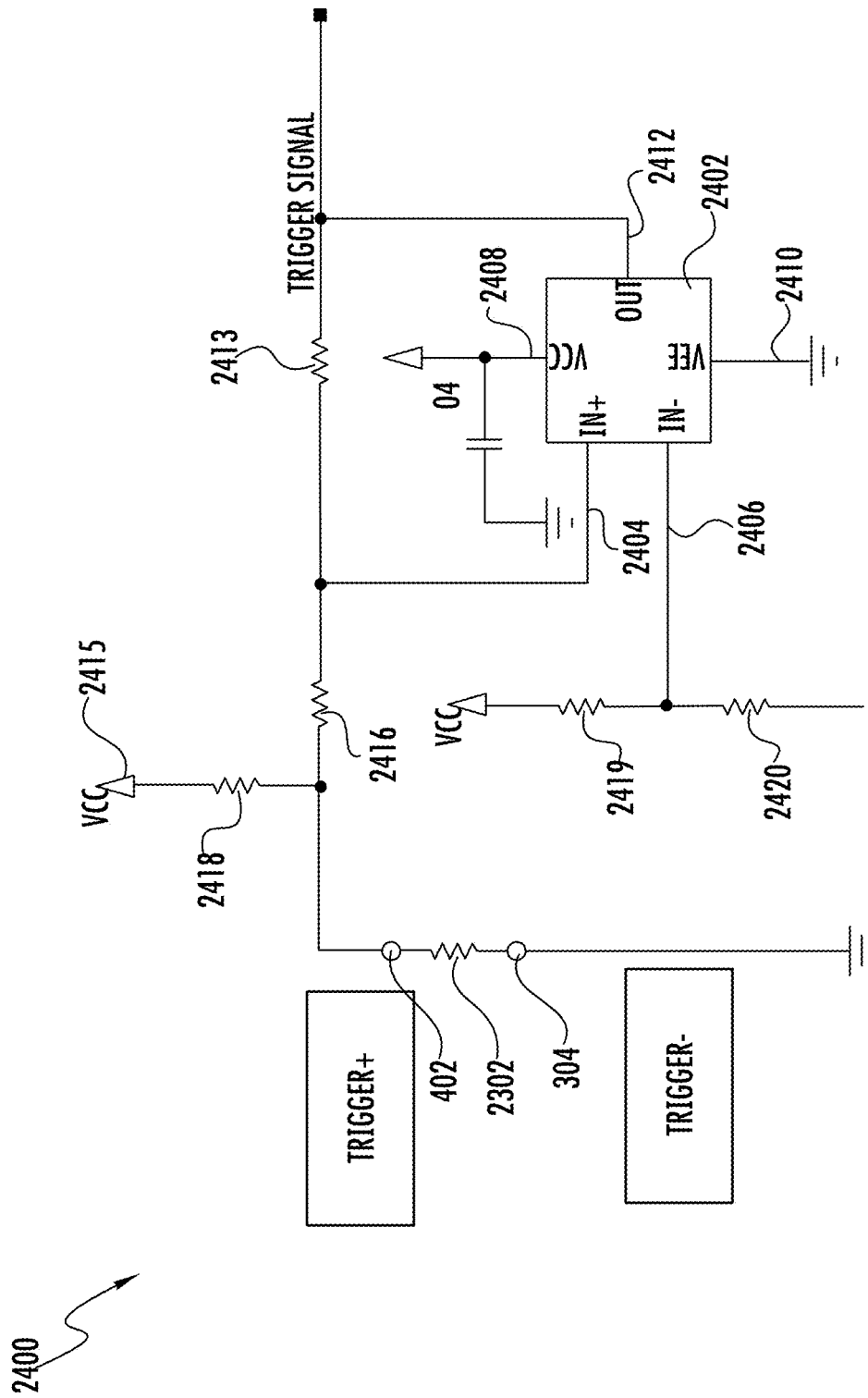
FIG. 24 illustrates an electronic circuit of a first trigger circuit, according to one or more embodiments described herein.

FIG. 24 illustrates an electronic circuit 2400 of the first trigger circuit 2102, according to one or more embodiments described herein. The electronic circuit 2400 comprises a comparator 2402 that has a first input terminal 2404, a second input terminal 2406, a voltage input terminal 2408, a ground input terminal 2410, and an output terminal 2412. Further, the electronic circuit 2400 depicts that the first conductive pad 304 is coupled to a ground 2414.

The first input terminal 2404 of the comparator 2402 is coupled to the output terminal 2412 of the comparator 2402 through a fifth resistive element 2413. Further, the first input terminal 2404 of the comparator 2402 is coupled to a voltage source 2415 through the sixth resistive element 2416 and a seventh resistive element 2418. Furthermore, the first input terminal 2404 of the comparator 2402 is coupled to the second conductive pad 402 through the sixth resistive element 2416.

The second input terminal 2406 of the comparator 2402 is coupled to the voltage source 2415 through an eighth resistive element 2419. Further, second input terminal 2406 of the comparator 2402 is coupled to a ground 2414 through ninth resistive element 2420.

The voltage input terminal 2408 of the comparator 2402 is coupled to the voltage source 2415. Further, voltage input terminal 2408 of the comparator 2402 is coupled to the ground 2414 through a first capacitive element 2424. Further, the ground input terminal 2410 of the comparator 2402 is coupled to the ground 2414.

In operation, when the glove 104 is wet, the first conductive pad 304 electrically couples or is in electrical communication with the second conductive pad 402 through the fourth resistive element 2302. As discussed above, the fourth resistive element 2302 corresponds to the equivalent resistance of the wet glove. In an example embodiment, for the comparator 2402 to generate the trigger signal when the worker brings the first conductive pad 304 in contact with the second conductive pad 402, the following condition is to be satisfied:

$$V_{cc}R_4/(R_4+R_7) < (R_6(V_{cc}R_9/(R_9+R_8)/R_5) + V_{cc}R_9/(R_9+R_8) \quad (5)$$

Where,
$R_7$: Seventh resistive element 2418;
$R_6$: Sixth resistive element 2416;
$R_9$: Ninth resistive element 2420;
$R_8$: Eighth resistive element 2419; and
$R_5$: Fifth resistive element 2413.

In an example embodiment, the values of the sixth resistive element 2416 and the fifth resistive element 2413 are selected in such a manner that the aforementioned condition depicted in equation 4 is true when the worker causes the first conductive pad 304 to contact with the second conductive pad 402. In an example embodiment, when the worker of the mobile scanning device 102 brings the first conductive pad 304 in contact with the second conductive pad 402, the value of the fourth resistive element 2302 becomes zero. Therefore, the Left Hand Side (LHS) of the equation 4 becomes zero causing the comparator 2402 to generate the first trigger signal.

For instance, when the worker causes the first conductive pad 304 to contact with the second conductive pad 402, the first input terminal 2404 and the second input terminal 2406 of the comparator 2402 receives the voltage signal in accordance with the condition mentioned in the equation 5. In some examples, the value of the voltage received at the first input terminal 2404 is greater than the value of the voltage received at the second input terminal 2406. Accordingly, the comparator 2404 generates the first trigger signal.

Further, in an example scenario, where the glove 104 is wet, the value of the fourth resistive element 2302 is non-zero. Accordingly, the first input terminal 2404 and the second input terminal 2406 receives the value of the voltage in accordance with the condition mentioned in equation 5 (e.g., the LHS of the equation 5 is non-zero). In some examples, the value of the voltage received at the first input terminal 2404 is less than the value of the voltage received at the second input terminal 2406. Accordingly, the comparator 2402 does not generates the first trigger signal.

As discussed in conjunction with FIG. 21, the communication interface 2114 facilitate transmission and reception of messages/data from various computing devices. In some examples embodiments, the communication interface 2114 may utilize an antenna element to transmit data/messages to and from the mobile scanning device 102. In some embodiments, the antenna element may knitted on the glove 104, as is further described in conjunction with FIG. 25A and FIG. 25B.

Figure 25A:
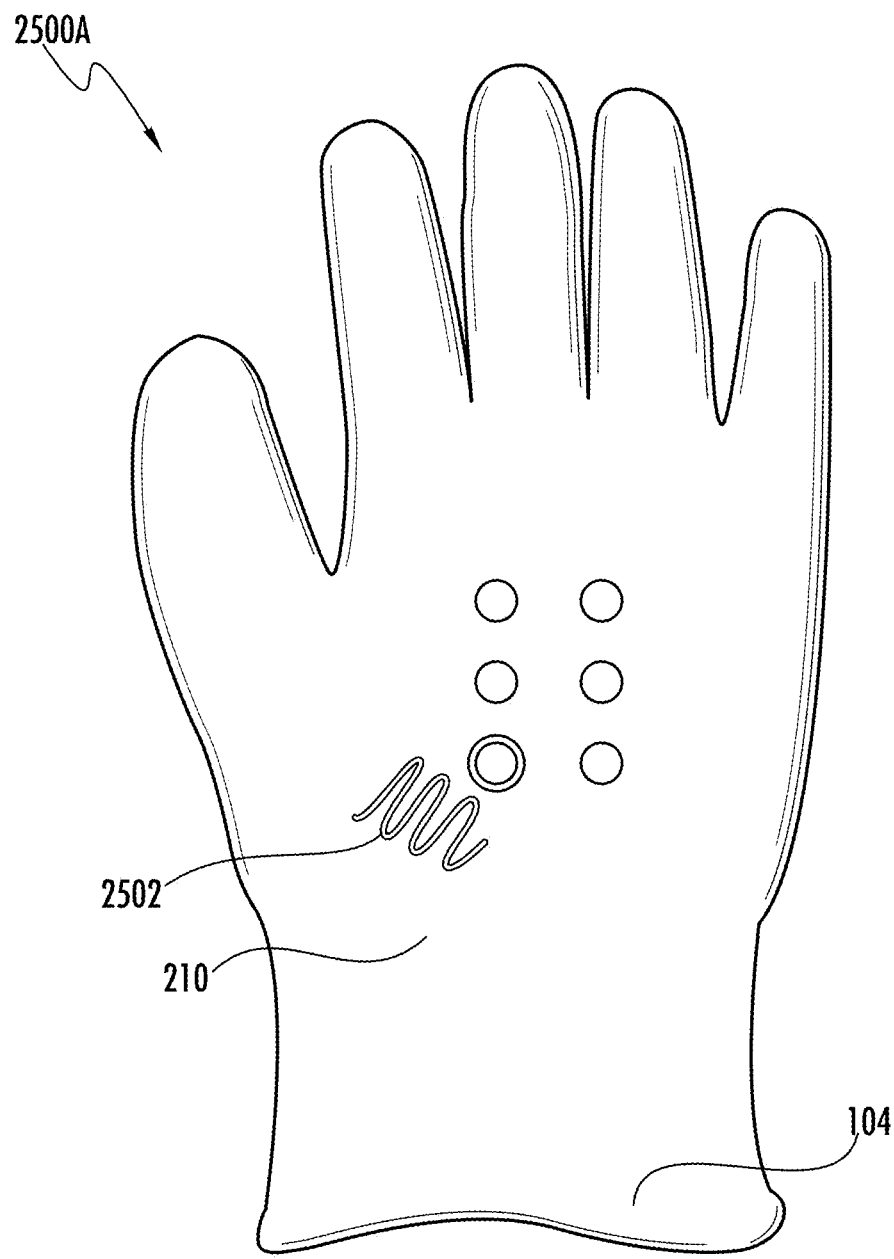
FIGS. 25A and 25B illustrates top views of a glove, according to one or more embodiments described herein.
Figure 25B:
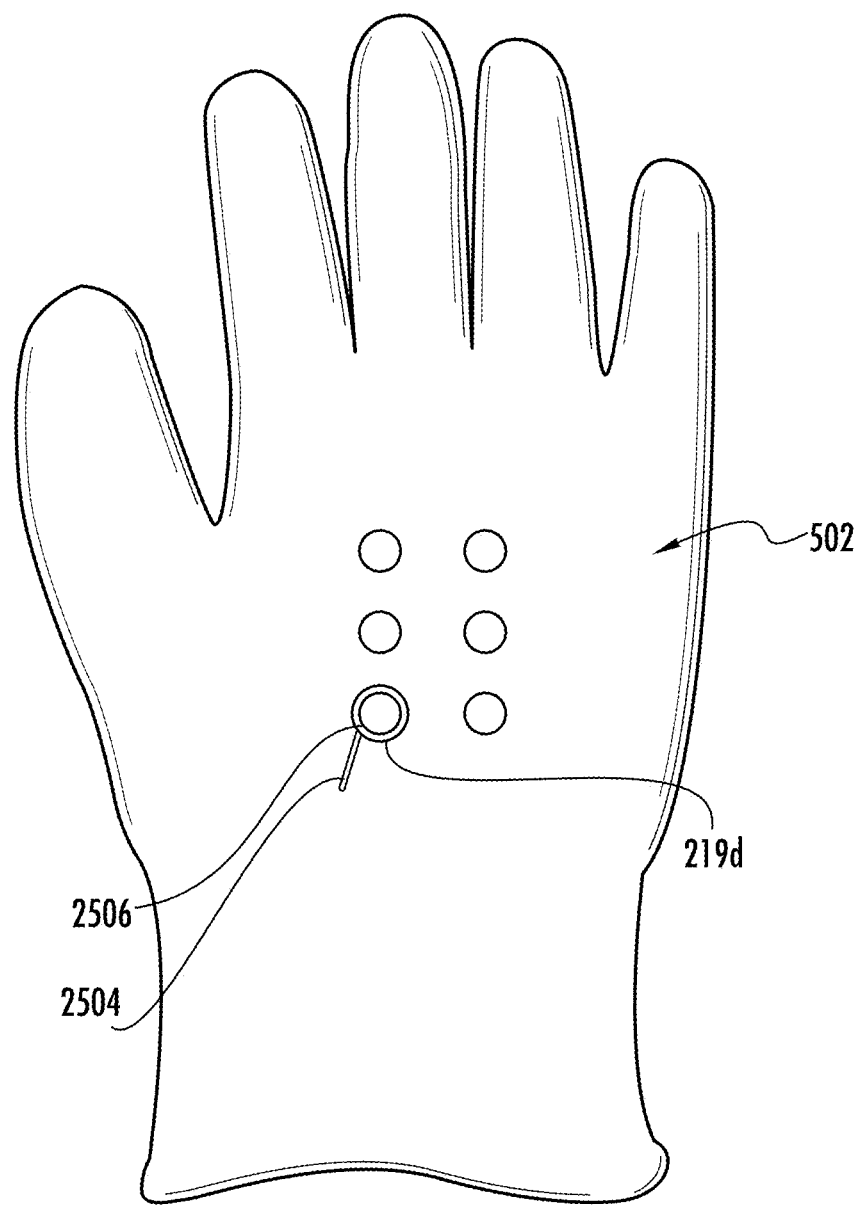

FIGS. 25A and 25B illustrates a top view 2500A of the glove 104 and a top view 2500B of the glove 104 inside out, respectively, according to one or more embodiments described herein.

Referring to the top view 2500A, on the outer surface 210 of the glove 104, an antenna element 2502 is knitted. In an example embodiment, the antenna element 2502 is knitted using the same conductive yarn as is used for knitting the first conductive pad 304 and the second conductive pad 402.

Referring to the top view 2500B, on the inner surface 502 of the glove 104, a fourth conductive path 2504 is knitted to connect the antenna element 2502 to a fourth conductive region 2506. In an example embodiment, the fourth conductive region 2506 is knitted around the periphery of the first via hole 219d. When the mobile scanning device 102 couples with the glove 104, the antenna element 2502 couples with the communication interface 2114 of the mobile scanning device 102 through the fourth conductive region.

Figure 26:
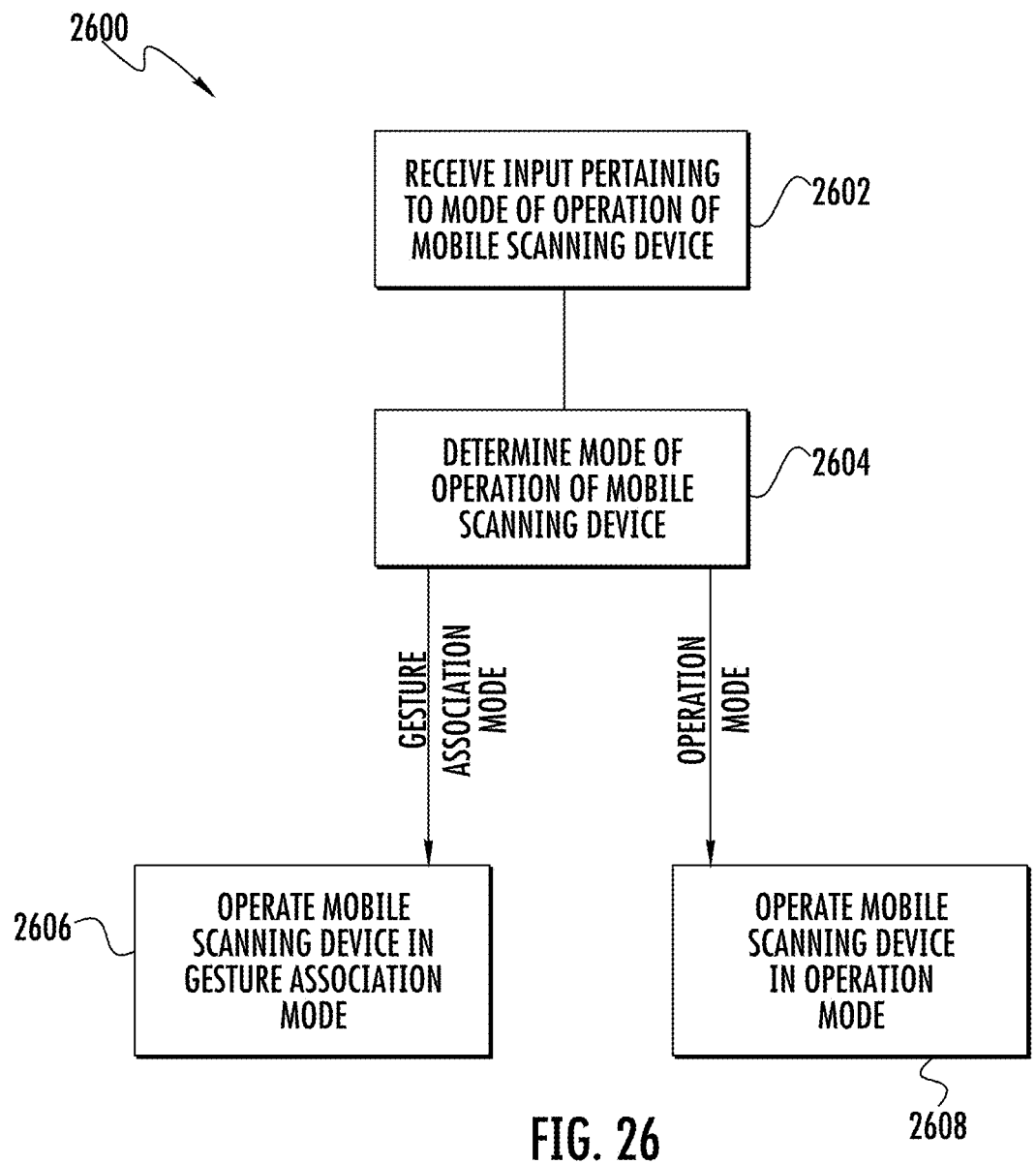
FIG. 26 illustrates a flowchart of a method for operating the mobile scanning device, according to one or more embodiments described herein.

FIG. 26 illustrates a flowchart 2600 of a method for operating the mobile scanning device 102, according to one or more embodiments described herein.

At step 2602, the mobile scanning device 102 includes means such as, the control system 2108, the processor 2110, the gesture identification unit 2116, and/or the like, for receiving an input pertaining to a mode of operation of the mobile scanning device 102. In an example embodiment, the gesture identification unit 2116 may be configured to receive the input from the worker (using the mobile scanning device 102) through the touch panel provided on the display screen 2106. In alternate embodiment, the gesture identification unit 2116 may be configured to provide the input through one or more buttons (not shown) on the mobile scanning device 102.

Prior to receiving the input from the worker, the gesture identification unit 2116 may cause the display screen 2106 to display one or more modes of operation of the mobile scanning device 102. The one or more modes of operation may include, but not limited to, the gesture association mode and the operation mode. The worker, using the mobile scanning device 102, may provide the input to select an option corresponding to the mode of operation of the mobile scanning device 102 in which she wishes to operate the mobile scanning device 102. For example, the worker may provide the input, through the display screen 2106, to operate the mobile scanning device 102 in the gesture association mode.

At step 2604, the mobile scanning device 102 includes means such as, the control system 2108, the processor 2110, the gesture identification unit 2116, and/or the like for determining the mode of operation of the mobile scanning device 102 based on the received input. In an example embodiment, if the gesture identification unit 2116 determines that the input corresponds to selection of the gesture association mode, the gesture identification unit 2116 may be configured to perform step 2606.

At step 2606, the mobile scanning device 102 includes means such as, the control system 2108, the processor 2110, the gesture identification unit 2116 and/or the like, for operating the mobile scanning device 102 in the gesture association mode. The operation of the mobile scanning device 102 in the gesture association mode has been described in conjunction with FIG. 27.

If at step 2604, the gesture identification unit 2116 determines that the input corresponds to selection of the operation mode, the gesture identification unit 2116 may be configured to perform the step 2608. At step 2608, the mobile scanning device 102 includes means such as, the control system 2108, the processor 2110, the gesture identification unit 2116 and/or the like, for operating the mobile scanning device 102 in the operation mode. The operation of the mobile scanning device 102 in the operation mode has been described in conjunction with FIG. 29.

Figure 27:
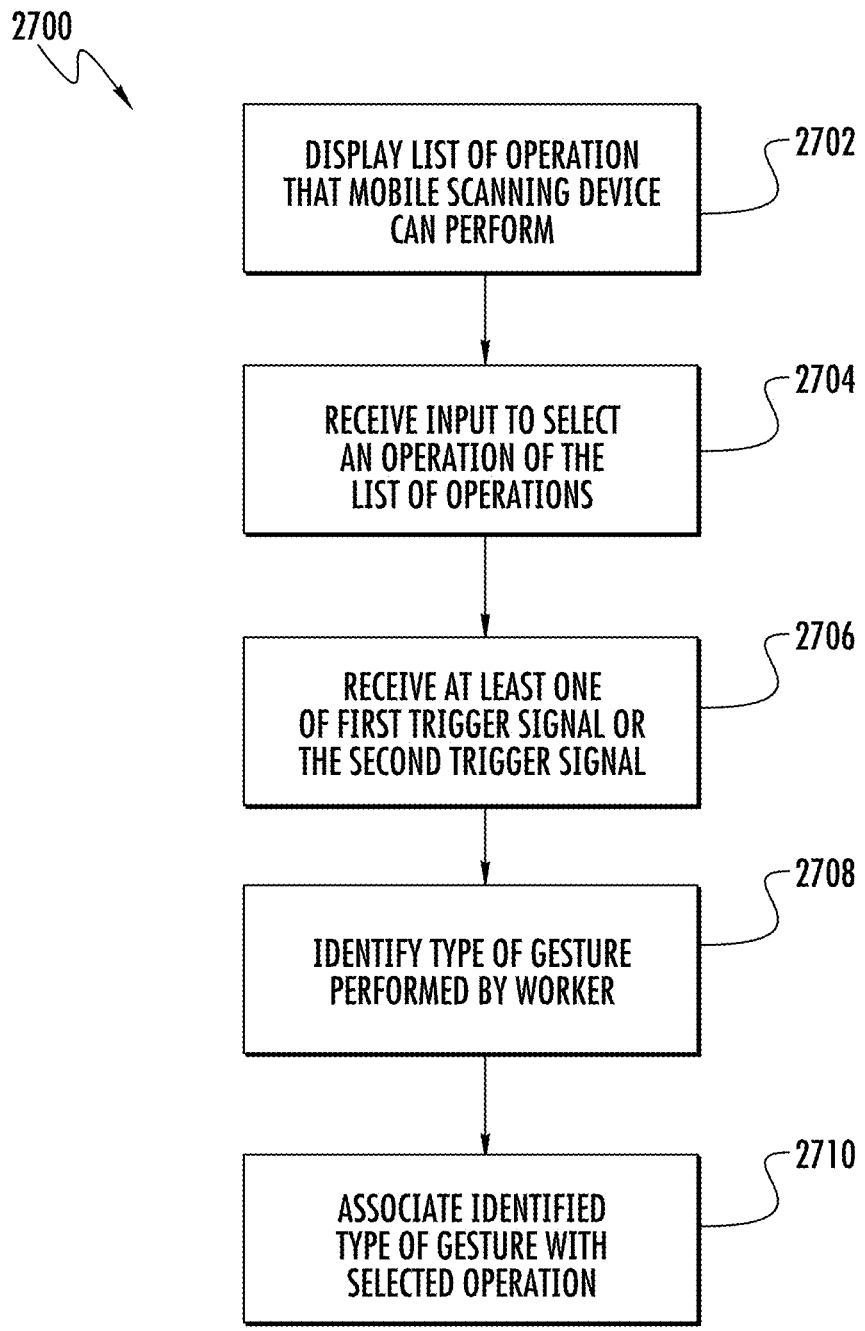
FIG. 27 illustrates a flowchart for operating the mobile scanning device in a gesture association mode, according to one or more embodiments described herein.

FIG. 27 illustrates a flowchart 2700 for operating the mobile scanning device 102 in the gesture association mode, according to one or more embodiments described herein.

At step 2702, the mobile scanning device 102 includes means such as, the control system 2108, the processor 2110, the gesture identification unit 2116, and/or the like, for causing the display screen 2106 to display a list of operations that the mobile scanning device 102 is configured to perform. For example, the list of operations may include, but not limited to, triggering the image capturing assembly 116, activating the display screen 2106, scrolling through data being displayed on the display screen 2106, and/or the like. In an example embodiment, the list of operations may be pre-programmed in the mobile scanning device 102 and may be pre-stored in the memory device 2112 of the control system 2108. The gesture identification unit 2116 may be configured to retrieve the list of operations from the memory device 2112 and display the list of operations on the display screen 2106.

At step 2704, the mobile scanning device 102 includes means such as, the control system 2108, the processor 2110, the gesture identification unit 2116, and/or the like, for receiving an input to select an operation of the list of operations displayed on the display screen 2106. In an example embodiment, the gesture identification unit 2116 may be configured to receive the input pertaining to selection of the operation of the mobile scanning device 102, from the worker. In some embodiments, the worker may provide the input through the touch panel included in the display screen 2106. In alternate embodiment, the worker may provide the input through the one or more buttons (not shown) on the mobile scanning device 102.

At step 2706, the mobile scanning device 102 includes means such as, the control system 2108, the processor 2110, the gesture identification unit 2116, and/or the like, for receiving at least one of the first trigger signal or the second trigger signal. As discussed supra, the first trigger circuit 2102 generates the first trigger signal when the worker, wearing the glove 104, contacts with the first conductive pad 304 with the second conductive pad 402. To this end, as discussed, the worker would have performed the gesture 2000A to bring the first conductive pad 304 in contact with the second conductive pad 402. Therefore, the reception of the first trigger signal (from the first trigger circuit 2102) by the gesture identification unit 2116 may indicate that the worker may have performed the gesture 2000A. Similarly, the reception of the second trigger signal (from the second trigger circuit 2104) may indicate that the worker may have performed the gesture 2000B. Hence, the reception of the first trigger signal and/or the second trigger signal may indicate that the worker may have performed a gesture using the glove 104

At step 2708, the mobile scanning device 102 includes means such as, the control system 2108, the processor 2110, the gesture identification unit 2116, and/or the like, for identifying the type of gesture performed by the worker. The identification of the type of gesture performed by the worker has been further described in conjunction with FIG. 28.

Figure 28:
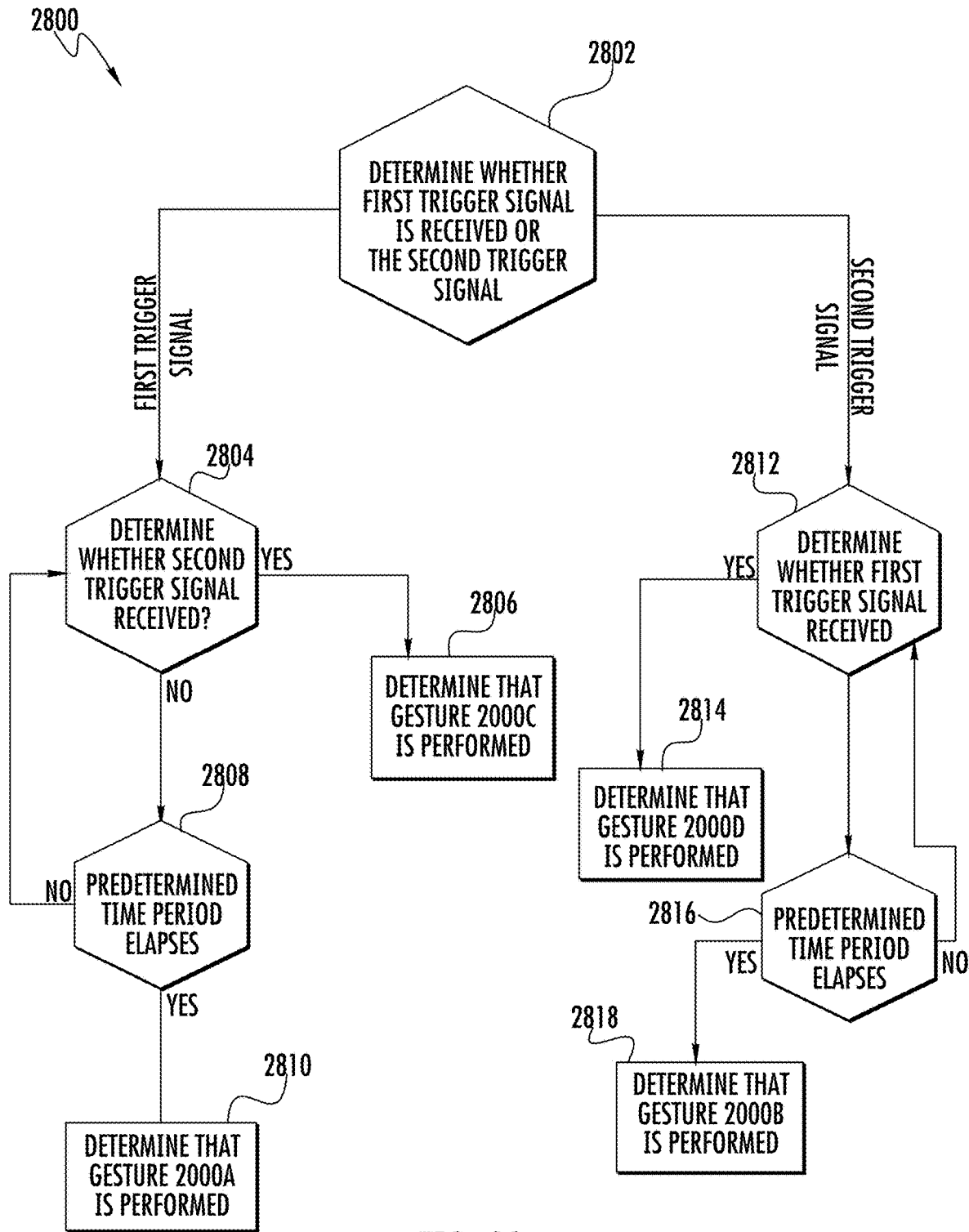
FIG. 28 illustrates a flowchart of a method for identifying a type of a gesture performed by a worker, according to one or more embodiments described herein.

FIG. 28 illustrates a flowchart 2800 of a method for identifying the type of the gesture performed by the worker, according to one or more embodiments described herein.

At step 2802, the mobile scanning device 102 includes means such as, the control system 2108, the processor 2110, the gesture identification unit 2116, and/or the like, for determining whether the gesture identification unit 2116 has received the first trigger signal from the first trigger circuit 2102 or has received the second trigger signal from the second trigger circuit 2104. In an instance in which the gesture identification unit 2116 receives the first trigger signal, the gesture identification unit 2116 may determine that the worker may have brought the first conductive pad 304 in contact with the second conductive pad 402. Accordingly, the gesture identification unit 2116 may perform the step 2804.

At step 2804, the mobile scanning device 102 includes means such as, the control system 2108, the processor 2110, the gesture identification unit 2116, and/or the like, for determining whether the gesture identification unit 2116 has received the second trigger signal after the reception of the first trigger signal. In an example embodiment, the reception of the second trigger signal indicates that the worker has brought the first conductive pad 304 in contact with the third conductive pad 1902. Further, the reception of the second trigger signal after the reception of the first trigger signal indicates that the worker may have first brought the first conductive pad 304 in contact with the second conductive pad 402 followed by bringing the first conductive pad 304 in contact with the third conductive pad 1902, thereby performing the swipe-down gesture 2000C. As discussed, to perform the swipe-down gesture 2000C, the worker may have swiped the first conductive pad 304 (knitted on the thumb region 305) on the posterior portion 202 of the middle finger region 404 from the second end 203 of the glove 104 towards the metacarpal region 206.

In an instance in which the gesture identification unit 2116 receives the second trigger signal after the reception of the first trigger signal, the gesture identification unit 2116 may perform the step 2806. At step 2806, the mobile scanning device 102 includes means such as, the control system 2108, the processor 2110, the gesture identification unit 2116, and/or the like, for determining that the gesture performed by the worker is the swipe-down gesture 2000C.

However, in an instance in which the gesture identification unit 2116 has not received the second trigger signal, the gesture identification unit 2116 is configured to perform the step 2808. At step 2808, the mobile scanning device 102 includes means such as, the control system 2108, the processor 2110, the gesture identification unit 2116, and/or the like, for determining whether a predetermined time period has elapsed. If the gesture identification unit 2116 determines that the predetermined time period has elapsed, the gesture identification unit 2116 may be configured to perform the step 2810. However, if the gesture identification unit 2116 identifies that the predetermined time period has not elapsed, the gesture identification unit 2116 may be configured to repeat the step 2804.

At step 2810, the mobile scanning device 102 includes means such as, the control system 2108, the processor 2110, the gesture identification unit 2116, and/or the like, for determining that the gesture performed by the worker is the gesture 2000A. As discussed, to perform the gesture 2000A the worker may have brought the first conductive pad 304 with the second conductive pad 402.

Referring to step 2802, in an instance in which the gesture identification unit 2116 has received the second trigger signal from the second trigger circuit, the gesture identification unit 2116 may be configured to perform the step 2812. At step 2812, the mobile scanning device 102 includes means such as, the control system 2108, the processor 2110, the gesture identification unit 2116, and/or the like, for determining whether the gesture identification unit 2116 has received the first trigger signal after the reception of the second trigger signal. In an example embodiment, the reception of the first trigger signal indicates that the worker has brought the first conductive pad 304 in contact with the second conductive pad 402. Further, the reception of the first trigger signal after the reception of the second trigger signal indicates that the worker may have first brought the first conductive pad 304 in contact with the third conductive pad 1902 followed by bringing the first conductive pad 304 in contact with the second conductive pad 402, thereby performing the gesture 2000D. As discussed, to perform the gesture 2000D the worker may have swiped the first conductive pad 304 (knitted on the thumb region 305) on the posterior portion 202 of the middle finger region 404 from the third conductive pad 1902 towards the second end 203 of the glove 104.

In an instance in which the gesture identification unit 2116 has received the first trigger signal after the reception of the second trigger signal, the gesture identification unit 2116 may perform the step 2814. At step 2814, the mobile scanning device 102 includes means such as, the control system 2108, the processor 2110, the gesture identification unit 2116, and/or the like, for determining that the gesture performed by the worker is gesture 2000D.

However, in an instance in which the gesture identification unit 2116 has not received the first trigger signal, the gesture identification unit 2116 is configured to perform the step 2816. At step 2816, the mobile scanning device 102 includes means such as, the control system 2108, the processor 2110, the gesture identification unit 2116, and/or the like, for determining whether the predetermined time period has elapsed. If the gesture identification unit 2116 determines that the predetermined time period has elapsed, the gesture identification unit may be configured to perform the step 2818. At step 2818, the mobile scanning device 102 includes means such as, the control system 2108, the processor 2110, the gesture identification unit 2116, and/or the like, for determining that the gesture performed by the worker is the gesture 2000B.

However, if at step 2816, the gesture identification unit 2116 determines that the predetermined time period has not elapsed, the gesture identification unit 2116 may be configured to repeat the step 2812.

In some embodiments, the scope of the disclosure is not limited to identifying only four types of the gestures (e.g., the gesture 2000A, the gesture 2000B, the gesture 2000C, and the gesture 2000D). In an example embodiment, the gesture identification unit 2116 may be configured to identify more than four gestures based on various permutations and combinations of at least one of the sequence of reception of the first trigger signal and the second trigger signal or duration of reception of the first trigger signal and the second trigger signal.

Figure 29:
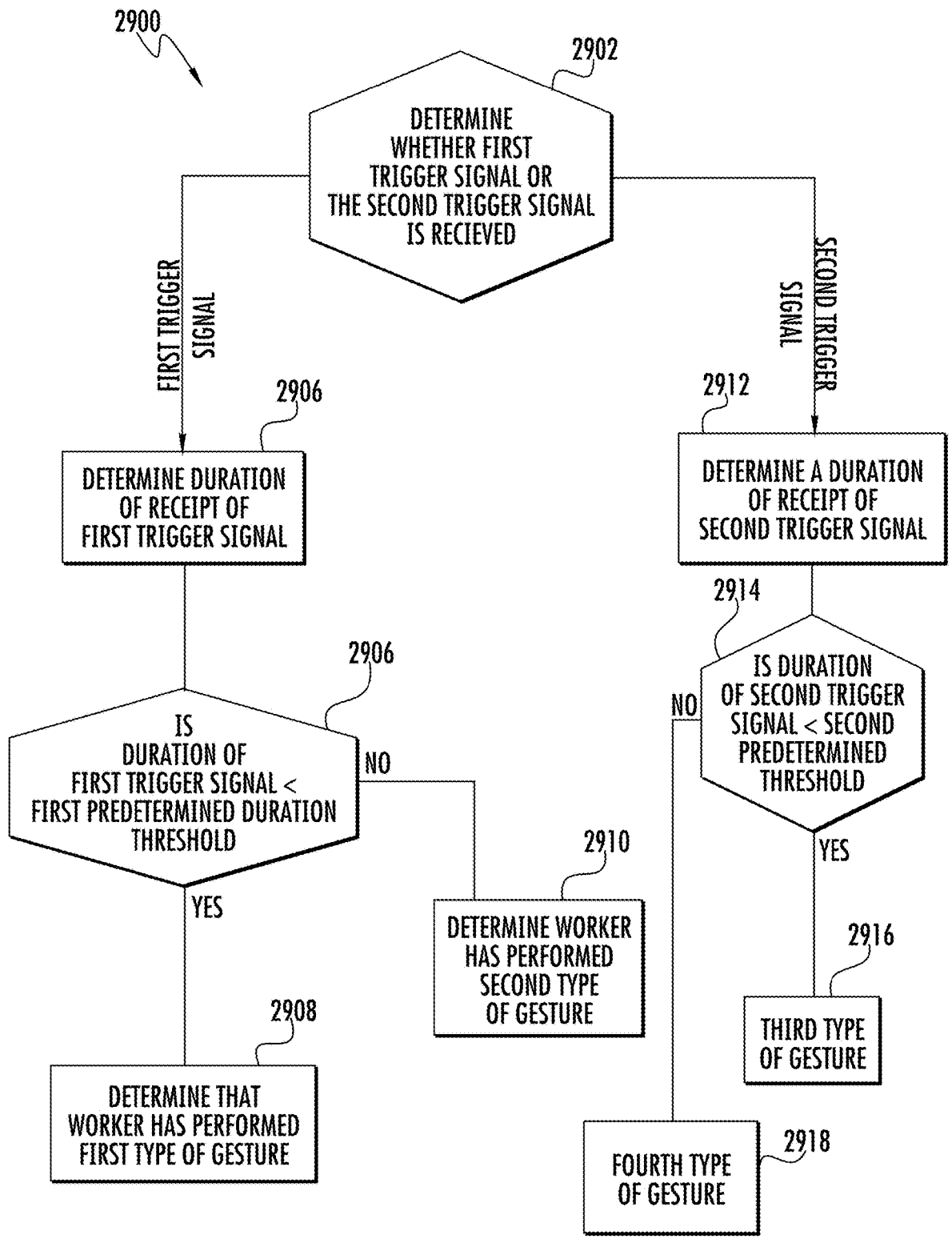
FIG. 29 illustrates another flowchart of a method for identifying a type of a gesture performed by a worker, according to one or more embodiments described herein.

FIG. 29 illustrates another flowchart 2900 of a method for identifying a type of gesture performed by a worker, according to one or more embodiments described herein.

At step 2902, the mobile scanning device 102 includes means such as, the control system 2108, the processor 2110, the gesture identification unit 2116, and/or the like, for determining whether the gesture identification unit 2116 has received the first trigger signal from the first trigger circuit 2102 or has received the second trigger signal from the second trigger circuit 2104. In an instance in which the gesture identification unit 2116 receives the first trigger signal, the gesture identification unit 2116 may determine that the worker may have brought the first conductive pad 304 in contact with the second conductive pad 402. Accordingly, the gesture identification unit 2116 may perform the step 2904. However, if the gesture identification unit 2116 determines that the gesture identification unit receives the second trigger signal, the gesture identification unit 2116 may perform the step 2912.

At step 2904, the mobile scanning device 102 includes means such as, the control system 2108, the processor 2110, the gesture identification unit 2116, and/or the like, for determining a duration of the receipt of the first trigger signal. At step 2906, the mobile scanning device 102 includes means such as, the control system 2108, the processor 2110, the gesture identification unit 2116, and/or the like, for determining whether the duration of receipt of the first trigger signal is less than a first predetermined duration threshold. If the gesture identification unit 2116 determines that the duration of the receipt of the first trigger signal is less than first predetermined duration threshold, the gesture identification unit 2116 may perform the step 2908. However, if the gesture identification unit 2116 determines that the duration of the receipt of the first trigger signal is greater than the first predetermined duration threshold, the gesture identification unit 2116 may be configured to perform the step 2910.

At step 2908, the mobile scanning device 102 includes means such as, the control system 2108, the processor 2110, the gesture identification unit 2116, and/or the like, for determining that the worker has performed a first type of gesture.

At step 2910, the mobile scanning device 102 includes means such as, the control system 2108, the processor 2110, the gesture identification unit 2116, and/or the like, for determining that the worker has performed a second type of gesture.

Referring back to the 2902, if the gesture identification unit 2116 determines that the second trigger signal is received, at step 2912, the mobile scanning device 102 includes means such as, the control system 2108, the processor 2110, the gesture identification unit 2116, and/or the like, for determine a duration of reception of the second trigger signal. Thereafter, at step 2914, the mobile scanning device 102 includes means such as, the control system 2108, the processor 2110, the gesture identification unit 2116, and/or the like, for determining whether the duration of the receipt of the second trigger signal is less than a second predetermined duration threshold. If the gesture identification unit 2116 determines that the duration of the receipt of the second trigger signal is less than second predetermined duration threshold, the gesture identification unit 2116 may perform the step 2916. However, if the gesture identification unit 2116 determines that the duration of the receipt of the second trigger signal is greater than the second predetermined duration threshold, the gesture identification unit 2116 may be configured to perform the step 2918. In some examples, the first predetermined duration threshold has same value as the second predetermined duration threshold. Further, both the first predetermined duration threshold and the second predetermined duration threshold are predefined during manufacturing of the mobile scanning device 102.

At step 2916, the mobile scanning device 102 includes means such as, the control system 2108, the processor 2110, the gesture identification unit 2116, and/or the like, for determining that the worker has performed a third type of gesture.

At step 2918, the mobile scanning device 102 includes means such as, the control system 2108, the processor 2110, the gesture identification unit 2116, and/or the like, for determining that the worker has performed a fourth type of gesture.

In some examples, the gesture identification unit 2116 may determine the type of gesture based on a combination of the duration of the receipt of the first trigger signal or the second trigger signal, and the sequence of receipt of the first trigger signal and the second trigger signal. For example, the gesture identification unit 2116 may determine that the worker has performed the gesture 2000C if the gesture identification unit 2116 receives the first trigger signal for the first predetermined duration threshold followed by second trigger signal. Similarly, the gesture identification unit 2116 may determine that the worker has performed the gesture 2000D if the gesture identification unit 2116 receives the second trigger signal for the second predetermined duration threshold followed by first trigger signal.

Referring back to FIG. 27, at step 2710, the mobile scanning device 102 includes means such as, the control system 2108, the processor 2110, the gesture identification unit 2116, and/or the like, for associating the identified type of gesture with the selected operation (selected at step 2704) of the mobile scanning device 102. In an example embodiment, the gesture identification unit 2116 may create a lookup table indicating the association between the identified type of gestures and the selected operation of the mobile scanning device 102. Following table illustrates an example lookup table:

TABLE 1 look-up table illustrating association between the type of gestures and the operation of the mobile scanning device 102.

| Type of gestures | Operation of the mobile scanning device 102 |
|---|---|
| Gesture 2000A | Trigger image capturing assembly 116/OK |
| Gesture 2000B | Cancel |
| Gesture 2000C | Scroll-up data being displayed on display screen 2106 |
| Gesture 2000D | Scroll-down data being displayed on display screen 2106 |

Figure 30:
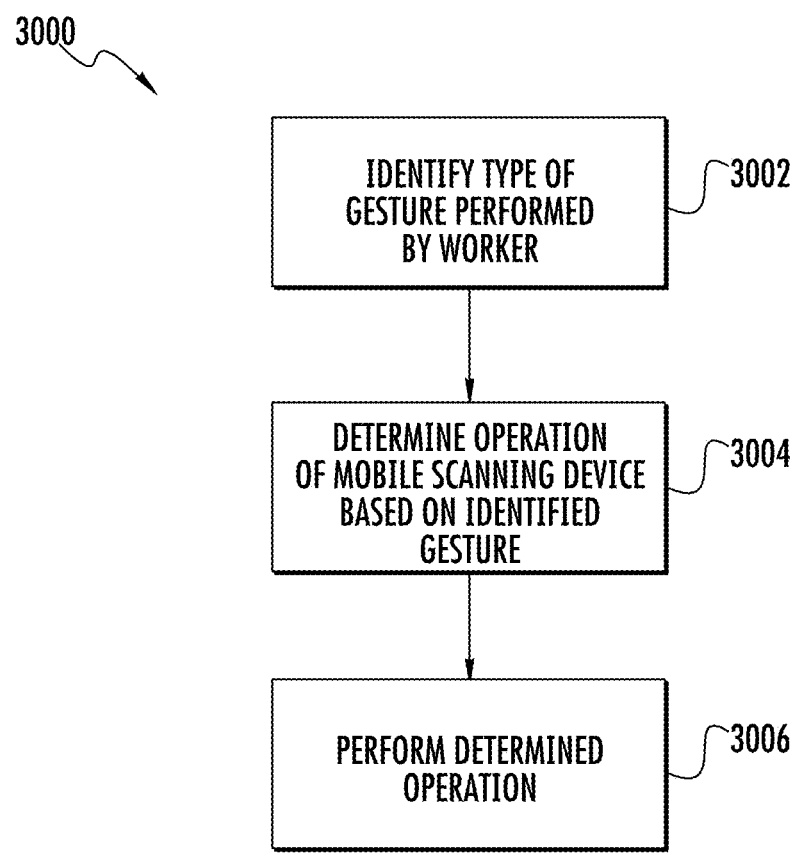
FIG. 30 illustrates a flowchart of a method for operating the mobile scanning device in an operation mode, according to one or more embodiments described herein.

FIG. 30 illustrates a flowchart 3000 of a method for operating the mobile scanning device 102 in the operation mode, according to one or more embodiments described herein.

At step 3002, the mobile scanning device 102 includes means such as, the control system 2108, the processor 2110, the gesture identification unit 2116, and/or the like, for identifying the type of gesture performed by the worker wearing the glove 104) and using the mobile scanning device 102. In an example embodiment, the gesture identification unit 2116 may determine the type of gesture using similar methodology, as is described in the flowchart 2800. For example, the gesture identification unit 2116 may determine whether it has received the first trigger signal or the second trigger signal. In an instance in which the gesture identification unit 2116 receives the first trigger signal, the gesture identification unit 2116 may determine whether it has received the second trigger signal after the reception of the first trigger signal. In an instance in which the gesture identification unit 2116 receives the second trigger signal after the reception of the first trigger signal, the gesture identification unit 2116 determines that the worker has performed the gesture 2000C. However, in an instance in which the gesture identification unit 2116 has not received the second trigger signal after the reception of the first trigger signal, the gesture identification unit 2116 determines that the worker has performed the gesture 2000A. Similarly, the gesture identification unit 2116 may identify the gesture 2000B and 2000D.

At step 3004, the mobile scanning device 102 includes means such as, the control system 2108, the processor 2110, the gesture identification unit 2116, and/or the like, for determining the operation of the mobile scanning device 102 associated with the identified gesture. In an example embodiment, the gesture identification unit 2116 may utilize the look-up table (e.g., table 1) to determine the operation of the mobile scanning device 102. For instance, if the gesture identification unit 2116 determines that the gesture performed by the worker is the gesture 2000A, the gesture identification unit 2116 may determine that the image capturing assembly 116 is to be triggered. Further, the gesture identification unit 2116 transmits the determined operation to the processor 2110.

At step 3006, the mobile scanning device 102 includes means such as, the control system 2108, the processor 2110, and/or the like, for performing the determined operation. For example, the determined operation is triggering the image capturing assembly 116, the processor 2110 may cause the image capturing assembly 116 to capture an image of the machine readable indicia.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A glove comprising:
    an anterior portion;
    a posterior portion, wherein the anterior portion is knitted seamlessly with the posterior portion to define:
        a metacarpal region,
        a plurality of finger regions extending out from the metacarpal region,
    a first conductive pad knitted on the anterior portion of the glove, wherein the first conductive pad is knitted on a distal end portion of a first finger region of the plurality of finger regions; and
    a second conductive pad knitted on the posterior portion of the glove, wherein the second conductive pad is knitted on a second finger region of the plurality of finger regions, and
    wherein an electronic device is removably attached to the posterior portion and is in electrical communication with the first conductive pad and the second conductive pad, wherein, in an instance in which the electronic device is attached, the electronic device is triggered in an instance in which the first conductive pad contacts the second conductive pad.

2. The glove of claim 1, wherein the posterior portion of the glove further comprises:
    an outer surface; and
    an inner surface, wherein the outer surface defines a plurality of first via holes in the metacarpal region of the glove, and wherein each first via hole extends from the outer surface of the posterior portion to the inner surface of the posterior portion.

3. The glove of claim 2 further comprising:
    a first conductive path knitted on the inner surface of the posterior portion of the glove, wherein the first conductive path is electrically coupled to the first conductive pad;
    a second conductive path knitted on the inner surface of the posterior portion of the glove, wherein the second conductive path is electrically coupled to the second conductive pad;
    a first conductive region knitted on a periphery of a first via hole of the plurality of first via holes, wherein the first conductive path electrically couples the first conductive region with the first conductive pad; and
    a second conductive region knitted on a periphery of another first via hole of the plurality of first via holes, wherein the second conductive path electrically couples the second conductive region with the second conductive pad.

4. The glove of claim 2, wherein the plurality of first via holes is configured to receive a plurality of couplers.

5. The glove of claim 4, wherein a pad is received on the outer surface of the posterior portion of the glove, wherein the pad further comprises:
    a plurality of second via holes, wherein the pad is received on the glove in such a manner that the plurality of first via holes on the glove aligns with the plurality of second via holes on the pad.

6. The glove of claim 5, wherein the plurality of couplers extends through the plurality of second via holes.

7. The glove of claim 6, wherein the electronic device is attached on the pad through the plurality of couplers.

8. The glove of claim 4, wherein the electronic device comprises an adapter module, wherein the adapter module comprises a plurality of snap buttons, and wherein the electronic device is attached on the glove by snap fitting the plurality of snap buttons to the plurality of couplers.

9. The glove of claim 2 further comprising:
    a third conductive pad knitted on the posterior portion of the glove, wherein the third conductive pad is knitted on a third finger region of the plurality of finger regions;
    a third conductive region knitted on a periphery of a first via hole of the plurality of first via holes, wherein the third conductive region is knitted on the inner surface of the posterior portion of the glove; and
    a third conductive path knitted on the inner surface of the posterior portion of the glove, wherein the third conductive path electrically couples the third conductive pad with the third conductive region.

10. The glove of claim 2 further comprising:
    an antenna element formed on the outer surface of the glove;
    a forth conductive region knitted on a periphery of a first via hole of the plurality of first via holes, wherein the forth conductive region is knitted on the inner surface of the posterior portion of the glove; and
    a fourth conductive path knitted on the inner surface of the posterior portion of the glove, wherein the fourth conductive path electrically couples the antenna element with the forth conductive region.

11. The glove of claim 1, wherein the first conductive pad and the second conductive pad are formed of a conductive yarn.

12. The glove of claim 11, wherein the conductive yarn is selected of a group consisting of a silver coated nylon and a silver coated polyester or poly-ethylene.

13. The glove of claim 11, wherein the anterior portion of the glove has an outer surface, wherein an abrasive coating is disposed on the outer surface of the anterior portion of the glove.

14. The glove of claim 13, wherein a thickness of the abrasive coating is at most 0.6 mm.

15. The glove of claim 13, wherein a thickness of the abrasive coating is such that the conductive yarn, knitted to form the first conductive pad, is exposed to an ambient around the glove.

16. An assembly of a mobile scanning device and a glove, the assembly comprising:
    the glove comprising:
        an anterior portion;
        a posterior portion, wherein the anterior portion is knitted seamlessly with the posterior portion to define:
            a metacarpal region,
            a plurality of finger regions extending out from the metacarpal region;

a first conductive pad knitted on the anterior portion of the glove, wherein the first conductive pad is knitted on a distal end portion of a first finger region of the plurality of finger regions; and a second conductive pad knitted on the posterior portion of the glove, wherein the second conductive pad is knitted on a second finger region of the plurality of finger regions; and the mobile scanning device removably attached to the posterior portion and in electrical communication with the first conductive pad and the second conductive pad, wherein, in an instance in which the mobile scanning device is attached, the mobile scanning device is triggered in an instance in which the first conductive pad contacts the second conductive pad.

17. The assembly of claim 16, wherein the posterior portion of the glove further comprises:
an outer surface; and
an inner surface, wherein the outer surface defines a plurality of first via holes in the metacarpal region of the glove, and wherein each first via hole extends from the outer surface of the posterior portion to the inner surface of the posterior portion.

18. The assembly of claim 17, wherein the plurality of first via holes are configured to receive a plurality of couplers.

19. The assembly of claim 18, wherein the mobile scanning device further comprises an adapter module having a plurality of snap buttons, wherein the plurality of snap buttons snap fits with the plurality of couplers to removable attached the mobile scanning device with the glove.

20. The assembly of claim 16, wherein the first conductive pad and the second conductive pad are formed of a conductive yarn.

21. A method for operating a mobile scanning device mounted on a glove, the method comprising:
receiving, by a processor, an input to operate the mobile scanning device in a gesture association mode, wherein operating the mobile scanning device in the gesture association mode comprises:
receiving, by the processor, at least one of a first trigger signal or a second trigger signal upon a worker performing a gesture on the glove;
identifying, by the processor, a type of the gesture performed by the worker on the glove based on reception of the at least one of the first trigger signal or the second trigger signal; and
associating the identified type of the gesture with an operation of the mobile scanning device,
wherein the first trigger signal is generated when a first conductive pad contacts a second conductive pad, wherein the first conductive pad is knitted on an anterior portion of the glove, wherein the second conductive pad is knitted on a posterior portion of the glove,
wherein the second trigger signal is generated when the first conductive pad contacts a third conductive pad, wherein the third conductive pad is knitted on the posterior portion of the glove.

22. The method of claim 21, wherein the gesture performed on the glove corresponds to the worker bringing one or more conducting pads in contact with each other for at least a predetermined duration or in a predetermined sequence.

23. The method of claim 22, wherein the one or more conducting pads are in electrical communication with the mobile scanning device in an instance in which the mobile scanning device is attached to the glove.

24. The method of claim 21, wherein the type of the gesture is identified based on at least a duration of receipt of the first trigger signal or the second trigger signal.

25. The method of claim 21, wherein the type of the gesture is identified based on a sequence of reception of the at least one of the first trigger signal or the second trigger signal.

26. The method of claim 21 further comprising receiving, by the processor, an input to operate the mobile scanning device in an operation mode, wherein operating the mobile scanning device in the operation mode comprises:
receiving, by the processor, the at least one of the first trigger signal or the second trigger signal, indicative of another gesture performed by the worker;
identifying, by the processor, the type of the other gesture performed by the worker based on a sequence of reception of the at least one of the first trigger signal or the second trigger signal;
determining, by the processor, an operation to be performed on the mobile scanning device based on the identified type of the other gesture; and
performing, by the processor, the determined operation on the mobile scanning device based on the type of the other gesture.

27. A triggering system comprising:
a glove, wherein the glove comprises:
an anterior portion;
a posterior portion, wherein the anterior portion is knitted seamlessly with the posterior portion to define:
a metacarpal region, and
a plurality of finger regions extending out from the metacarpal region,
a first conductive pad knitted on the anterior portion of the glove, wherein the first conductive pad is knitted on a distal end portion of a first finger region of the plurality of finger regions;
a second conductive pad knitted on the posterior portion of the glove, wherein the second conductive pad is knitted on a second finger region of the plurality of finger regions; and
a third conductive pad knitted on the posterior portion of the glove, wherein the third conductive pad is knitted on the second finger region and is spaced apart from the second conductive pad; and
a mobile scanning device, removable attached to the posterior portion of the glove such that the first conductive pad, the second conductive pad, and the third conductive pad electrically couples with the mobile scanning device, wherein the mobile scanning device comprises:
a first trigger circuit configured to generate a first trigger signal when the first conductive pad is brought in contact with the second conductive pad;
a second trigger circuit configured to generate a second trigger signal when the first conductive pad is brought in contact with the third conductive pad; and
a processor communicatively coupled to the first trigger circuit and the second trigger circuit, wherein the processor is configured to:
receive at least one of the first trigger signal or the second trigger signal indicating upon a worker performing a gesture on the glove;
identify a type of the gesture performed by the worker based on reception of the at least one of a duration of reception of the first trigger signal or the second trigger signal, or a sequence of reception of the first trigger signal and the second trigger signal; and trigger the mobile scanning device based on the identified type of the gesture.

28. The triggering system of claim 27, wherein the processor is further configured to associate the identified type of the gesture with a predetermined operation of the mobile scanning device.

29. The triggering system of claim 27, wherein the posterior portion of the glove further comprises:

an outer surface; and an inner surface, wherein the outer surface defines a plurality of first via holes in the metacarpal region of the glove, and wherein each first via hole extends from the outer surface of the posterior portion to the inner surface of the posterior portion.

30. The triggering system of claim 29, wherein the glove further comprises:

a first conductive path knitted on the inner surface of the posterior portion of the glove, wherein the first conductive path is electrically coupled to the first conductive pad;

a second conductive path knitted on the inner surface of the posterior portion of the glove, wherein the second conductive path is electrically coupled to the second conductive pad;

a first conductive region knitted on a periphery of a first via hole of the plurality of first via holes, wherein the first conductive path electrically couples the first conductive region with the first conductive pad; and a second conductive region knitted on a periphery of another first via hole of the plurality of first via holes, wherein the second conductive path electrically couples the second conductive region with the second conductive pad.

31. The triggering system of claim 29, wherein the plurality of first via holes is configured to receive a plurality of couplers.

32. The triggering system of claim 31, wherein a pad is received on the outer surface of the posterior portion of the glove, wherein the pad further comprises:

a plurality of second via holes, wherein the pad is received on the glove in such a manner that the plurality of first via holes on the glove aligns with the plurality of second via holes on the pad.

33. The triggering system of claim 32, wherein the plurality of couplers extends through the plurality of second via holes.

34. The triggering system of claim 33, wherein the mobile scanning device is attached on the pad through the plurality of couplers.

* * * * *